Jan. 6, 1953  J. S. BURGE ET AL  2,624,374
MACHINE FOR MAKING ELECTRICAL COILS
Filed March 11, 1947  46 Sheets-Sheet 6

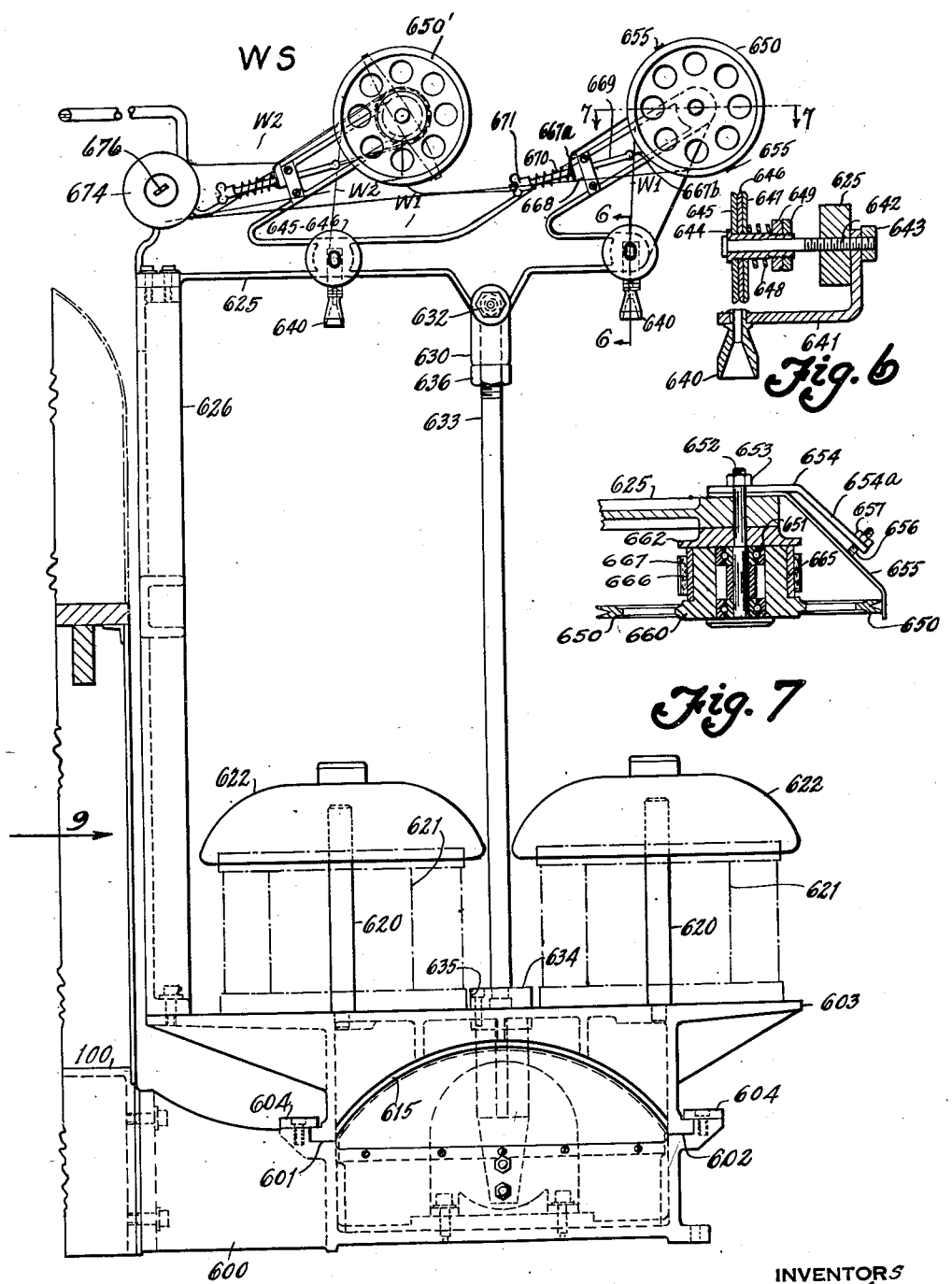

INVENTORS
James S. Burge, Hilton J. McKee
BY Richard M. Goodwin
Spencer Hardman & Felix
ATTORNEY

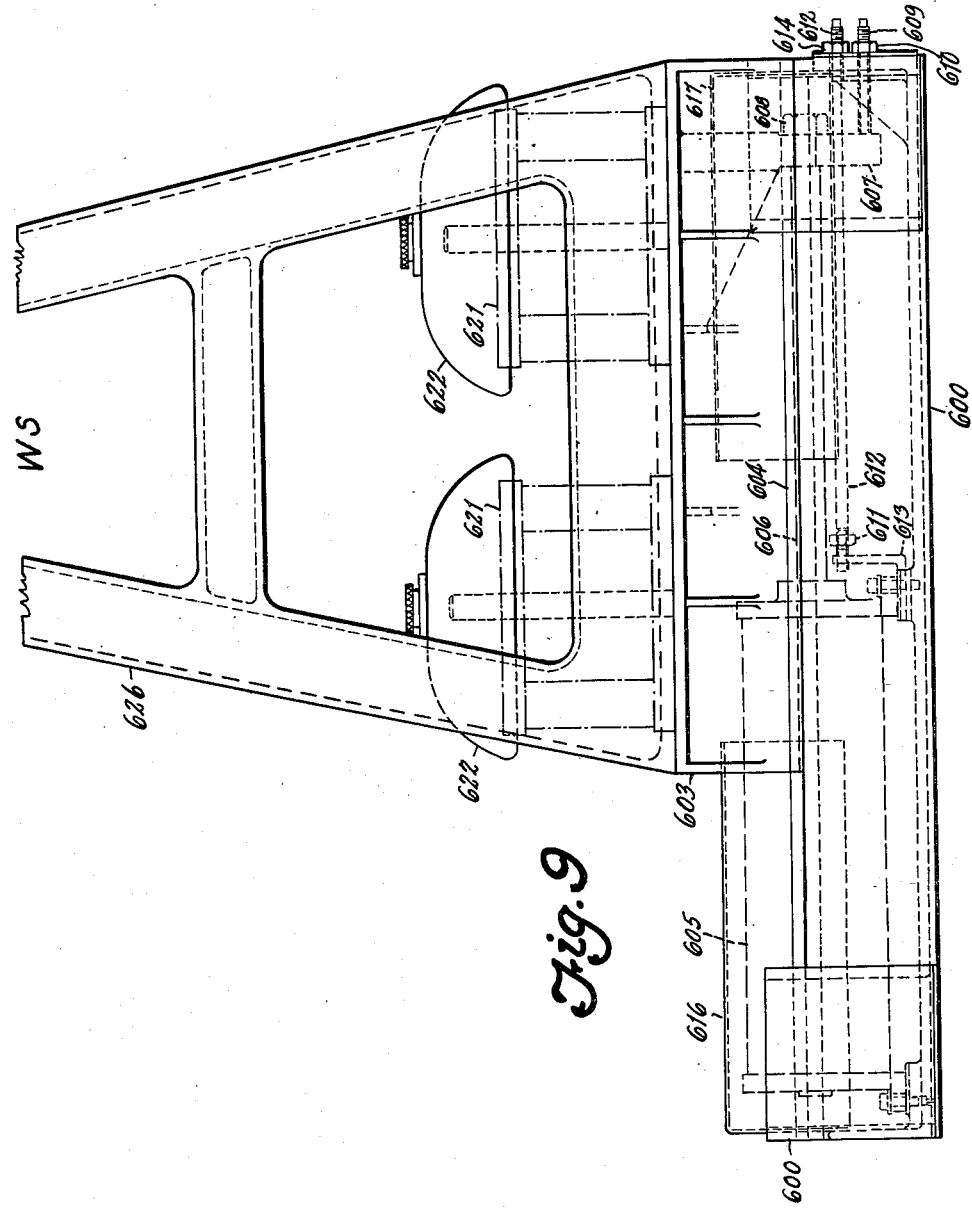

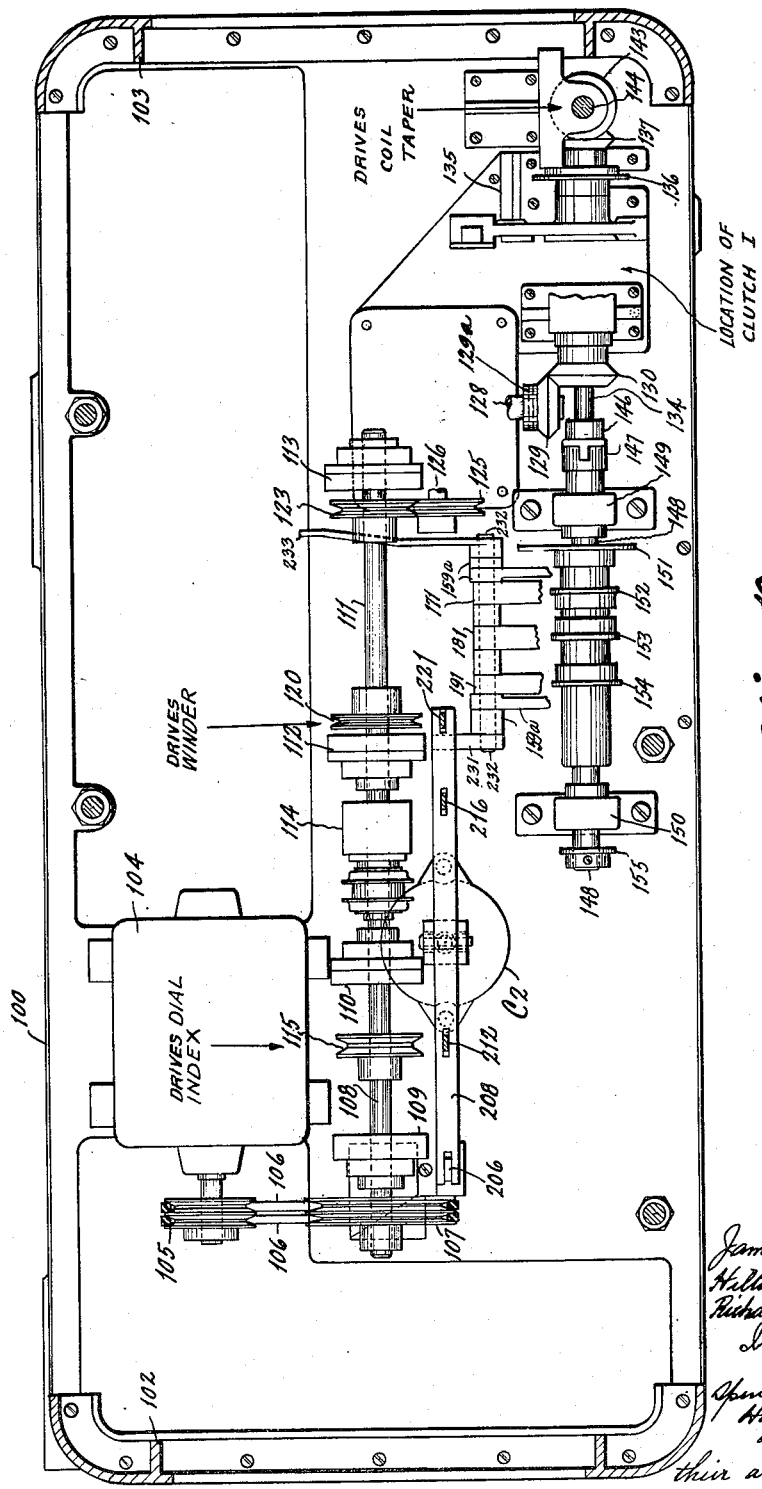

Jan. 6, 1953  J. S. BURGE ET AL  2,624,374
MACHINE FOR MAKING ELECTRICAL COILS
Filed March 11, 1947  46 Sheets-Sheet 9
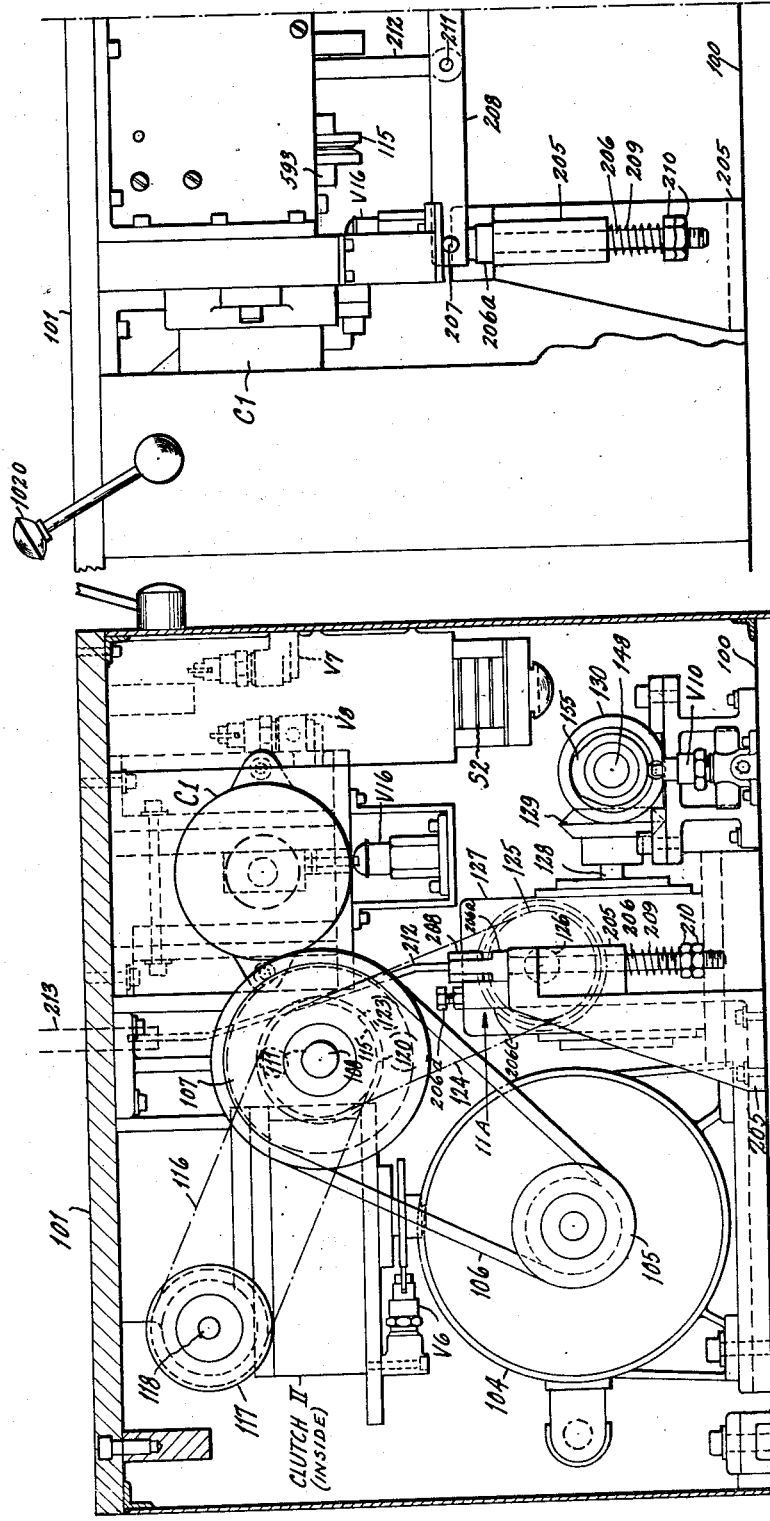
James S. Burge
Hilton J. McKee
Richard M. Goodwin
INVENTORS
by Spencer Hardman
and Fehr
their ATTORNEYS

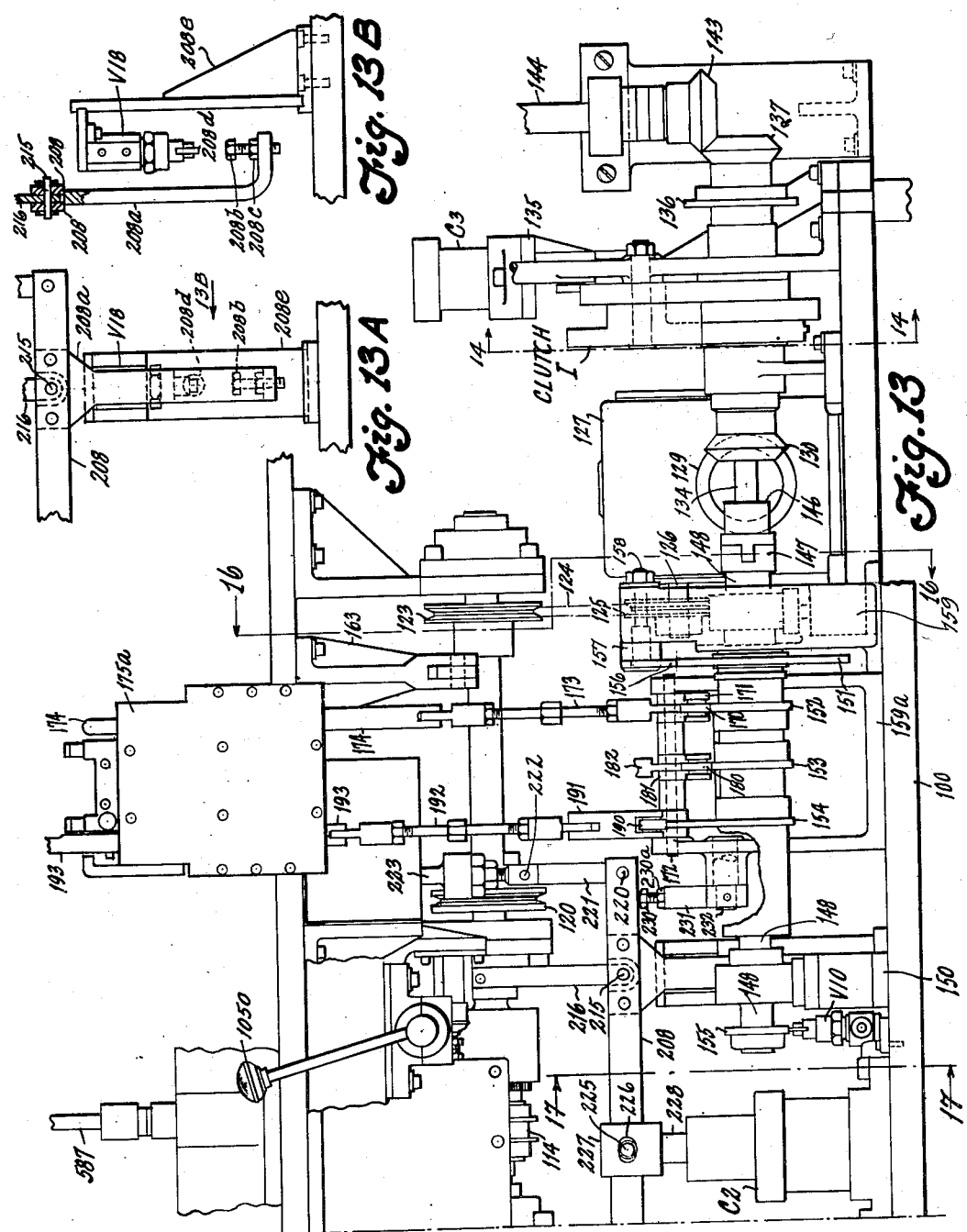

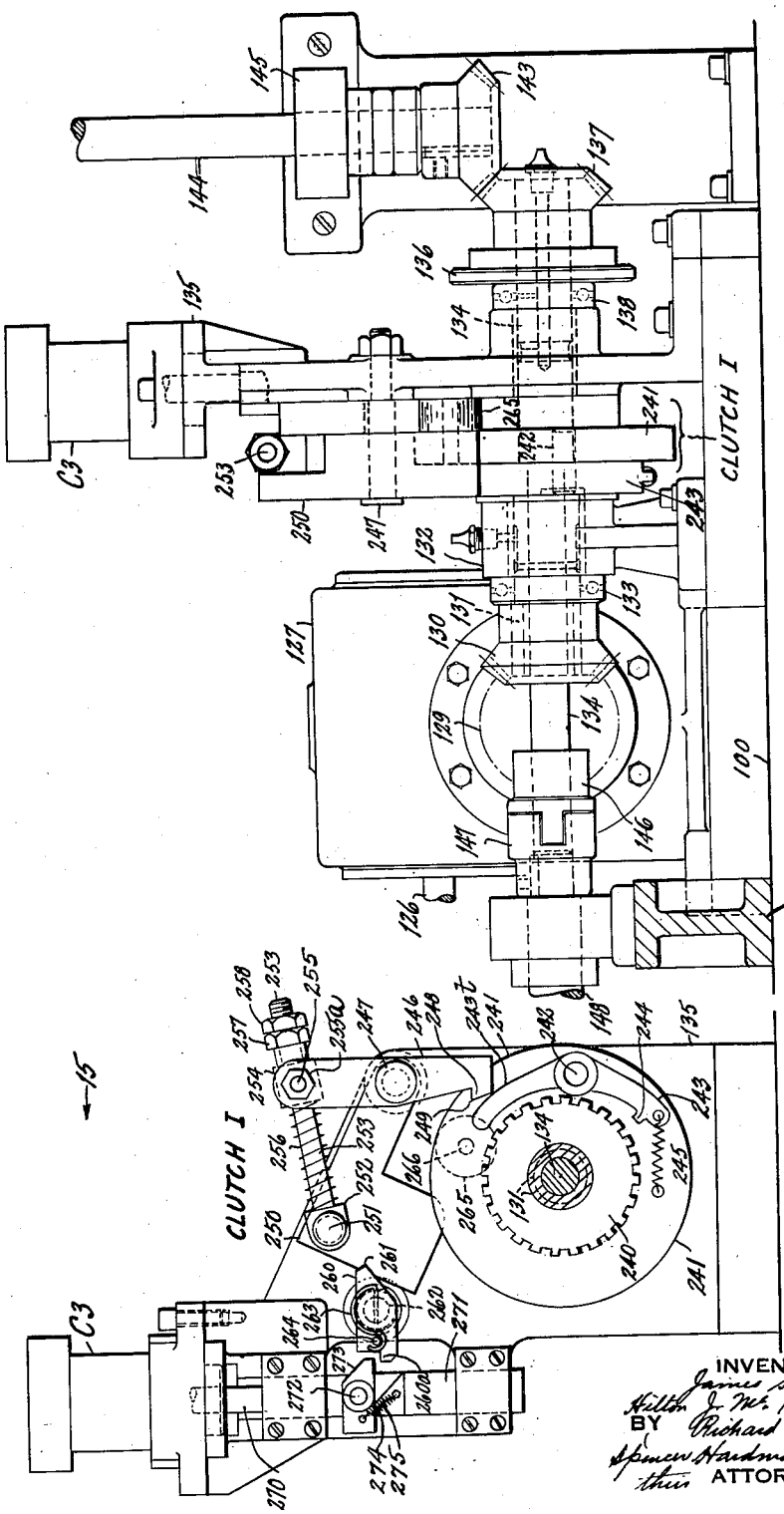

Jan. 6, 1953  J. S. BURGE ET AL  2,624,374
MACHINE FOR MAKING ELECTRICAL COILS
Filed March 11, 1947  46 Sheets-Sheet 12

INVENTORS
James S. Burge, Hilton J. McKee
BY Richard M. Goodwin
Spencer Hardman & Fehr
their attorneys Jan. 6, 1953
J. S. BURGE ET AL
2,624,374
MACHINE FOR MAKING ELECTRICAL COILS
Filed March 11, 1947
46 Sheets-Sheet 16

INVENTORS
James S. Burge, Hilton J. McKee
BY Richard M. Goodwin
Spencer Hardman & Fehr
their attorneys Jan. 6, 1953  J. S. BURGE ET AL  2,624,374
MACHINE FOR MAKING ELECTRICAL COILS
Filed March 11, 1947  46 Sheets-Sheet 17
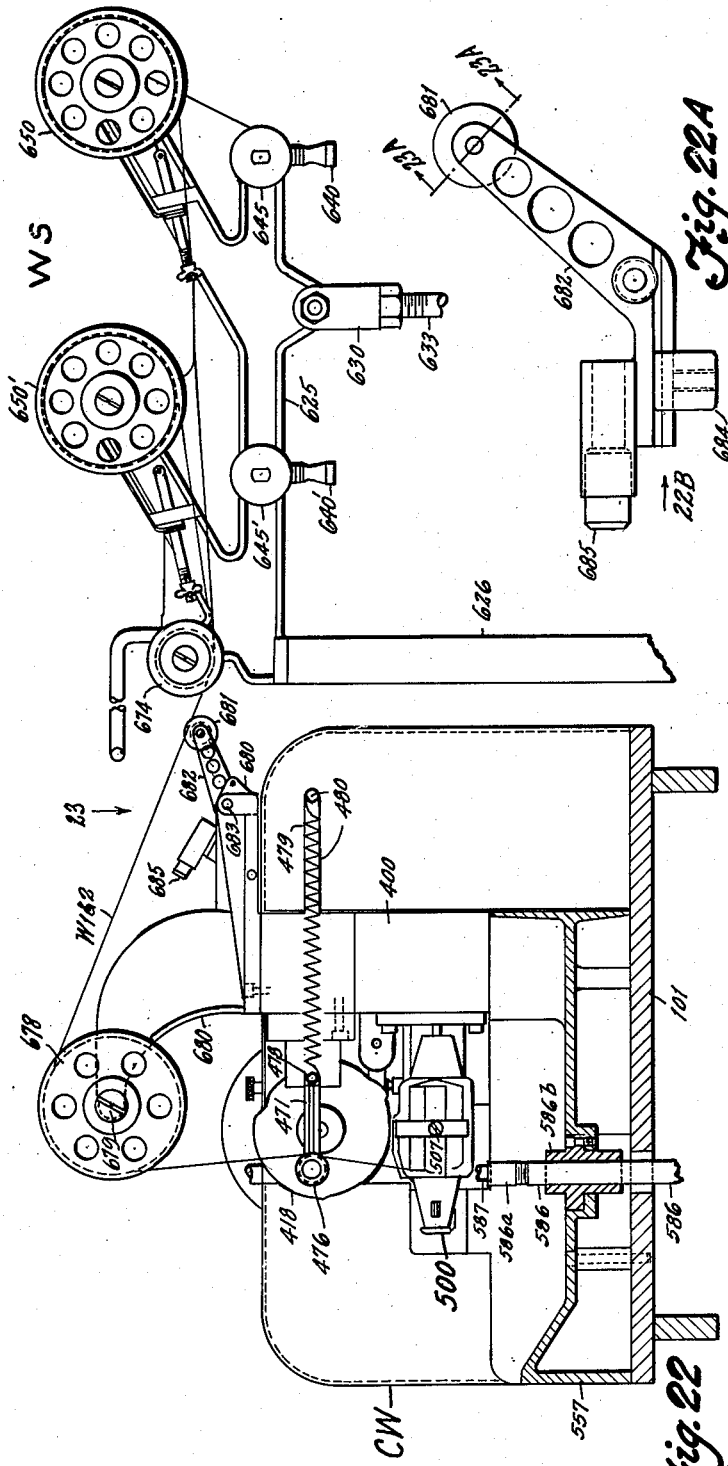
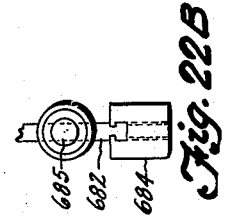
INVENTORS
James S. Burge
Hilton J. McKee
Richard M. Goodwin
by Spencer Hardman & Fehr
their attorneys

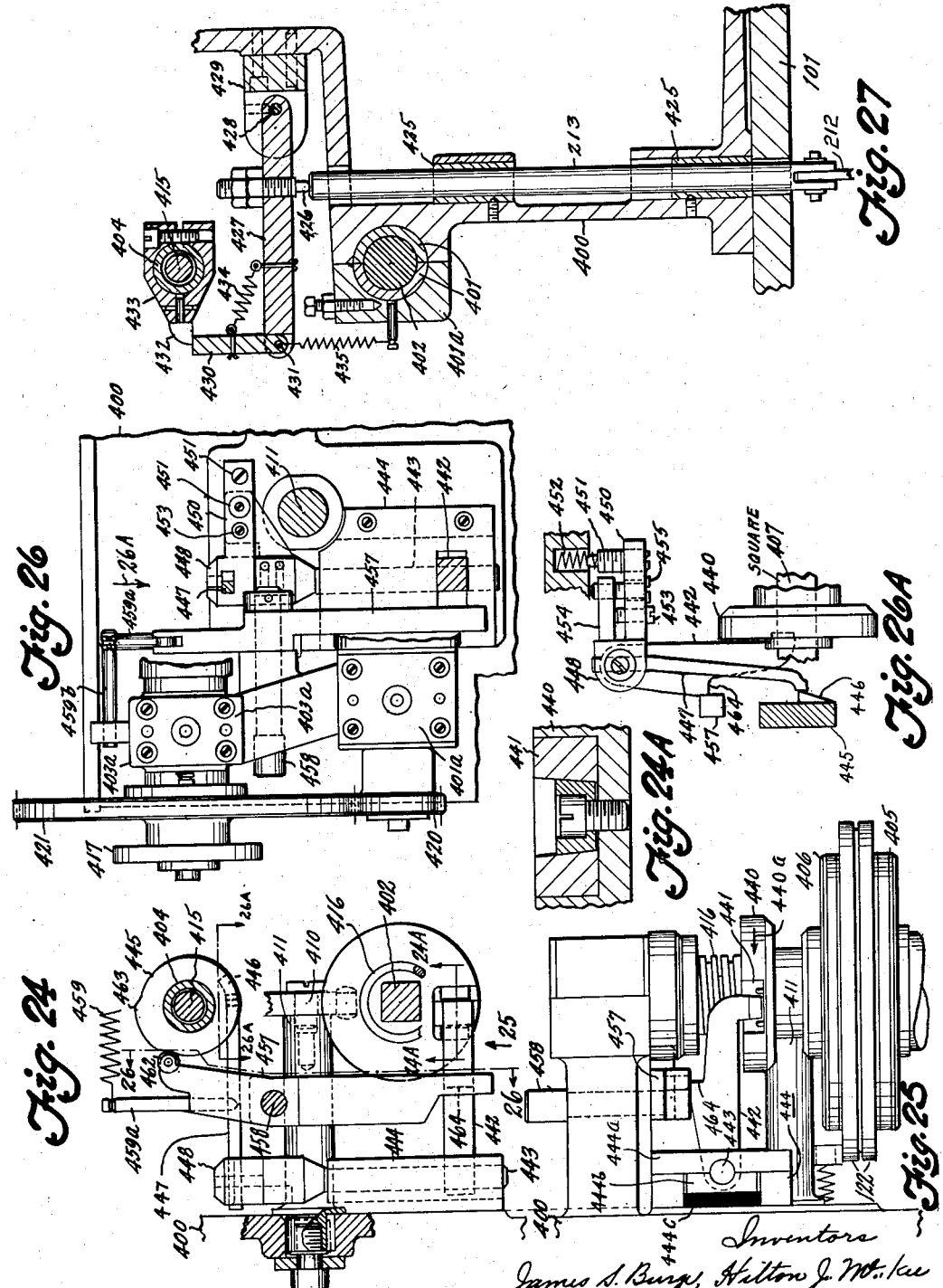

Jan. 6, 1953 J. S. BURGE ET AL 2,624,374
MACHINE FOR MAKING ELECTRICAL COILS
Filed March 11, 1947 46 Sheets-Sheet 19
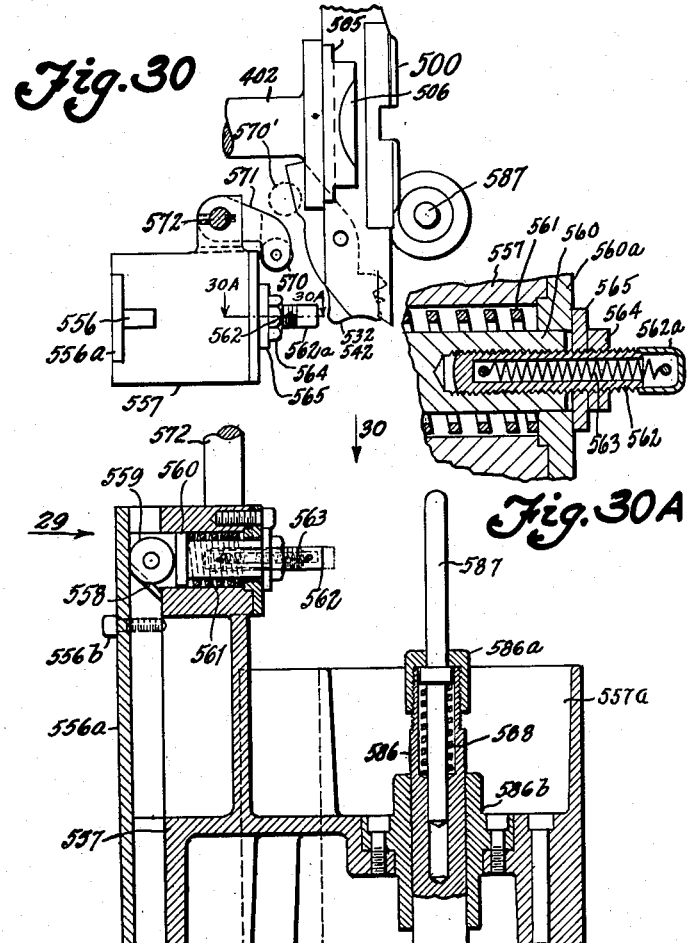
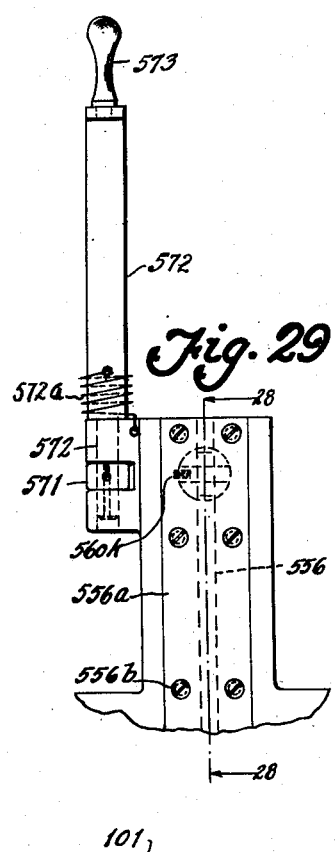
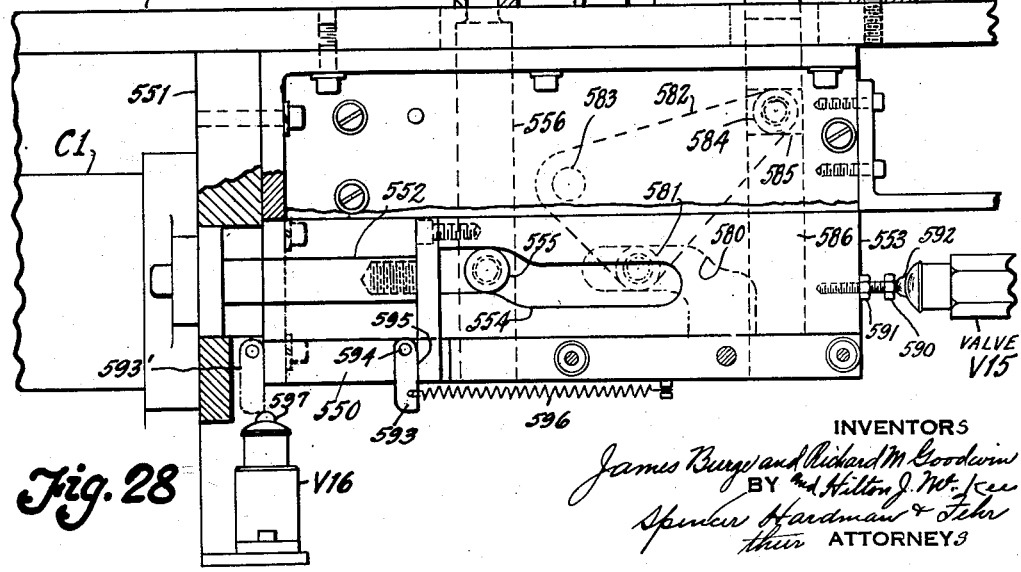
INVENTORS
James Burge and Richard M. Goodwin
BY and Hilton J. McKee
Spencer Hardman & Fehr
their ATTORNEYS

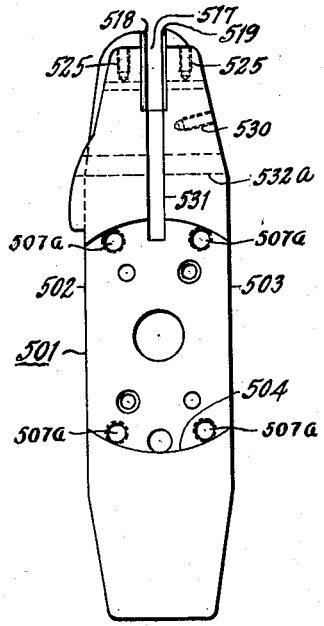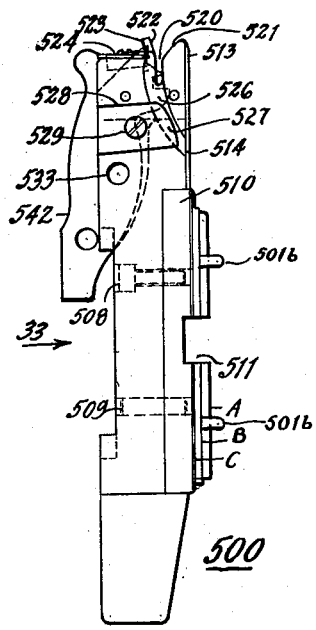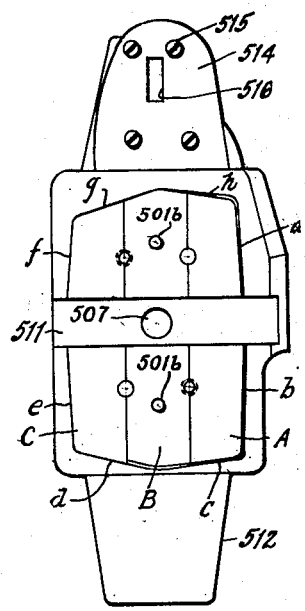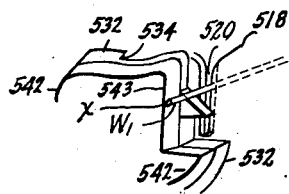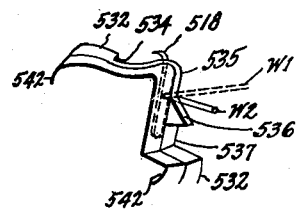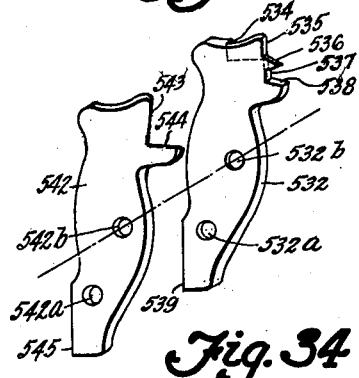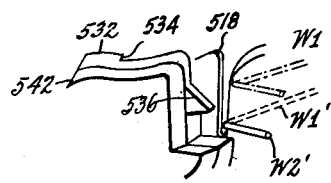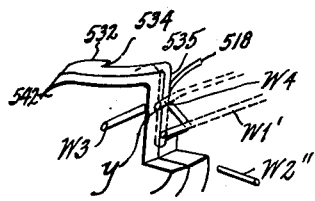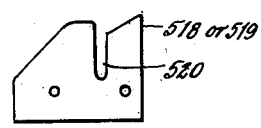

Jan. 6, 1953   J. S. BURGE ET AL   2,624,374
MACHINE FOR MAKING ELECTRICAL COILS
Filed March 11, 1947   46 Sheets-Sheet 21

INVENTORS
James Burge and Richard M. Goodwin
BY
ATTORNEYS

Jan. 6, 1953     J. S. BURGE ET AL     2,624,374

MACHINE FOR MAKING ELECTRICAL COILS

Filed March 11, 1947     46 Sheets-Sheet 23

INVENTORS
James S. Burge, Hilton J. McKee
Richard M. Goodwin
BY
Spencer Hardman & Fehr
their attorneys

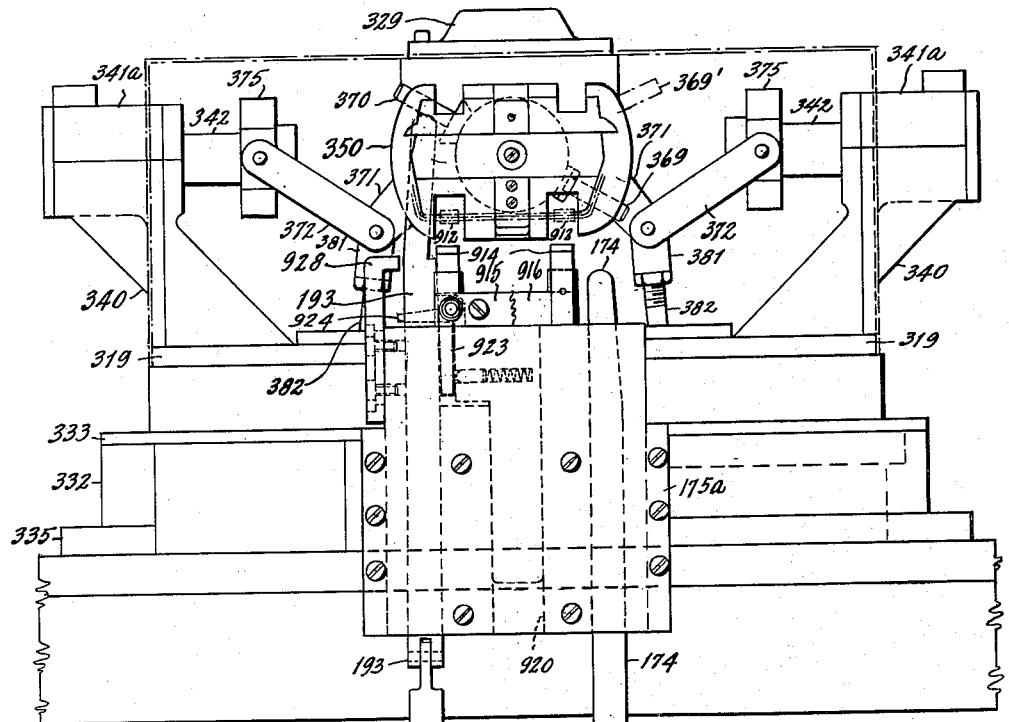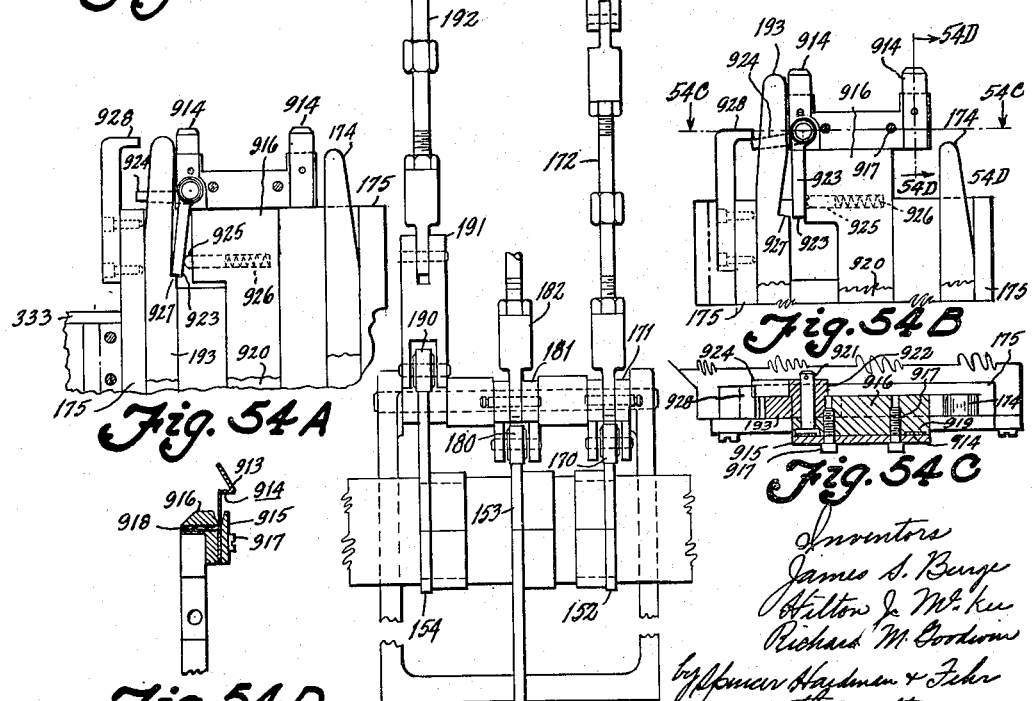

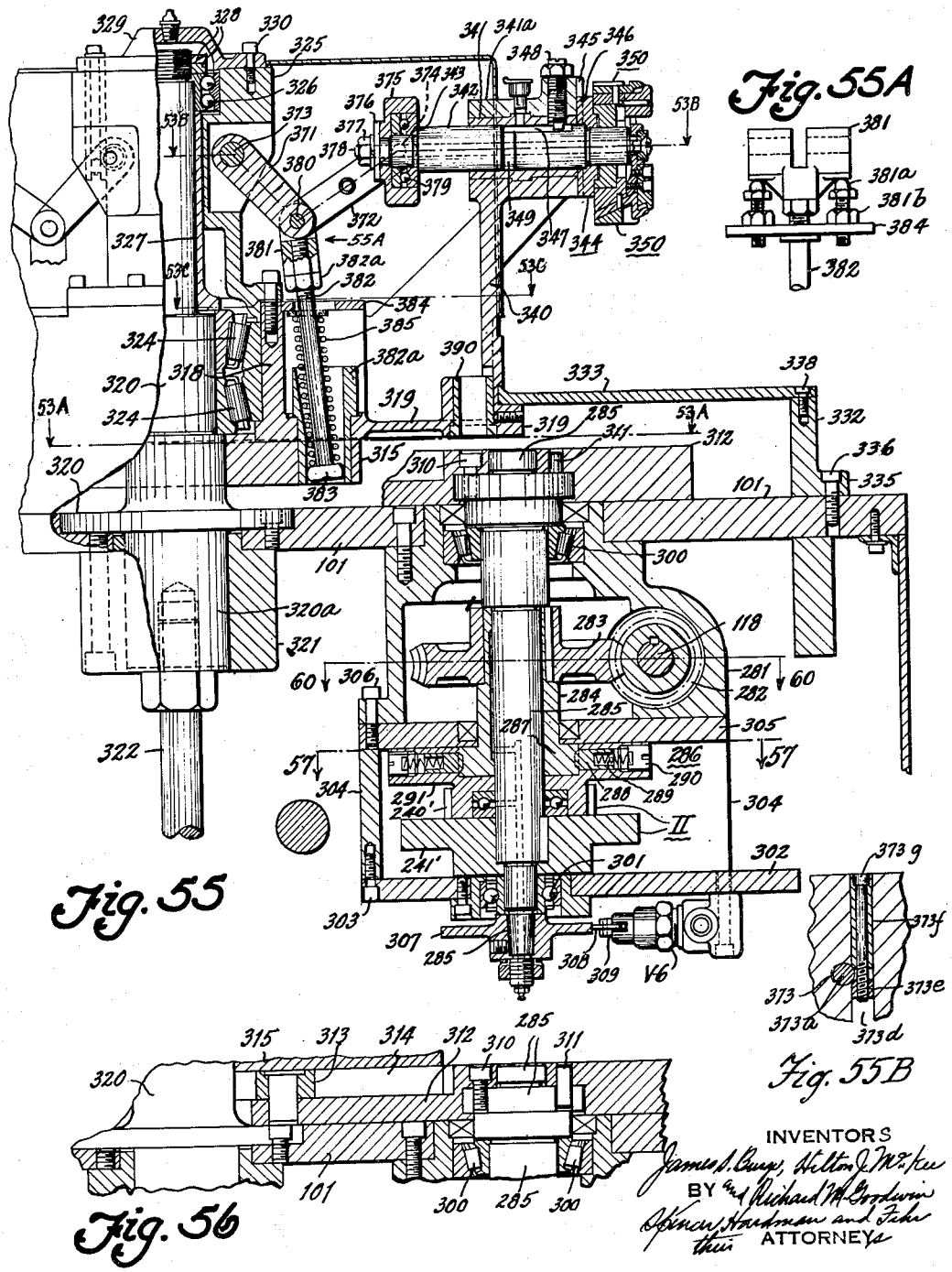

Jan. 6, 1953  J. S. BURGE ET AL  2,624,374
MACHINE FOR MAKING ELECTRICAL COILS
Filed March 11, 1947  46 Sheets-Sheet 26
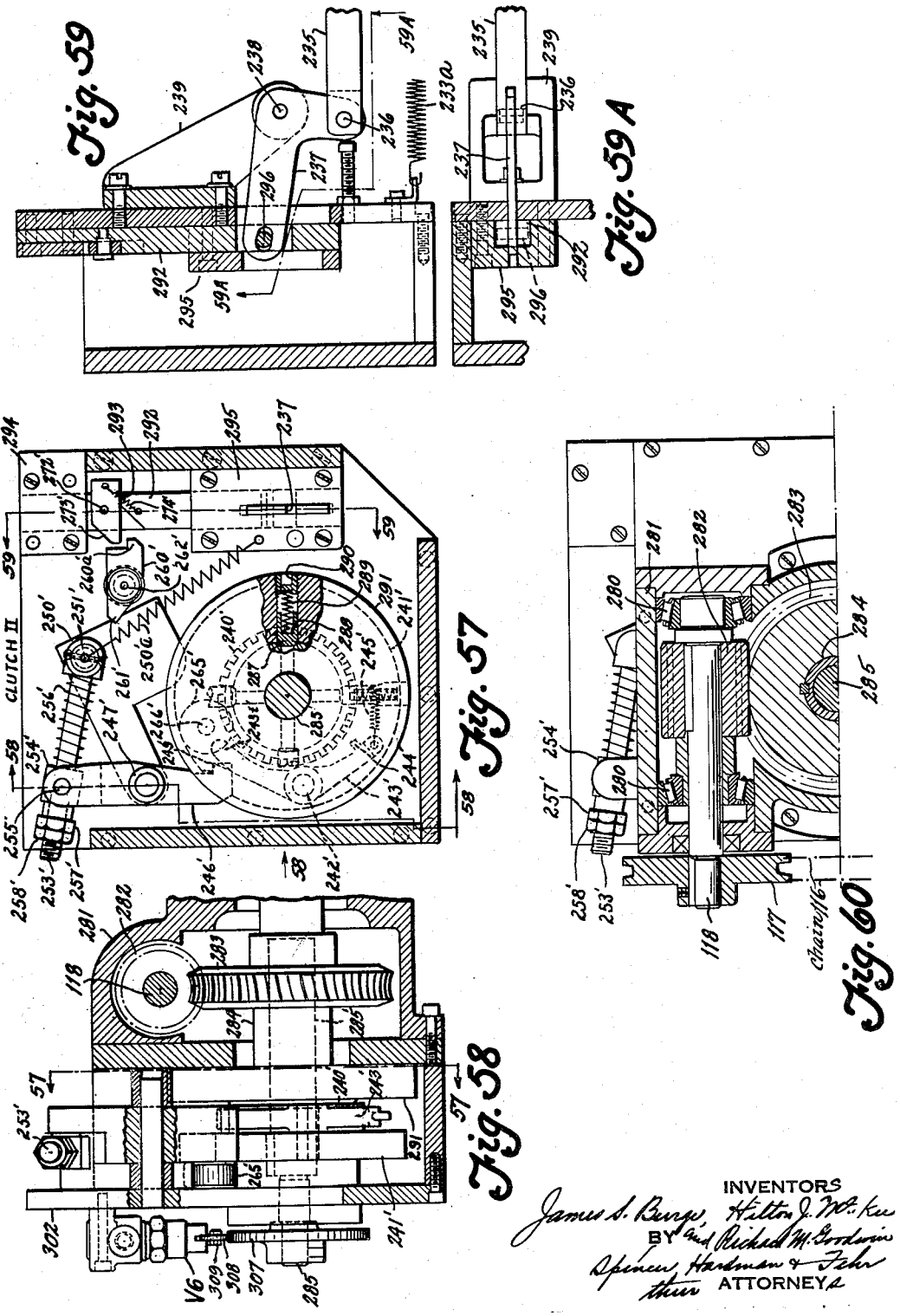
INVENTORS
James S. Burge, Hilton J. McKee
and Richard M. Goodwin
BY Spencer, Hardman & Fehr
ATTORNEYS

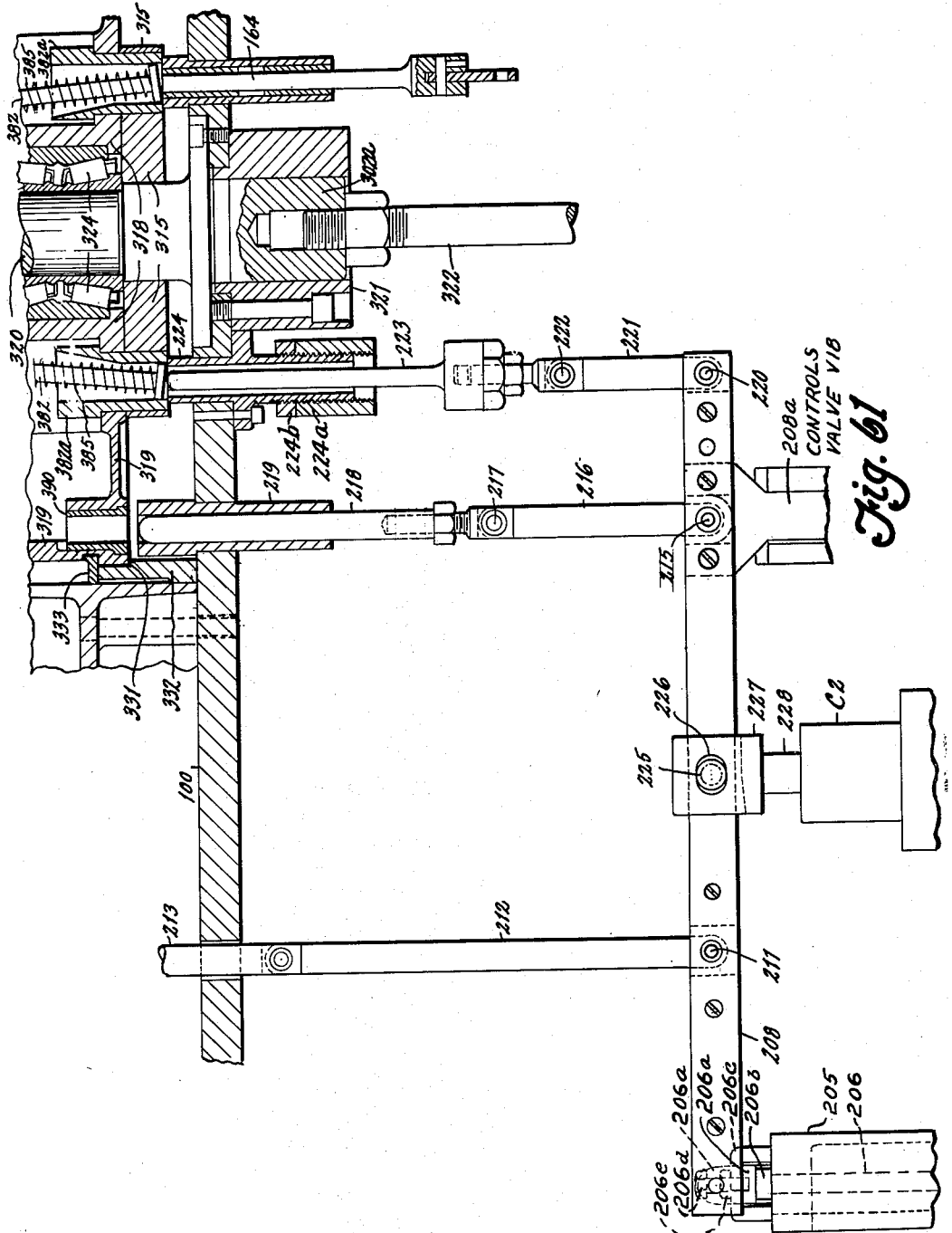

Jan. 6, 1953     J. S. BURGE ET AL     2,624,374
MACHINE FOR MAKING ELECTRICAL COILS
Filed March 11, 1947     46 Sheets-Sheet 29
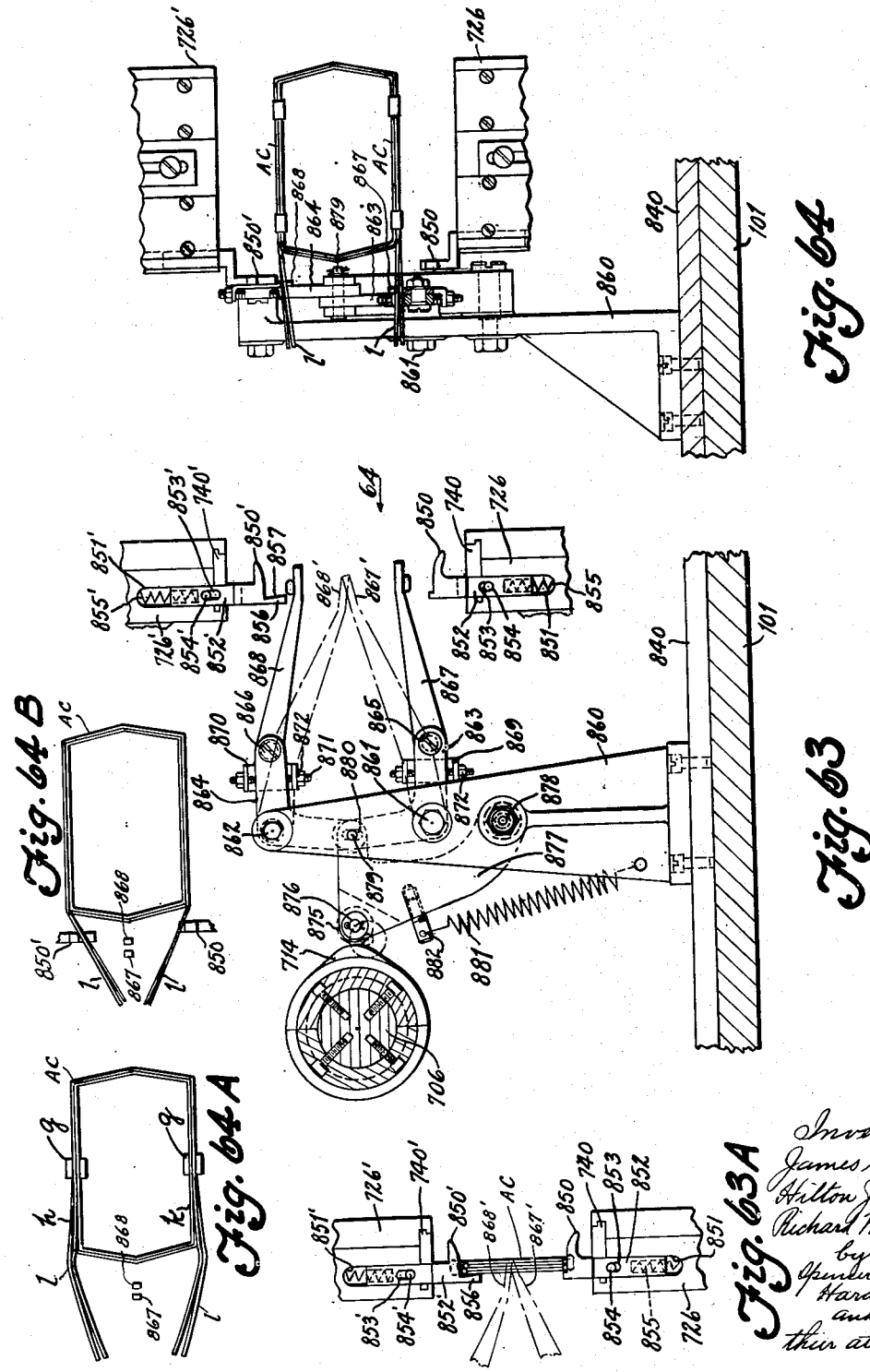

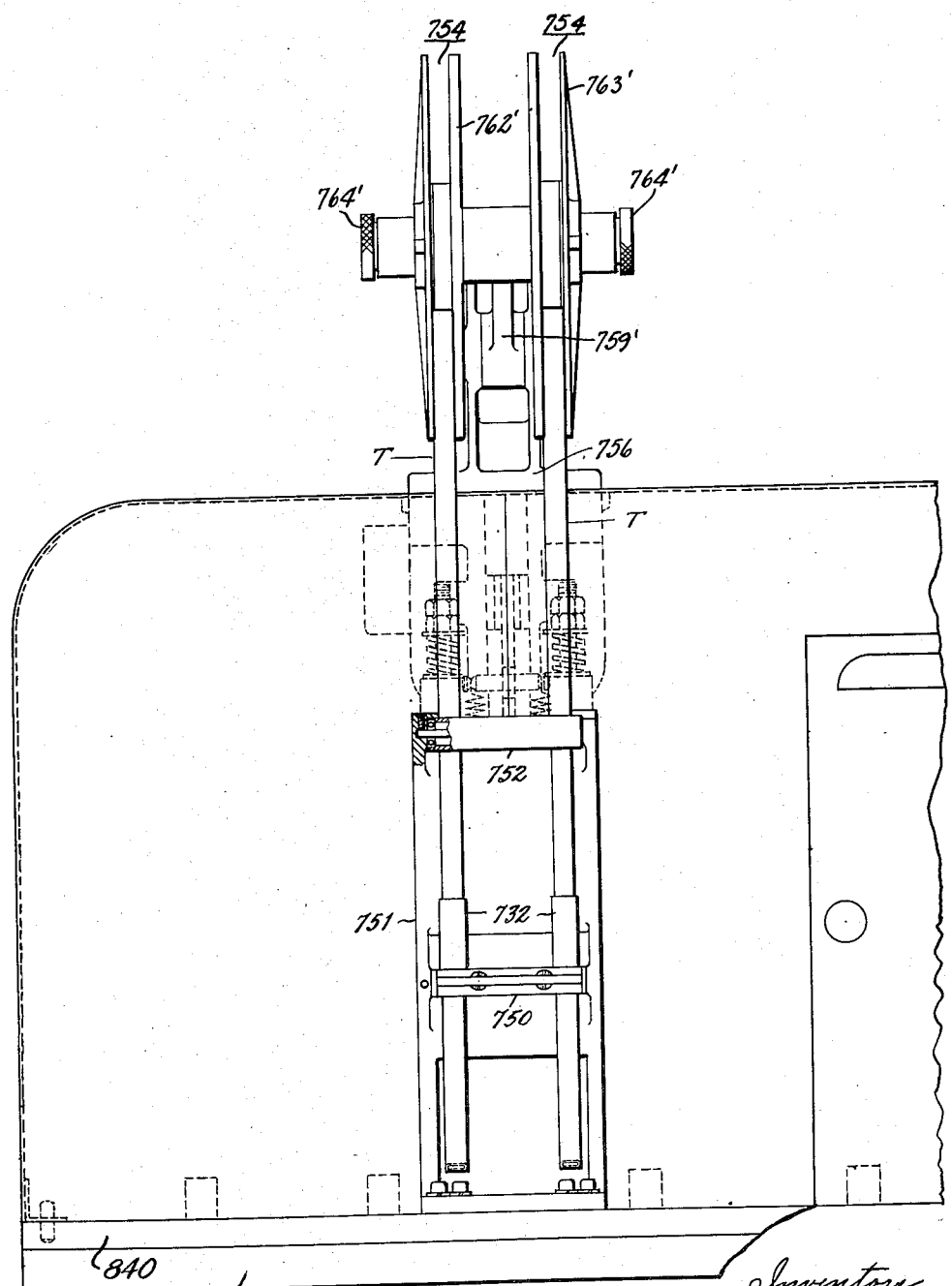

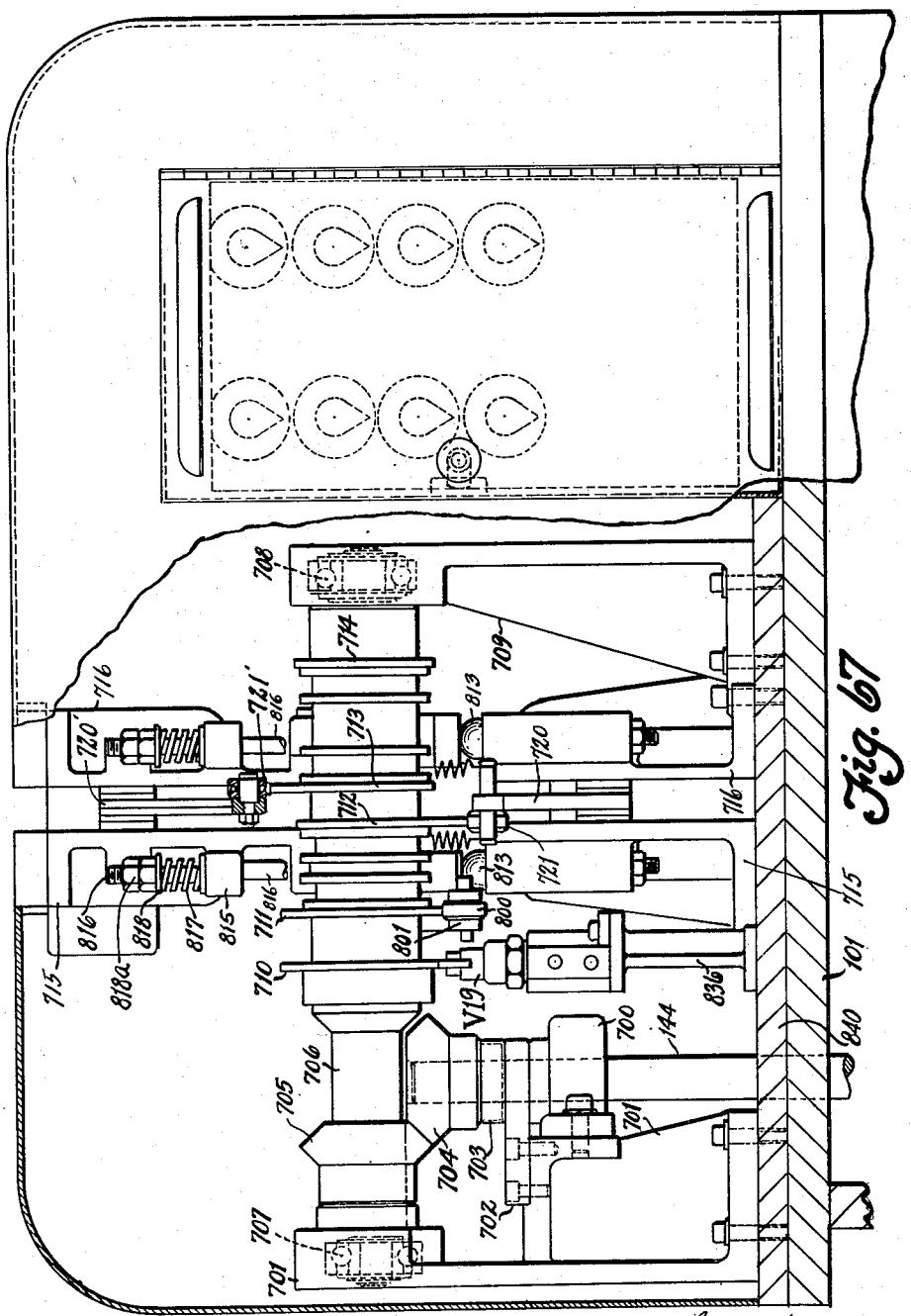

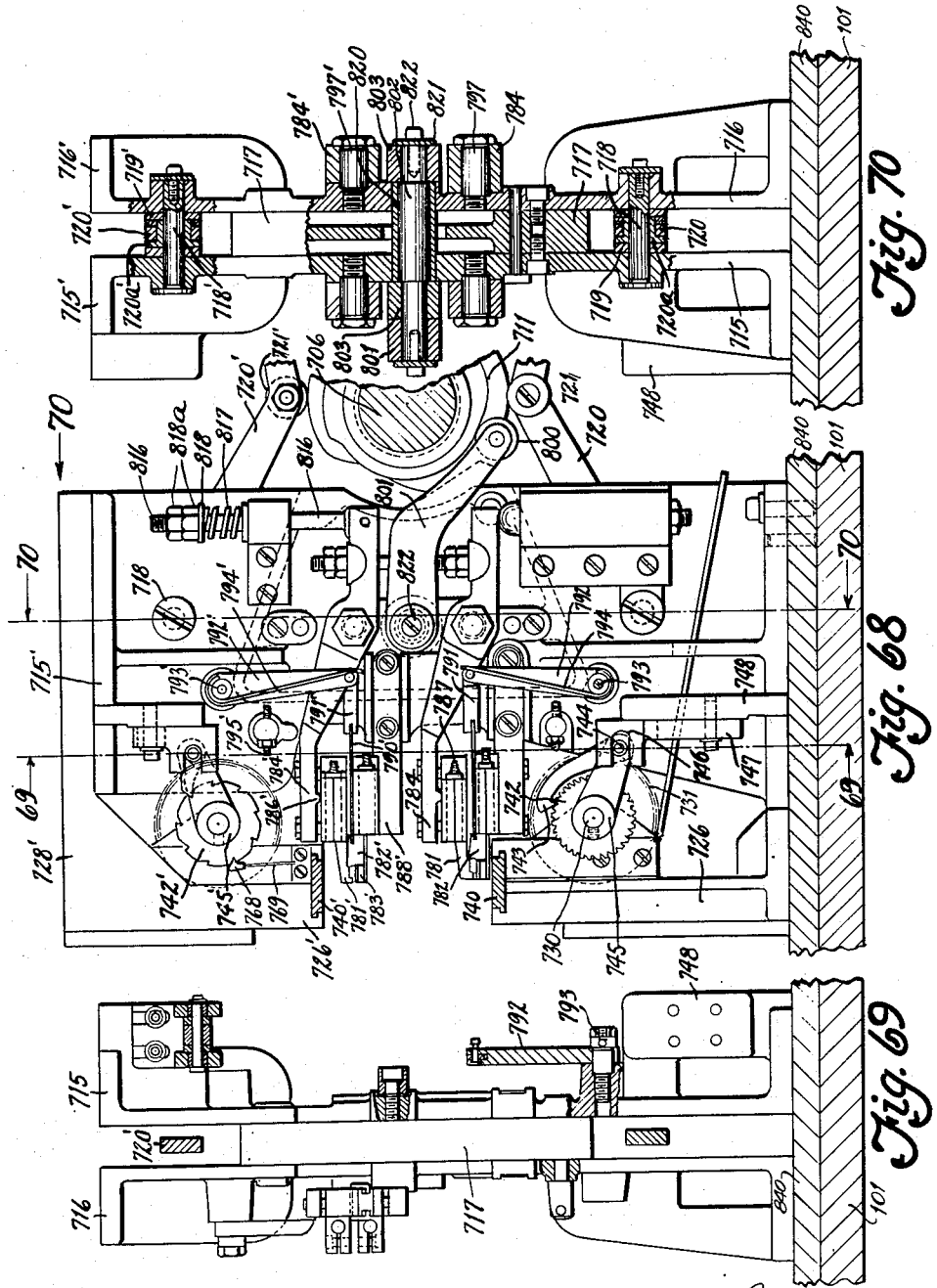

Jan. 6, 1953 J. S. BURGE ET AL 2,624,374
MACHINE FOR MAKING ELECTRICAL COILS
Filed March 11, 1947 46 Sheets-Sheet 34
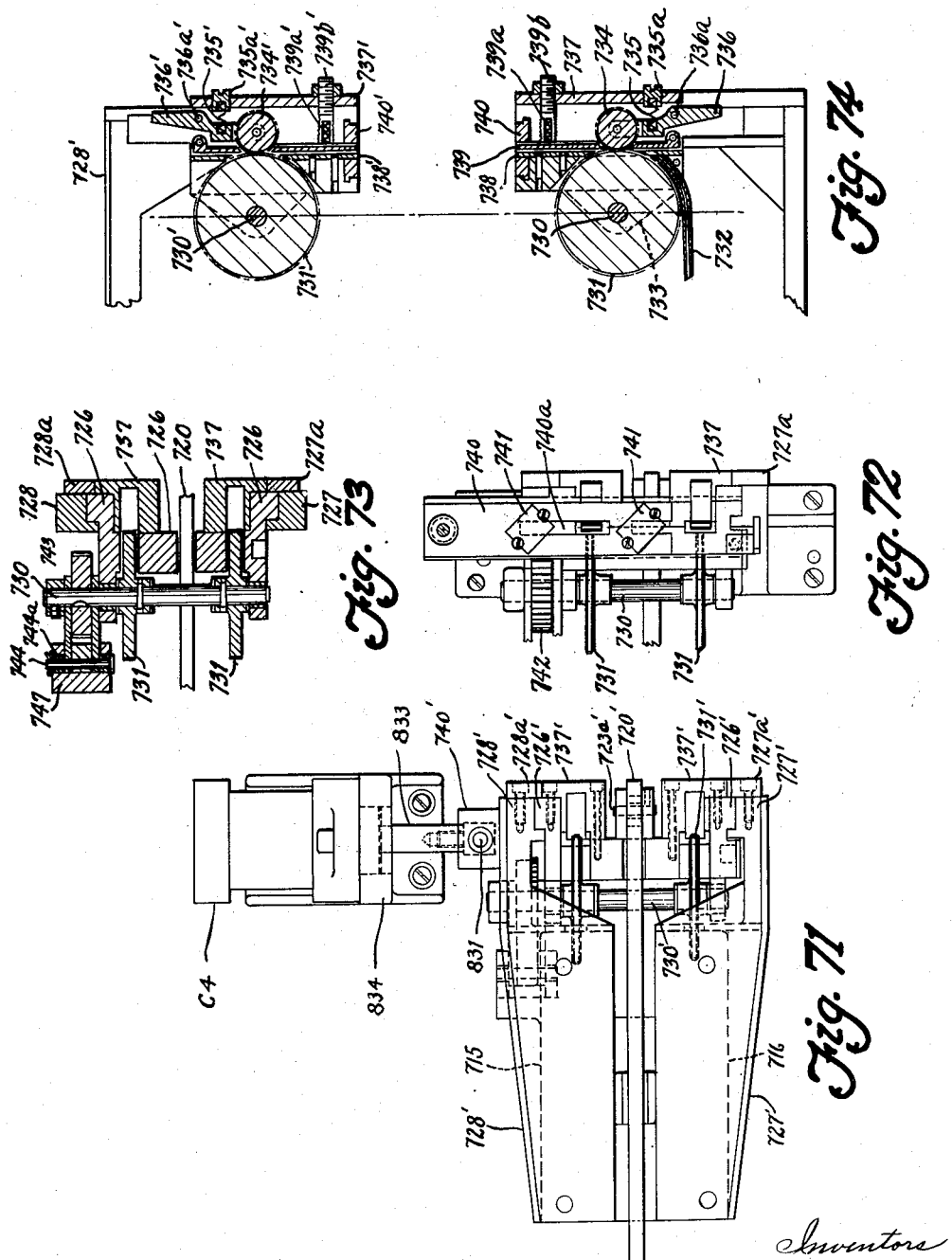

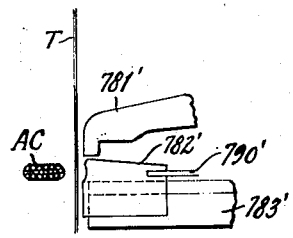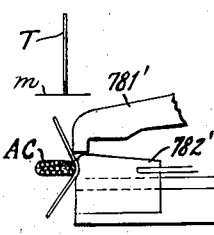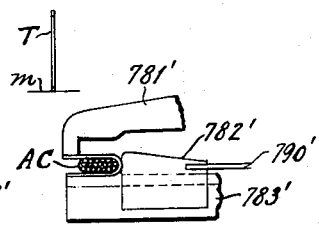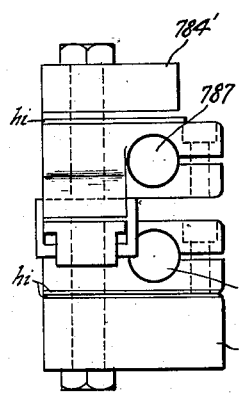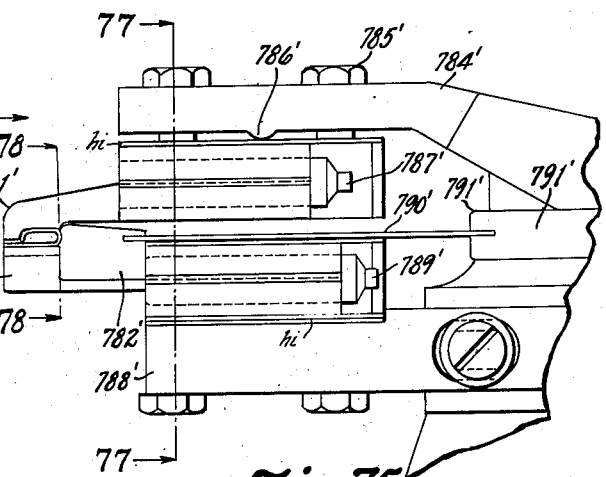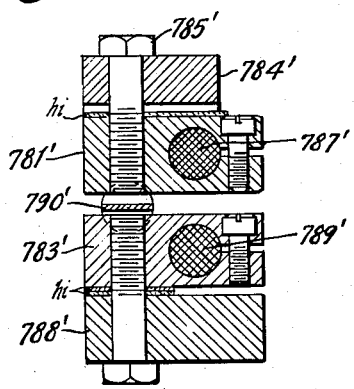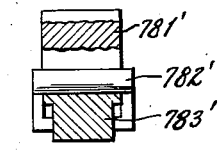

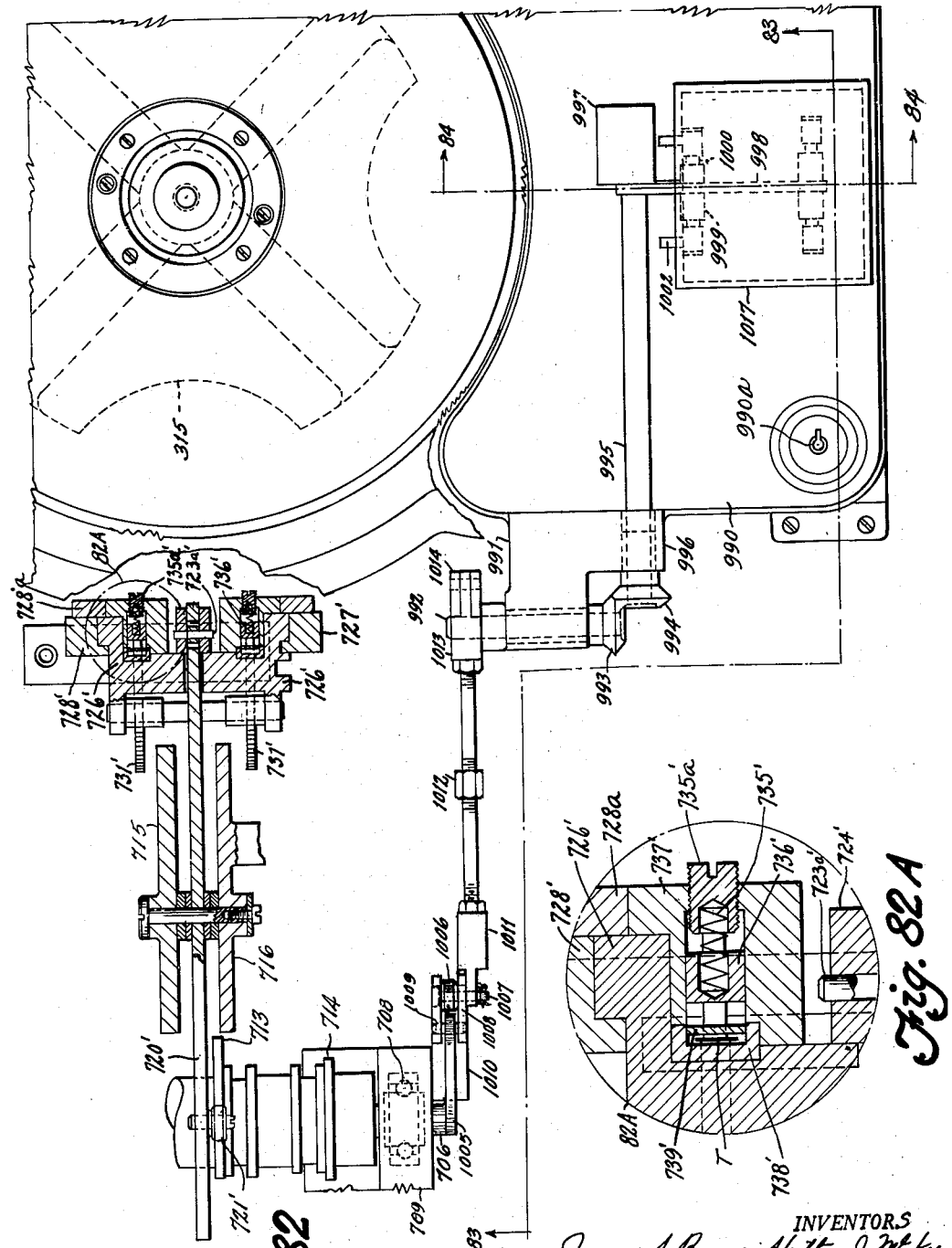

Jan. 6, 1953  J. S. BURGE ET AL  2,624,374
MACHINE FOR MAKING ELECTRICAL COILS
Filed March 11, 1947  46 Sheets-Sheet 37
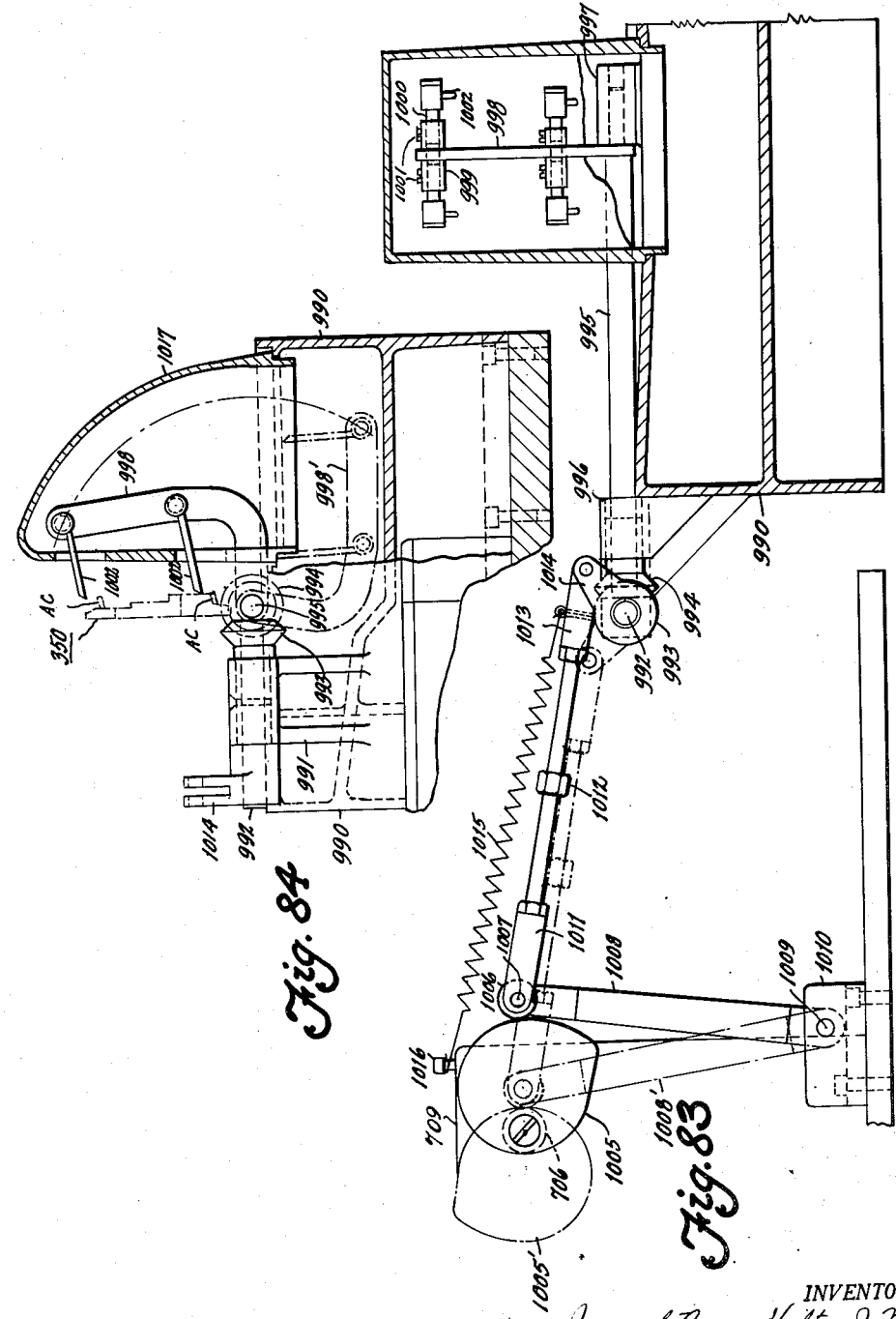
INVENTORS
James S. Burge, Hilton J. McKee
BY Richard M. Goodwin
Spencer Hardman & Fehr
their attorneys Jan. 6, 1953　　　J. S. BURGE ET AL　　　2,624,374
MACHINE FOR MAKING ELECTRICAL COILS
Filed March 11, 1947　　　46 Sheets-Sheet 38
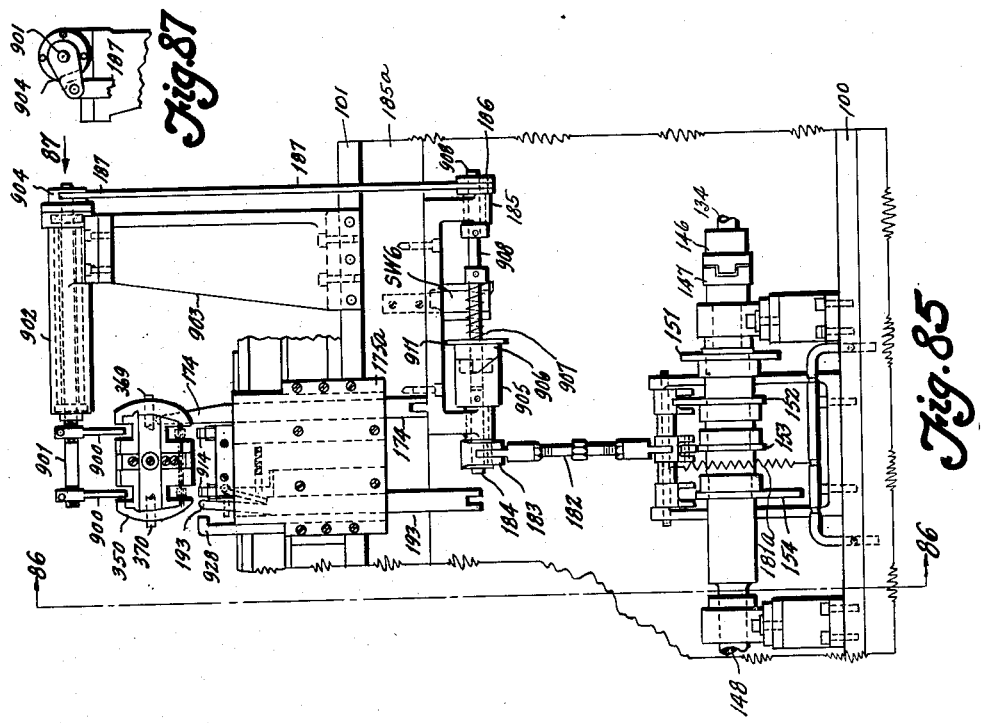
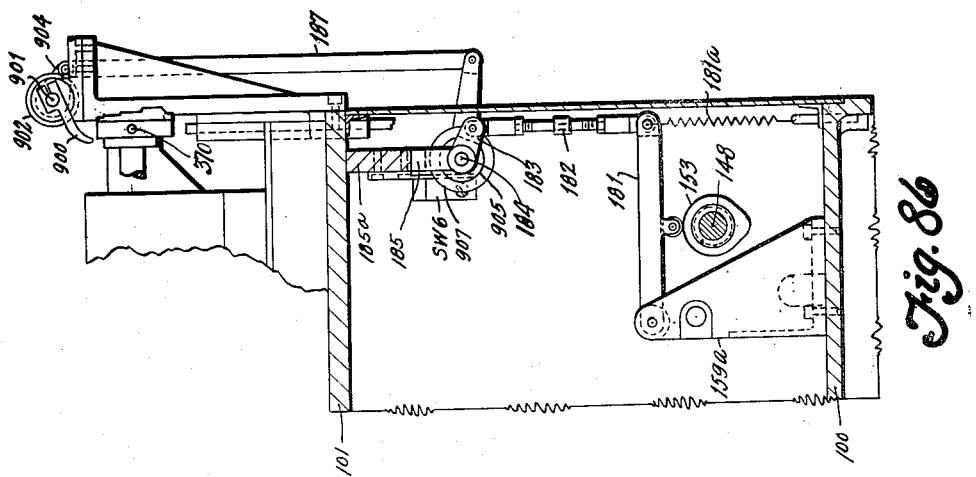
INVENTORS
James S. Burge, Hilton J. McKee
and Richard M. Goodwin
BY Spencer, Hardman and Fehr
their ATTORNEYS Jan. 6, 1953 J. S. BURGE ET AL 2,624,374
MACHINE FOR MAKING ELECTRICAL COILS
Filed March 11, 1947 46 Sheets-Sheet 39
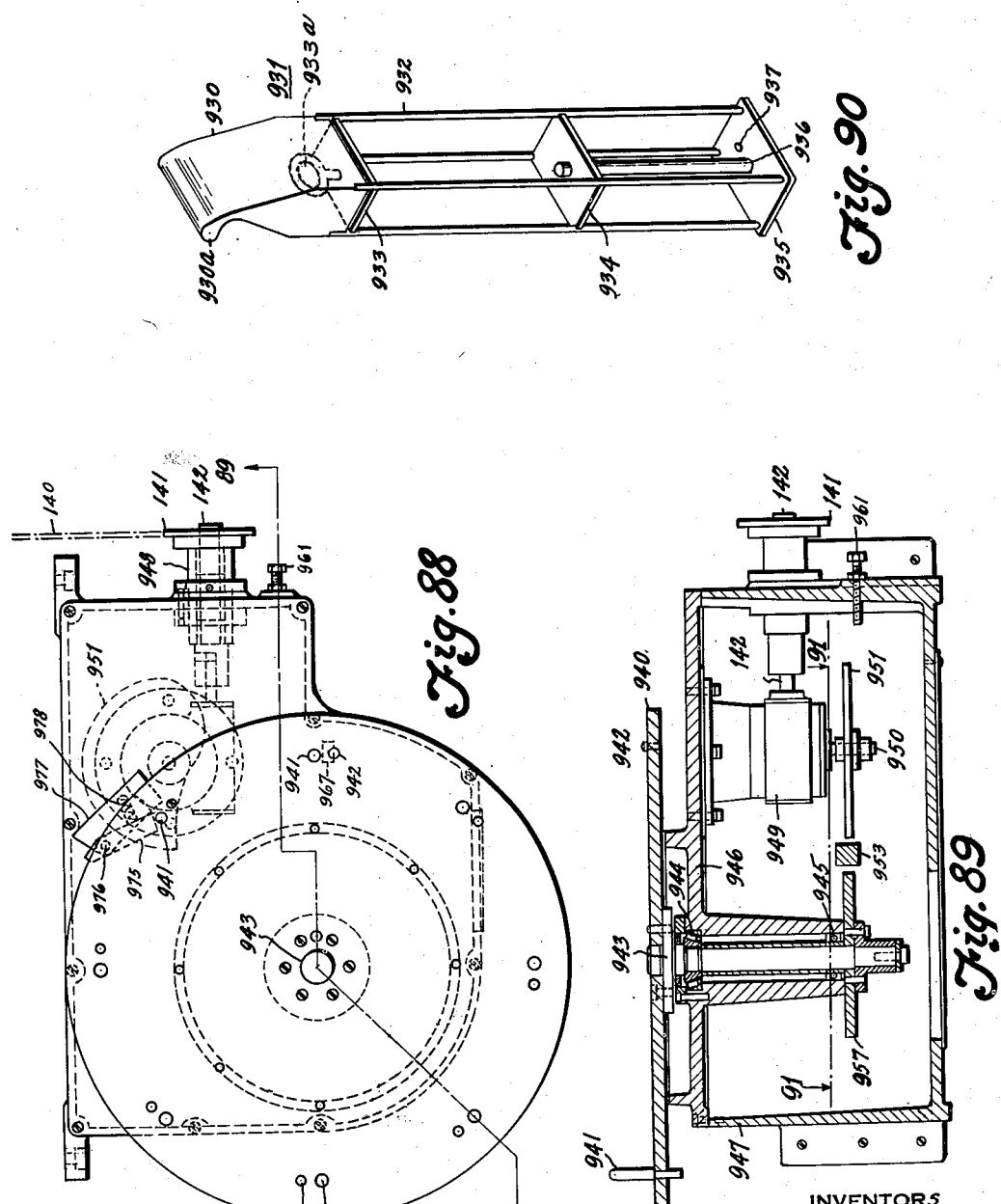

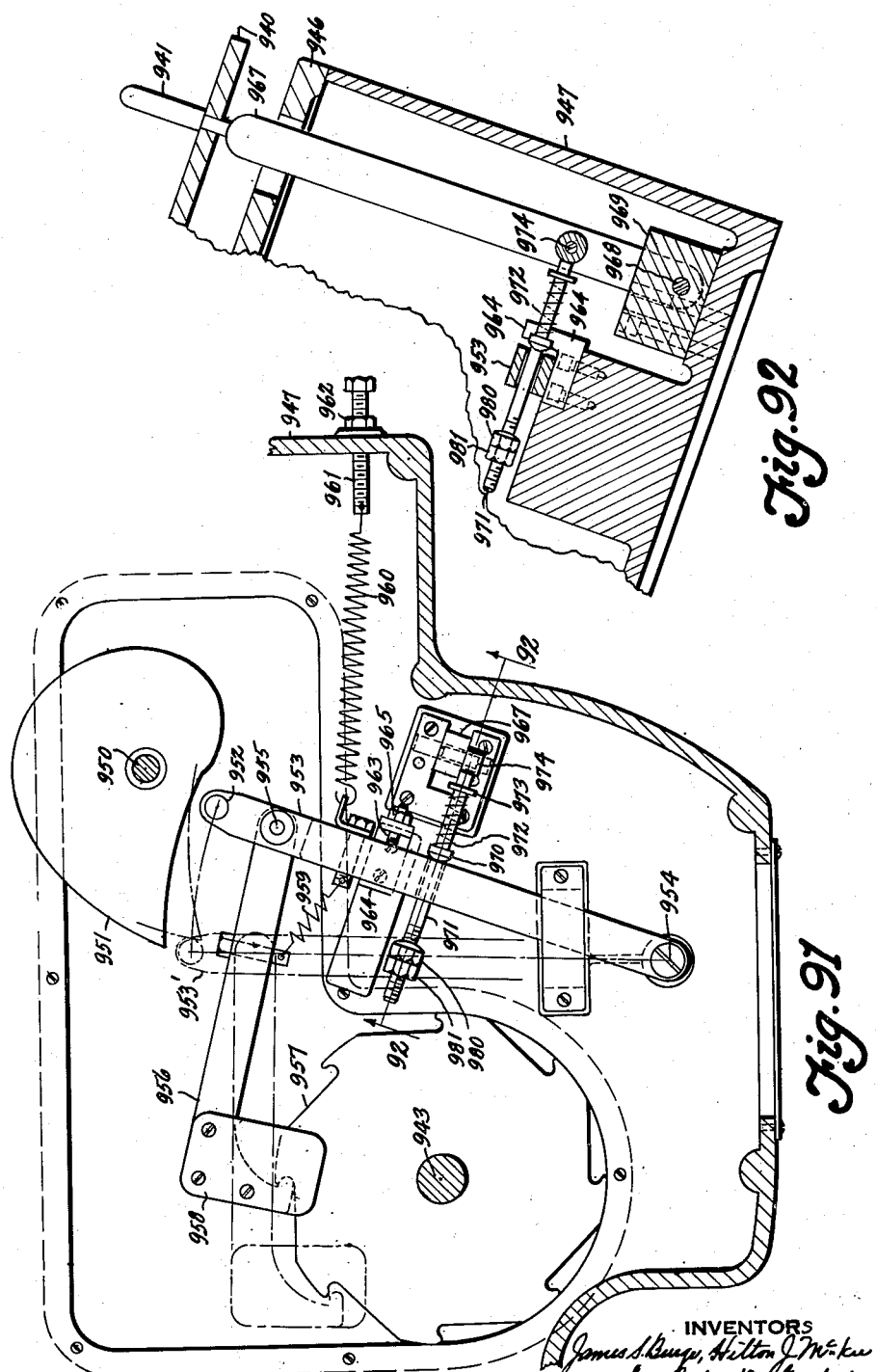
Jan. 6, 1953     J. S. BURGE ET AL     2,624,374
MACHINE FOR MAKING ELECTRICAL COILS
Filed March 11, 1947     46 Sheets-Sheet 40

Jan. 6, 1953     J. S. BURGE ET AL     2,624,374
MACHINE FOR MAKING ELECTRICAL COILS
Filed March 11, 1947     46 Sheets-Sheet 41

INVENTORS
James S. Burge, Hilton J. McKee
BY Richard M. Goodwin
Spencer, Hardman & Feher
their ATTORNEYS

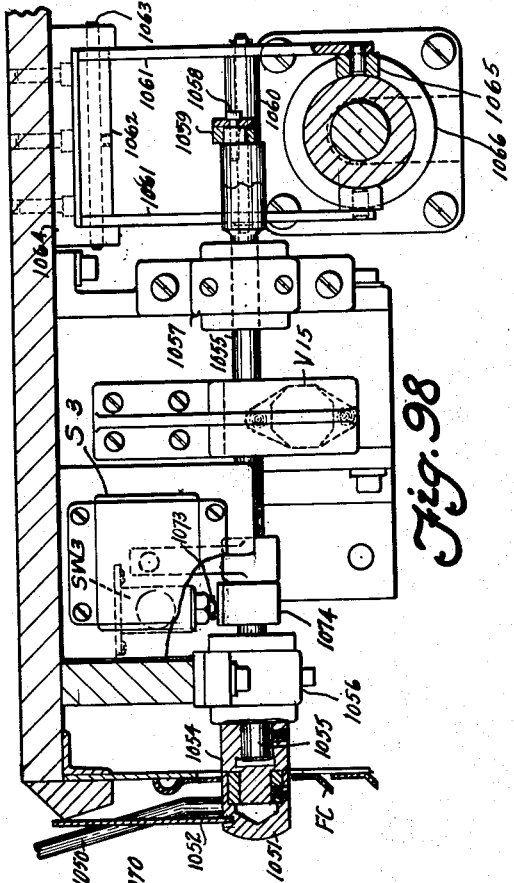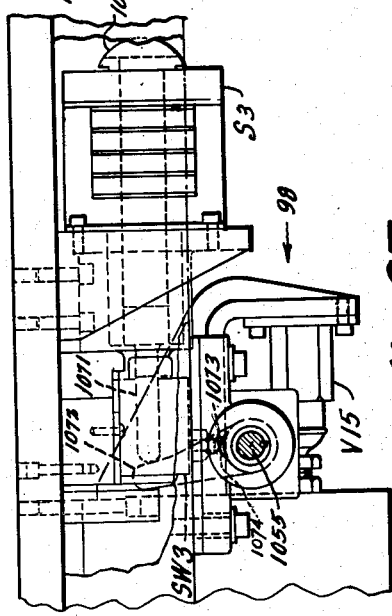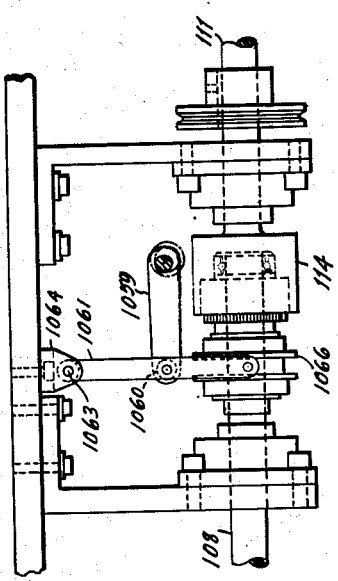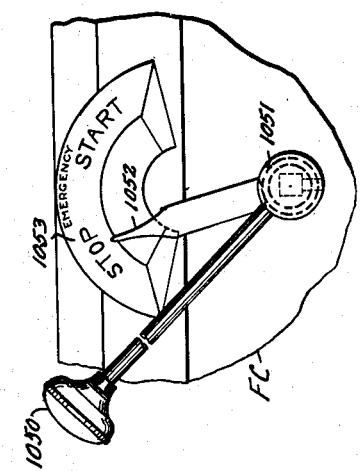

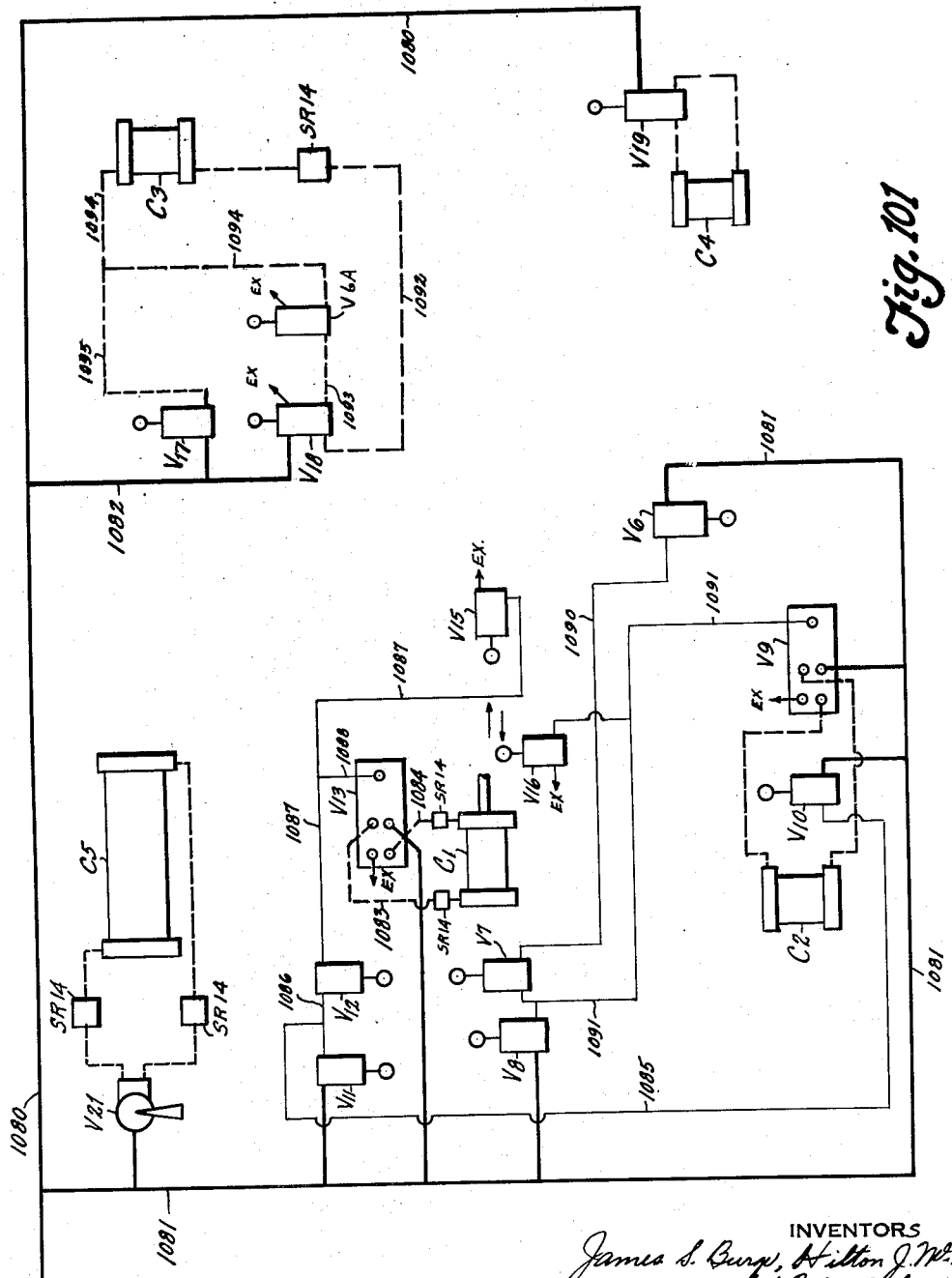

Jan. 6, 1953   J. S. BURGE ET AL   2,624,374
MACHINE FOR MAKING ELECTRICAL COILS
Filed March 11, 1947   46 Sheets-Sheet 44

INVENTORS
James S. Burge, Hilton J. McKee
and Richard M. Goodwin
BY Spencer Hardman & Fehr
their attorneys Patented Jan. 6, 1953

2,624,374

UNITED STATES PATENT OFFICE 2,624,374

MACHINE FOR MAKING ELECTRICAL COILS

James S. Burge, Anderson, Hilton J. McKee, Middletown, and Richard Marcus Goodwin, Anderson, Ind., assignors to General Motors Corporation, Detroit, Mich., a corporation of Delaware Application March 11, 1947, Serial No. 733,758

20 Claims. (Cl. 140—92.2)

This invention relates to the manufacture of electric coils, for example, pre-wound armature coils to be assembled with the slotted armature core of a dynamo-electric-machine.

An object of the invention is to provide a machine which winds wire upon a form to provide a coil and applies tape to the coil to retain its shape before removal of the coil from the form. This object is accomplished by the use of a turret or dial carrying a plurality of form halves adapted to be placed successively in contact with a form half rotated by a winding mechanism provided by the machine which operates automatically to wind wire upon the contacting form halves. At the completion of winding the wound coil is locked to the form half carried by the dial and said form half is retracted from the form half provided by the winding mechanism. The dial is indexed to carry the coil to a station where a liquid is applied to the portions of the coil which are to receive the tape. The dial is indexed to carry the coil to a station when the tape is applied, the sticking of the tape to the coil being facilitated by the liquid applied. The dial is indexed to an ejection station when the coil is unlocked from its supporting form half; and an ejector causes the taped coil to gravitate upon a stacking rack. The empty form half is conditioned to receive the next coil to be wound thereon. Each indexing of the dial brings an empty form half to the winding station where it is in alignment with the form half of the winding mechanism and the aligned form halves are caused to engage; and the winding of wire thereon takes place while other coils carried by the dial are located respectively at the liquid-applying, tape-applying and ejecting stations.

Further objects and advantages of the present invention will be apparent from the following description, reference being had to the accompanying drawings, wherein a preferred embodiment of the present invention is clearly shown.

In the drawings:

Figs. 1 and 2 taken together constitute a front view of the machine.

Figs. 3 and 4 taken together constitute a left side view of the machine.

Fig. 5 is a view from the right side showing principally the wire unreeling mechanism.

Figs. 6 and 7 are fragmentary sectional views taken respectively on the lines 6—6 and 7—7 of Fig. 5.

Fig. 9 is a fragmentary rear view showing a portion of the wire unreeling mechanism.

Fig. 10 is a plan view showing the principal driving shafts of the machine.

Fig. 11 is a left end view of part of the mechanism between the base and the table.

Fig. 11A is a view in the direction of arrow 11A of Fig. 11.

Figs. 12 and 13 taken together constitute a front elevation of the mechanism between the table and the base.

Fig. 13A shows a detail of the mechanism shown in Fig. 13.

Fig. 13B is a view in the direction of arrow 13A of Fig. 13A.

Fig. 14 is a sectional view on line 14—14 of Fig. 13.

Fig. 15 is a view in the direction of arrow 15 of Fig. 14.

Figure 16:
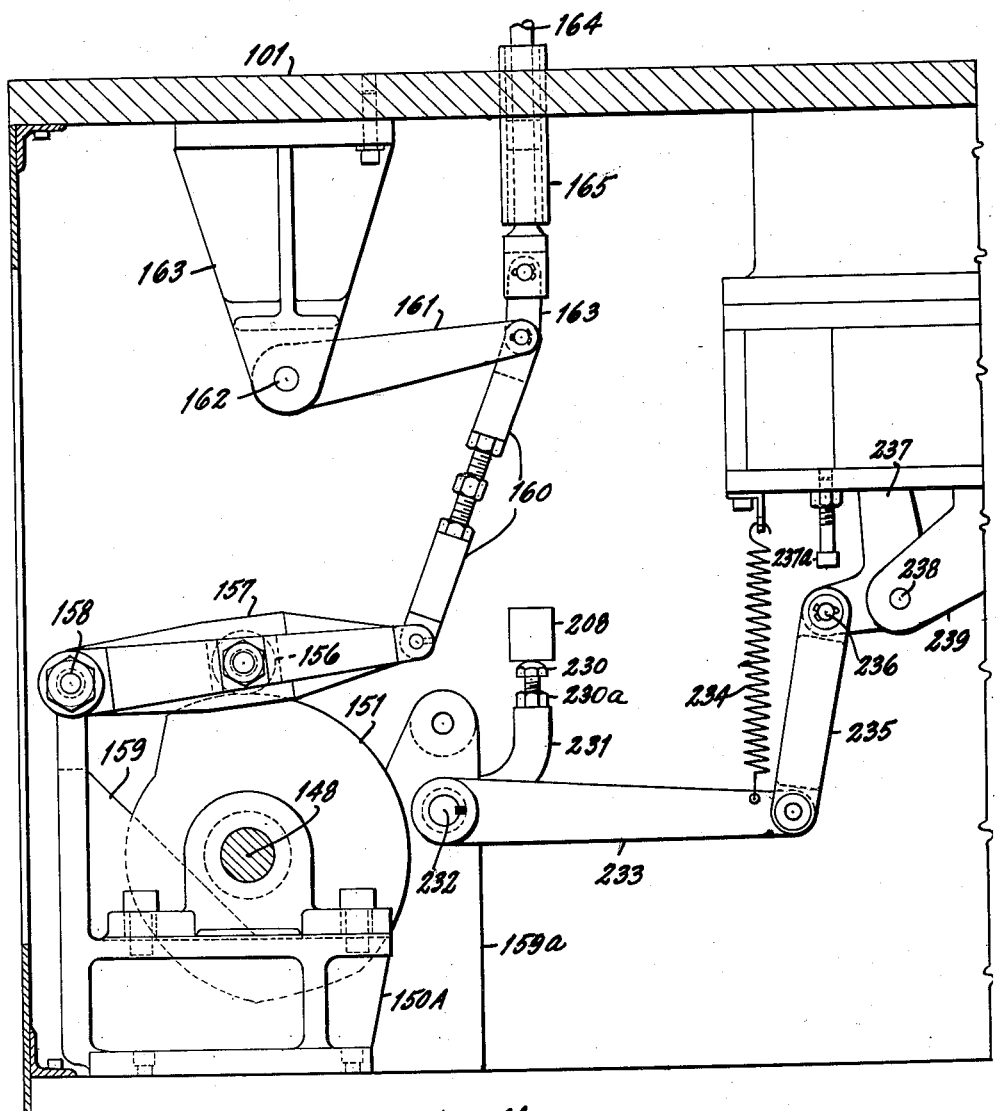

Fig. 16 is a sectional view on line 16—16 of Fig. 13.

Figure 17:
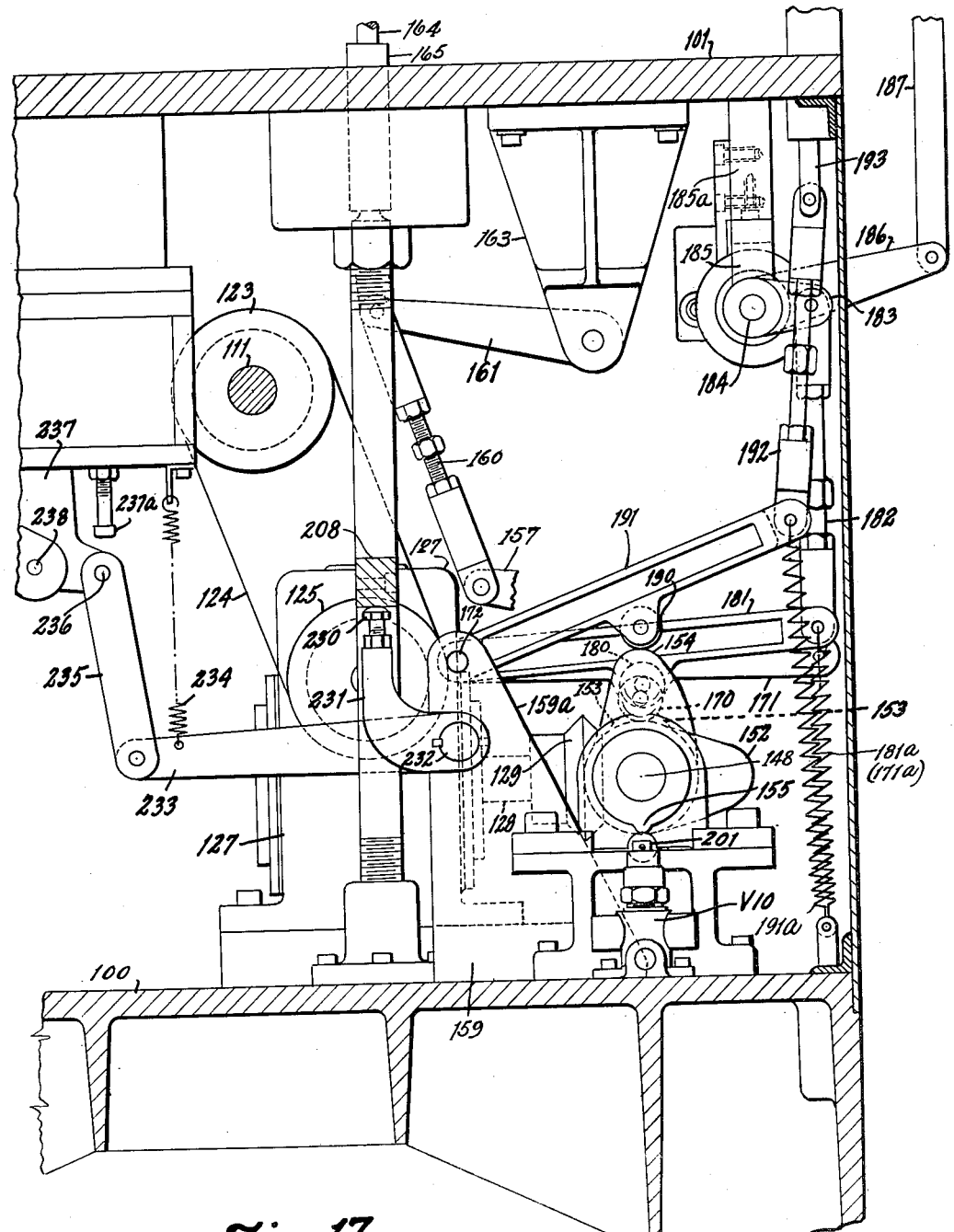

Fig. 17 is a sectional view on line 17—17 of Fig. 13.

Figure 18:
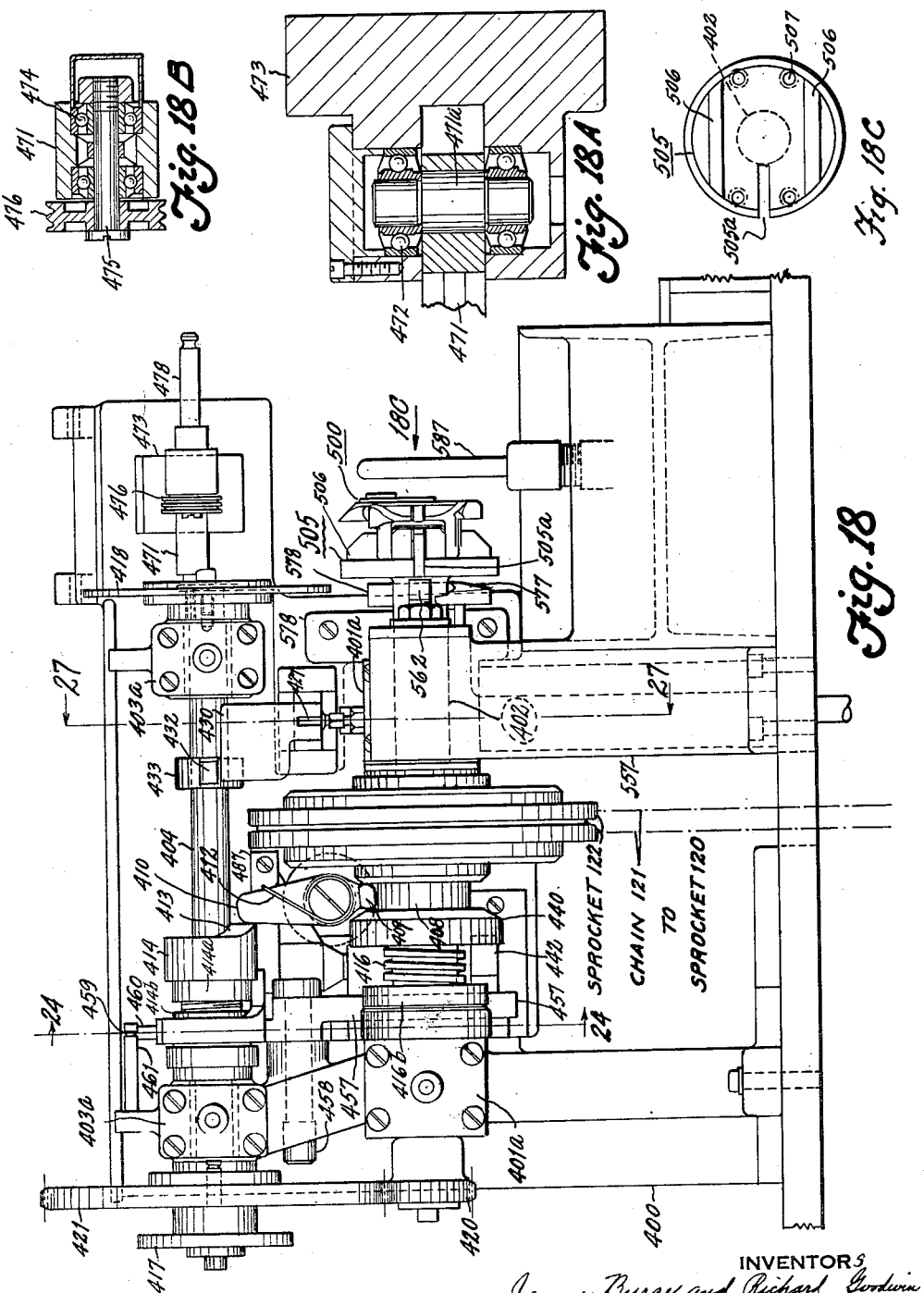

Fig. 18 is a front elevation of the coil winding mechanism.

Figure 19:
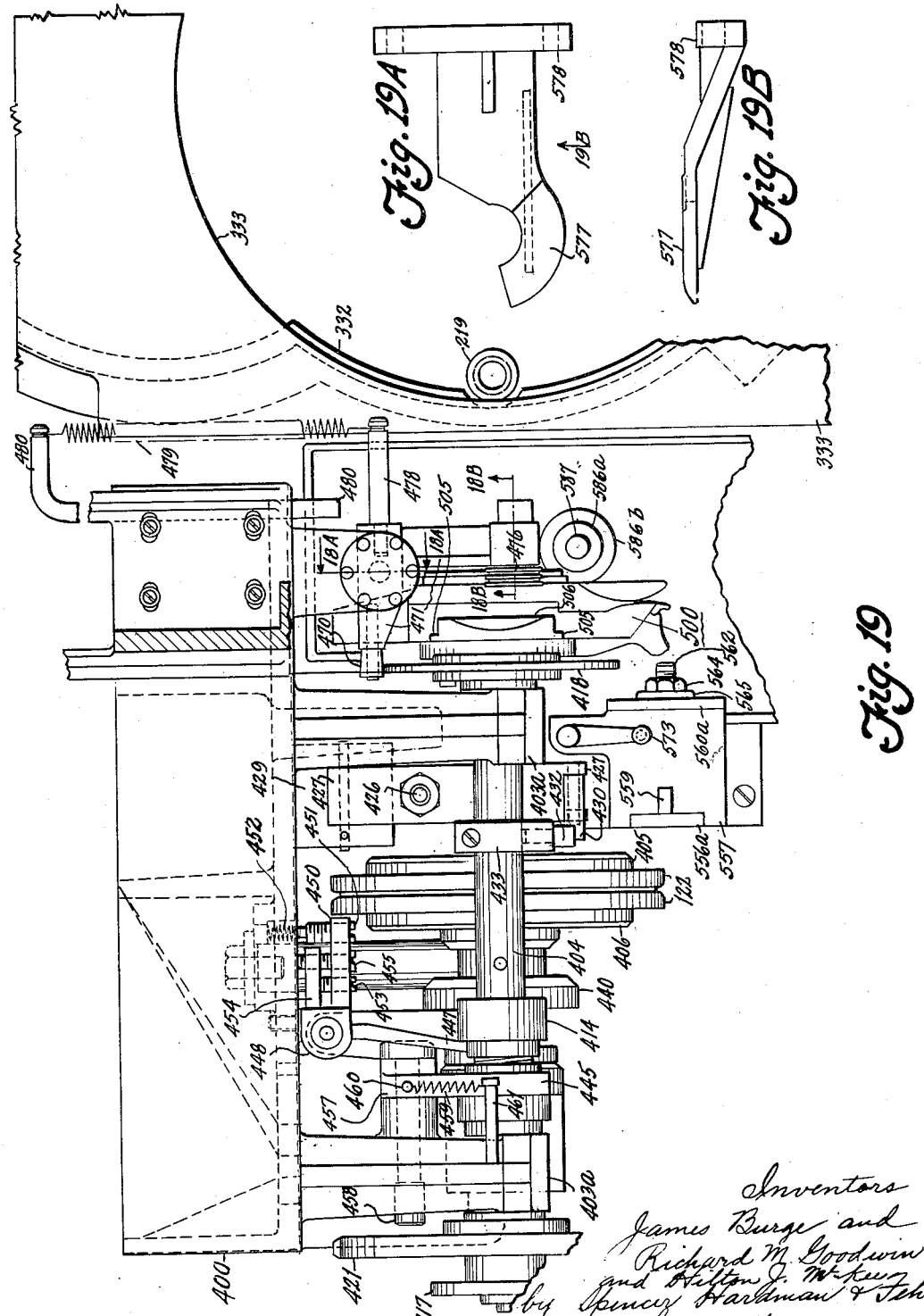

Figs. 18A and 18B are sectional views taken respectively on lines 18A—18A and 18B—18B of Fig. 19. Fig. 18C is an end view of shaft 402 in the direction of arrow 18C of Fig. 18 with the form 500 removed.

Fig. 19 is a plan view of the coil winding mechanism.

Fig. 19A is a view of cam 577 looking in the direction of arrow 18C of Fig. 18.

Fig. 19B is a view of said cam looking in the direction of arrow 19B of Fig. 19A.

Figures 20, 20A, 21:
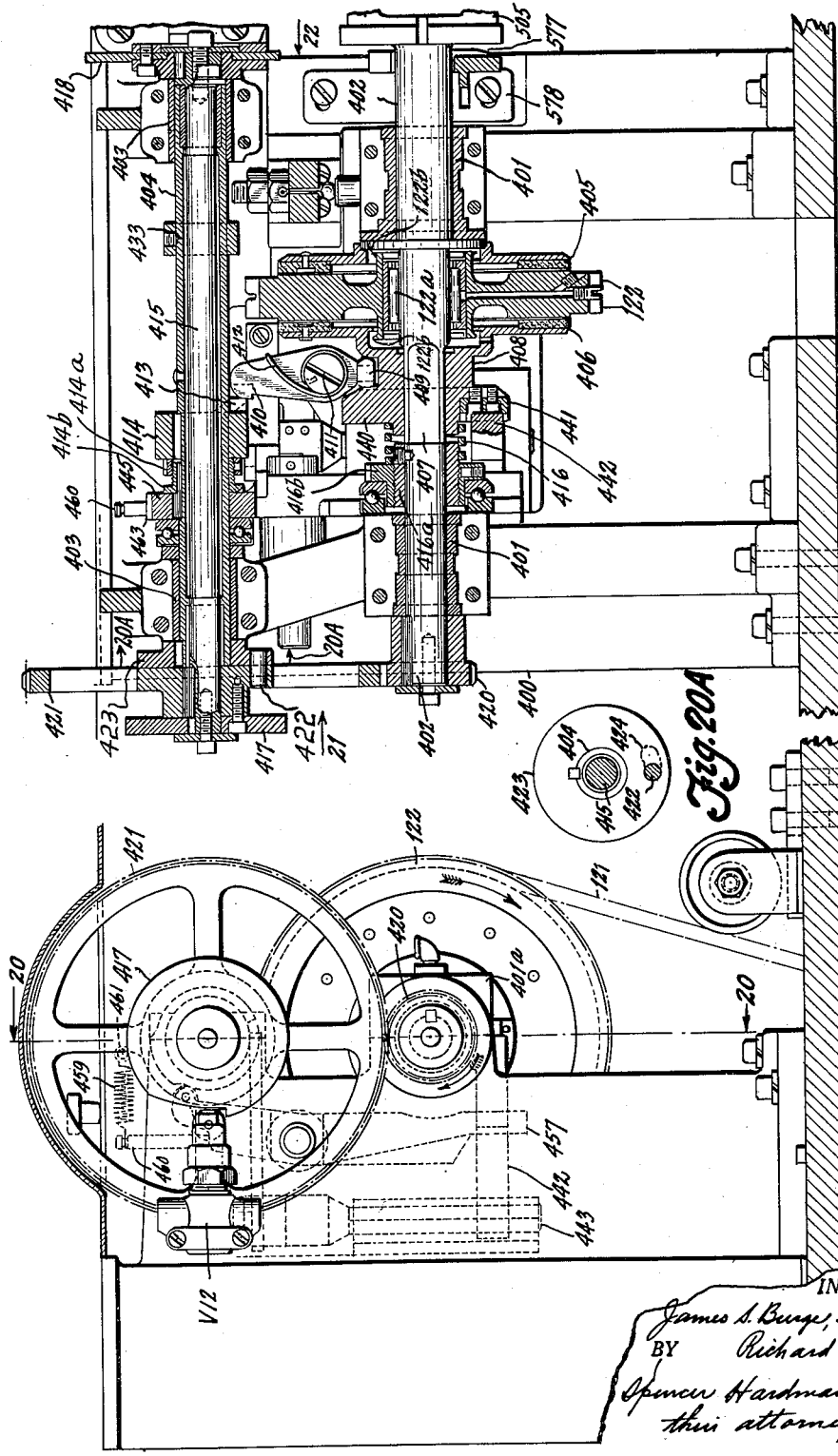

Fig. 20 is a sectional view on line 20—20 of Fig. 21.

Fig. 20A is a sectional view on line 20A—20A of Fig. 20.

Fig. 21 is an end view taken in the direction of arrow 21 of Fig. 20.

Fig. 22 is an end view taken in the direction of arrow 22 of Fig. 20.

Fig. 22A is an enlargement of a part of Fig. 22 looking in the direction of arrow 22A of Fig. 23.

Fig. 22B is a view in the direction of arrow 22B of Fig. 22A.

Fig. 23 is a plan view, in the direction of arrow 23 of Fig. 22, of the mercury switches which are responsive to exhaustion or breakage of wire for causing the machine to stop.

Fig. 23A is a sectional view on line 23A—23A of Fig. 22A.

Fig. 24 is a fragmentary sectional view on line 24—24 of Fig. 18.

Fig. 24A is a fragmentary sectional view on line 24A—24A of Fig. 24.

Fig. 25 is a view in the direction of arrow 25 of Fig. 24.

Fig. 26 is a fragmentary sectional view on line 26—26 of Fig. 24.

Fig. 26A is a view in the direction of arrow 26A of Fig. 26, the part in section being on line 26A—26A of Fig. 24.

Fig. 27 is a fragmentary sectional view on line 27—27 of Fig. 18.

Fig. 28 is a fragmentary side elevation of the mechanism for operating the wire cut-off of the coil winding mechanism (sectional portion on line 28—28 of Fig. 29).

Fig. 29 is a fragmentary view looking in the direction of arrow 29 of Fig. 28.

Fig. 30 is a fragmentary view looking in the direction of arrow 30 of Fig. 28.

Fig. 30A is a fragmentary sectional view on line 30A—30A of Fig. 30.

Fig. 31 is a front view of the winding head half of the winding form.

Fig. 32 is a side view thereof.

Fig. 33 is a view of the frame of the winding form looking in the direction of arrow 33 of Fig. 32.

Fig. 34 shows in perspective two of the cutter bars in disassembled relation.

Figs. 35, 36, 37 and 38 shows successive operations performed by the cutter bars.

Fig. 39 is a side view of a stationary cutter.

Figure 40:
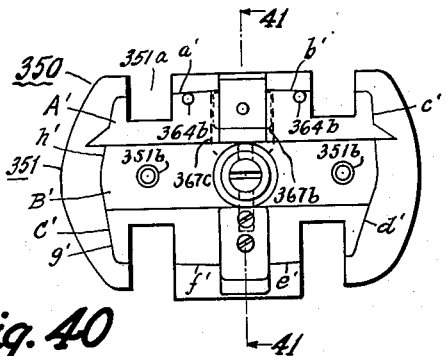

Fig. 40 is a front view of the dial half of the winding head form.

Figure 41:
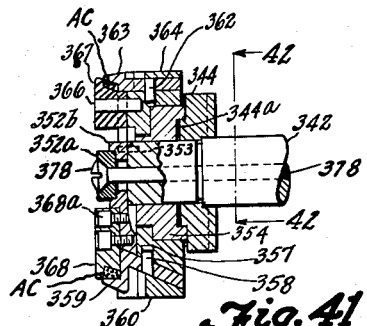

Fig. 41 is a sectional view on line 41—41 of Fig. 40.

Figure 42:
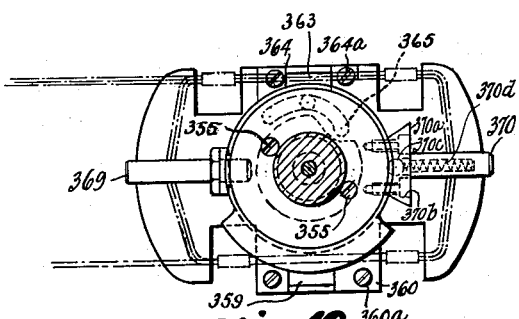

Fig. 42 is a sectional view on line 42—42 of Fig. 41.

Figures 43, 44:
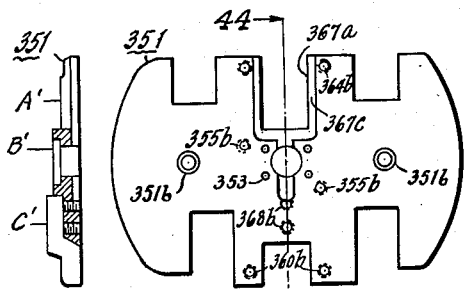

Fig. 43 is a back view of the form frame.

Fig. 44 is a sectional view on line 44—44 of Fig. 43.

Figures 45, 46, 48, 49, 51:
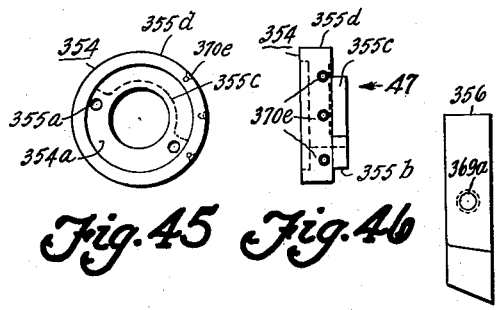
Figure 50:
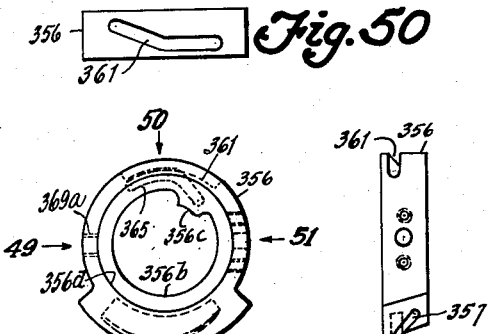

Fig. 45 is a view of a cam support included in the dial half of the winding form.

Fig. 46 is a side view thereof.

Figure 47:
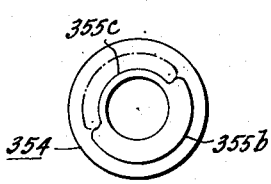
Figure 52:

Fig. 47 is a view in the direction of arrow 47 of Fig. 46.

Fig. 48 is a back view of the cam supported by the part shown in Fig. 45.

Figs. 49, 50, 51 and 52 are side views looking respectively in the direction of arrows 49, 50, 51 and 52 of Fig. 48.

Figure 53:
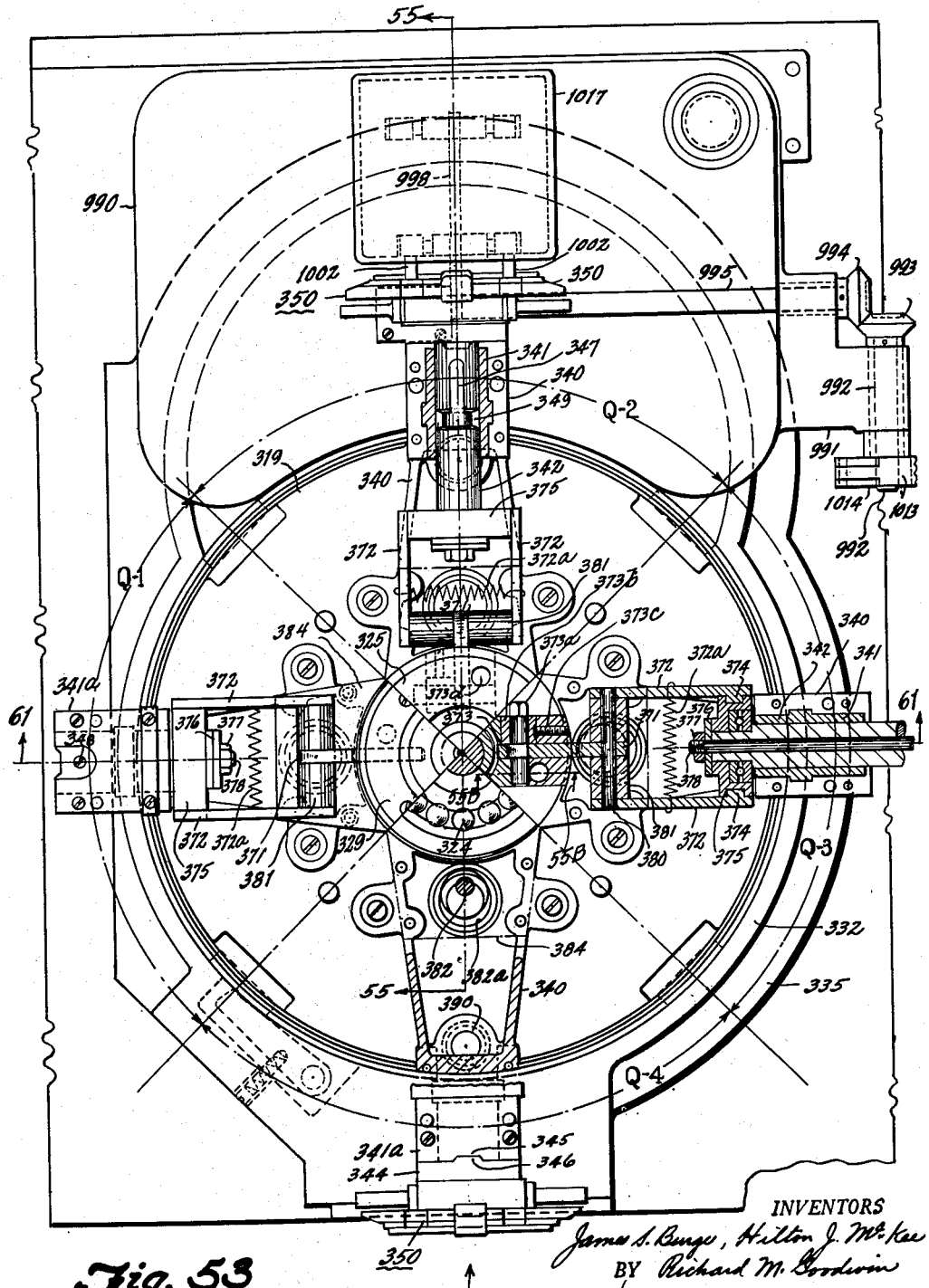

Fig. 53 is a plan view partly in section of the rotary dial or turret which carries four of the forms shown in Figs. 40 to 52. Quadrant $Q_1$ shows a plan view. Quadrant $Q_2$ shows the turret cap and form-bearing cover removed. Quadrant $Q_3$ is a section on line 53B—53B of Fig. 55. Quadrant $Q_4$ is a section on line 53C—53C of Fig. 55.

Figure 53A:
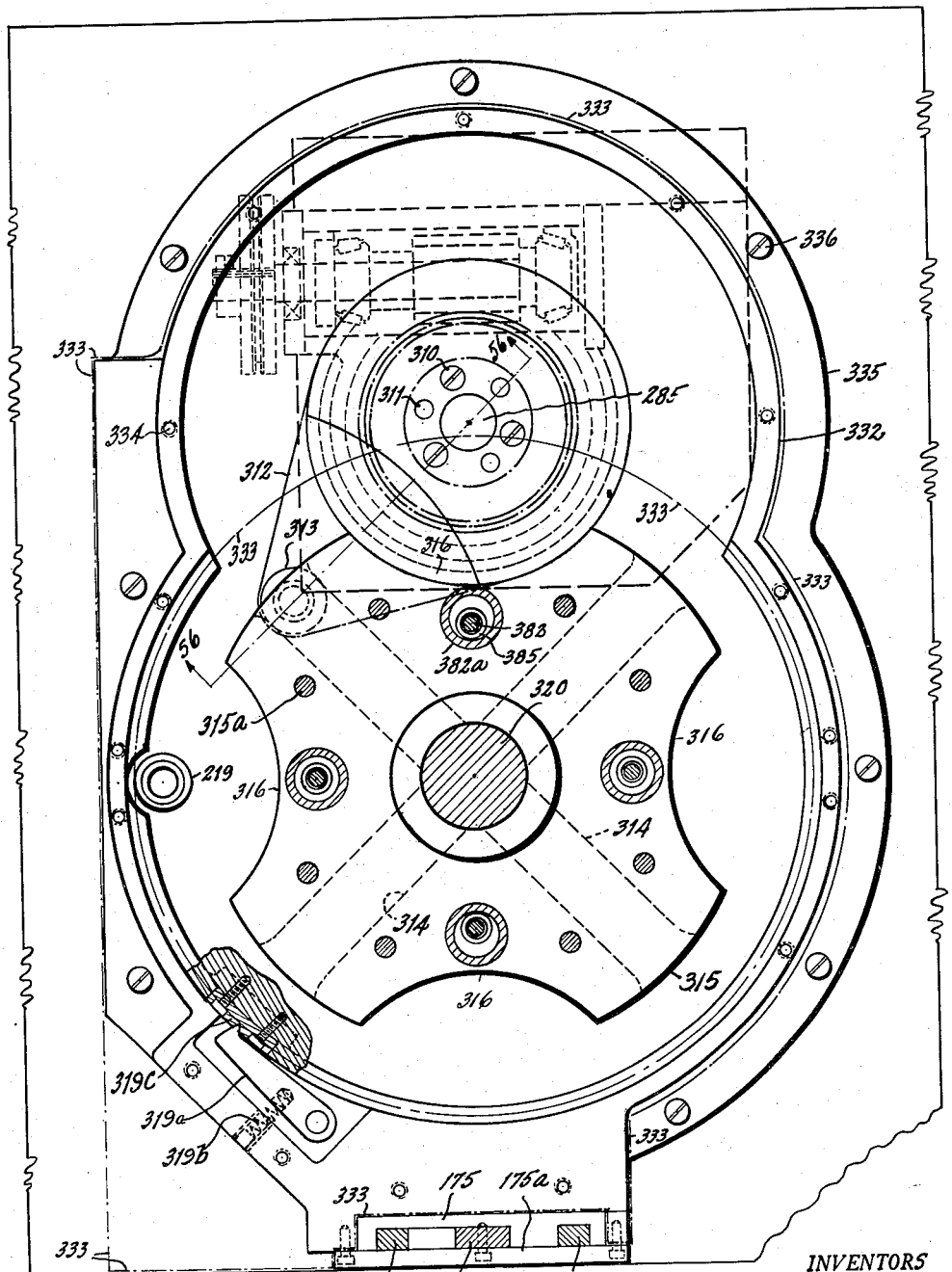

Fig. 53A is a sectional view on line 53A—53A of Fig. 55.

Fig. 54 is a view in the direction of arrow 54 of Fig. 53.

Figs. 54A and 54B show fragments of a mechanism of Fig. 54 in different positions.

Figs. 54C and 54D are sectional views on lines 54C—54C and 54D—54D of Fig. 54B.

Fig. 55 is a sectional view taken on line 55—55 of Fig. 53.

Fig. 55A is a fragmentary view in the direction of arrow 55A of Fig. 55. Fig. 55B is a sectional view on line 55B—55B of Fig. 53.

Fig. 56 is a fragmentary sectional view on line 56—56 of Fig. 53A when the Geneva driving arm has been rotated 45° counterclockwise from the position shown.

Fig. 57 is a sectional view on line 57—57 of Figs. 55 and 58.

Fig. 58 is a view in the direction of arrow 58 of Fig. 57 and is partly in section generally on line 58—58 of Fig. 57.

Fig. 59 is a sectional view on line 59—59 of Fig. 57.

Fig. 59A is a sectional view on line 59A—59A of Fig. 59.

Fig. 60 is a sectional view on line 60—60 of Fig. 55.

Fig. 61 is a fragmentary sectional view on line 61—61 of Fig. 53.

Figure 62:
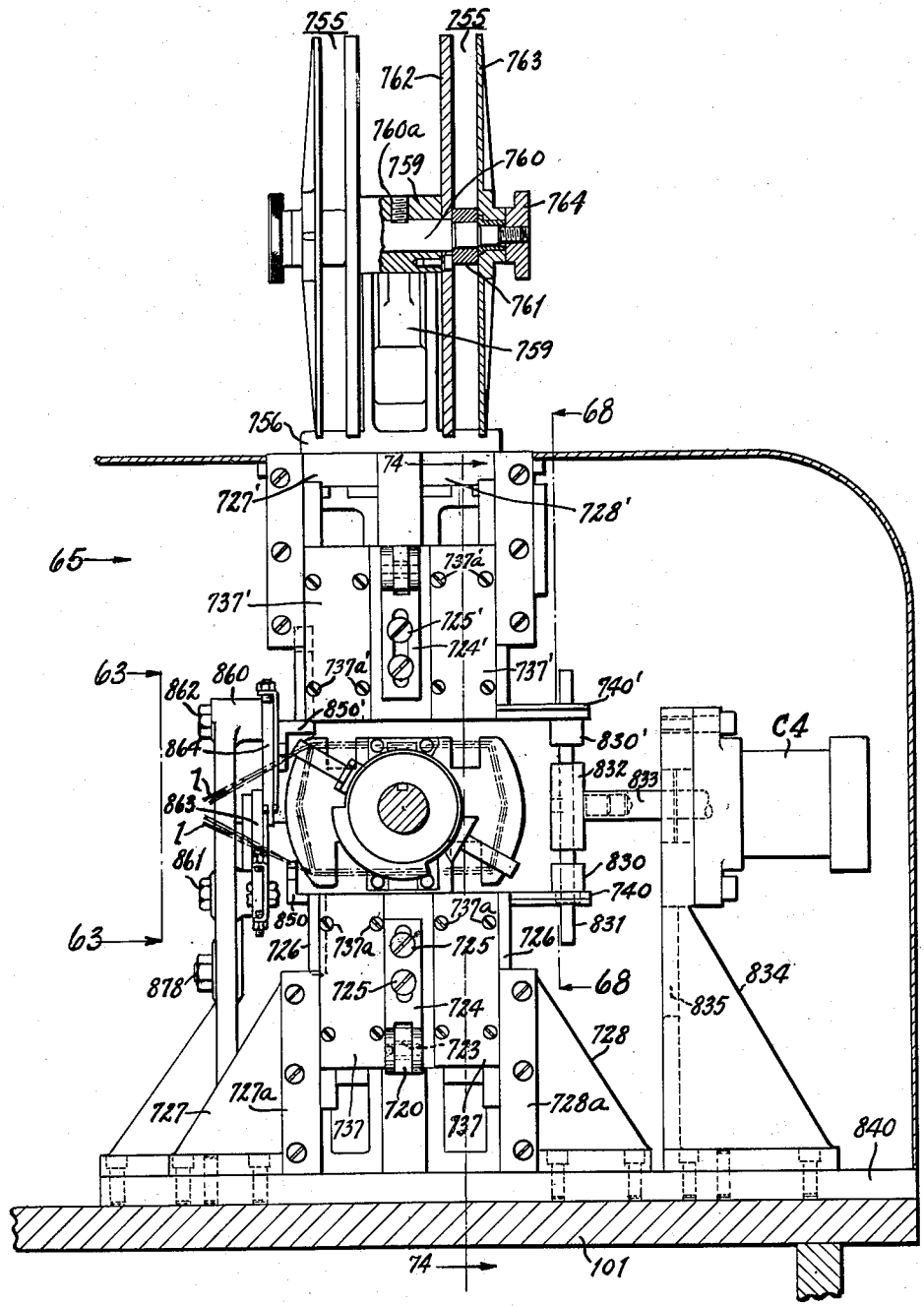

Fig. 62 is a front elevation of the coil taping apparatus.

Fig. 63 is a sectional view on line 63—63 of Fig. 62 and shows the coil spreading apparatus.

Fig. 63A is a diagram showing parts of Fig. 63 in other positions.

Fig. 64 is a view in the direction of arrow 64 of Fig. 63 of the coil spreading apparatus.

Figs. 64A and 64B are diagrams showing parts of Fig. 64 in other positions.

Figure 65:
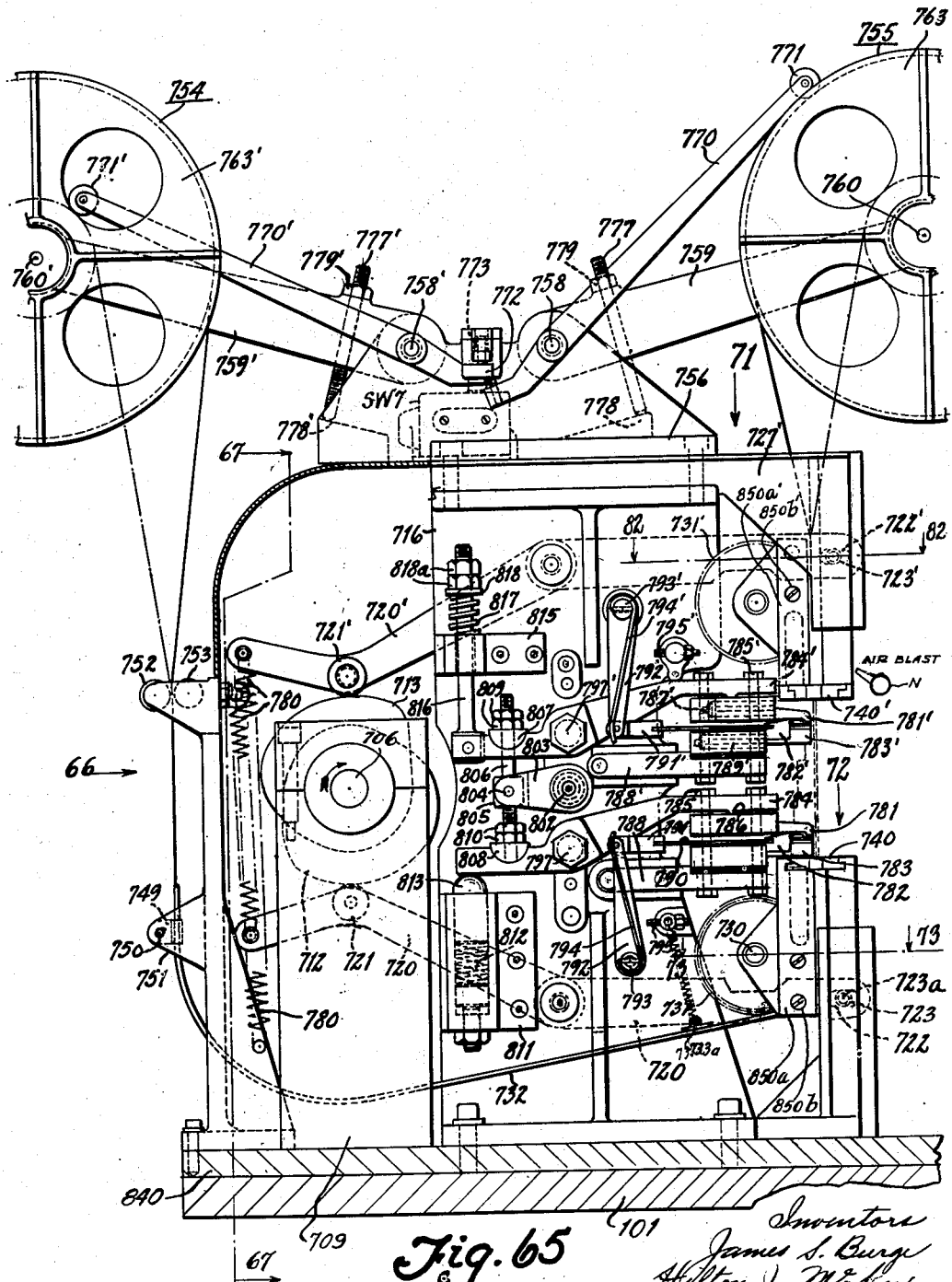

Fig. 65 is a side view of the coil taping apparatus looking in the direction of arrow 65 of Fig. 62.

Fig. 66 is a rear view of the taping apparatus looking in the direction of arrow 66 of Fig. 65.

Fig. 67 is a sectional view on line 67—67 of Fig. 65.

Fig. 68 is a sectional view on line 68—68 of Fig. 62.

Figs. 69 and 70 are views taken respectively in the direction of arrows 69 and 70 of Fig. 68, and include sectional views taken generally on lines 69—69 and 70—70.

Fig. 71 is a plan view in the direction of arrow 71 of Fig. 65.

Fig. 72 is a fragmentary plan view looking in the direction of arrow 72 of Fig. 65.

Fig. 73 is a fragmentary sectional view on line 73—73 of Fig. 65.

Fig. 74 is a fragmentary sectional view on line 74—74 of Fig. 62.

Fig. 75 is an enlarged side view showing the tape sealing parts shown in smaller scale in Fig. 68.

Fig. 76 is a view in the direction of arrow 76 of Fig. 75.

Fig. 77 is a sectional view on line 77—77 of Fig. 75.

Fig. 78 is a sectional view on line 78—78 of Fig. 75.

Figs. 79, 80 and 81 are diagrams showing the operation of tape sealing members.

Fig. 82 is a plan view of a mechanism for applying a liquid to the portions of the coils to which tape is to be applied. This figure includes a sectional view on line 82—82 of Fig. 65.

Fig. 82A is an enlargement of parts located in dot-dash circle 82A of Fig. 82.

Fig. 83 is a sectional view on line 83—83 of Fig. 82.

Fig. 84 is a sectional view on line 84—84 of Fig. 82.

Fig. 85 is a front elevation of the mechanism for ejecting coils from the dial.

Fig. 86 is a fragmentary sectional view on line 86—86 of Fig. 85.

Fig. 87 is a fragmentary view in the direction of arrow 87 of Fig. 85.

Fig. 88 is a plan view of the stacker dial.

Fig. 89 is a sectional view on line 89—89 of Fig. 88.

Fig. 90 is an elevation of one of the removable stacker units.

Fig. 91 is a sectional view on the line 91—91 of Fig. 89 and is drawn to an enlarged scale.

Fig. 92 is a sectional view on the line 92—92 of Fig. 91.

Figure 93:
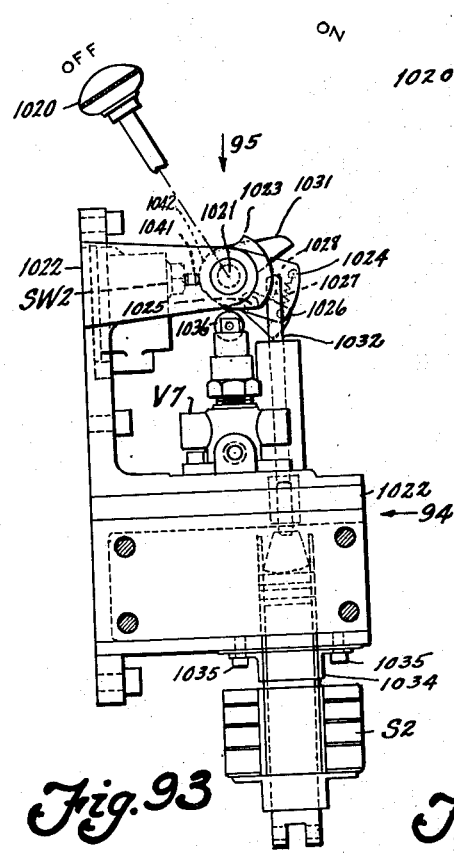

Fig. 93 is a front view of the end of cycle stop lever and mechanism controlled thereby.

Figure 94:
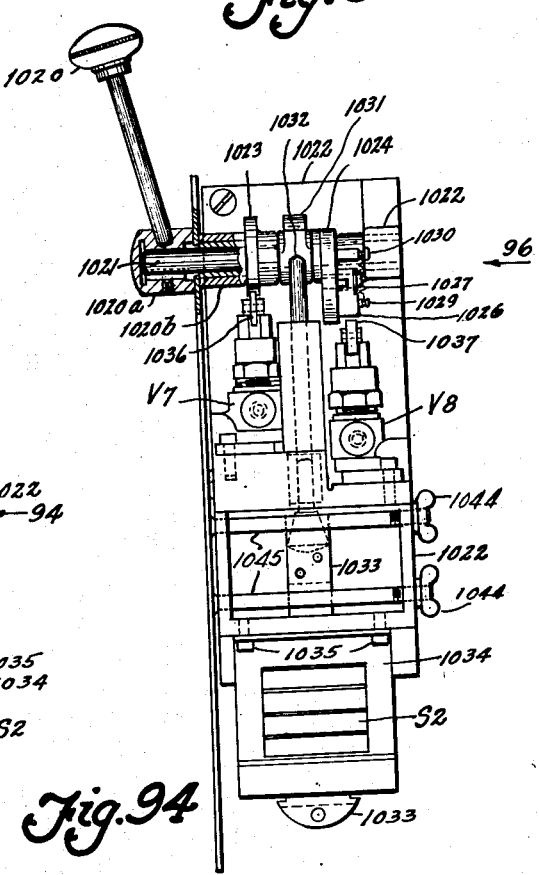

Fig. 94 is a view in the direction of arrow 94 of Fig. 93.

Figure 95:
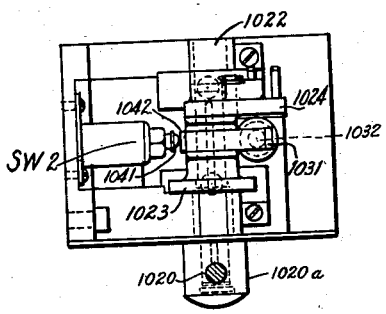

Fig. 95 is a view looking in the direction of arrow 95 of Fig. 93.

Figure 96:
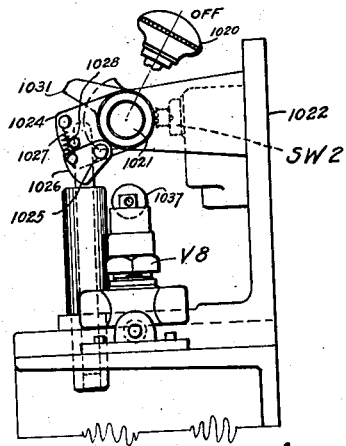

Fig. 96 is a view taken in the direction of arrow 96 of Fig. 94.

Fig. 97 is a front elevation of parts controlled by the emergency stop lever shown in Fig. 99.

Fig. 98 is a view in the direction of arrow 98 of Fig. 97.

Fig. 99 is a front elevation of the emergency stop lever.

Fig. 100 is a fragmentary side view of the clutch controlled by the emergency stop lever.

Fig. 101 is a diagram of the compressed air system of the machine.

Figure 102:
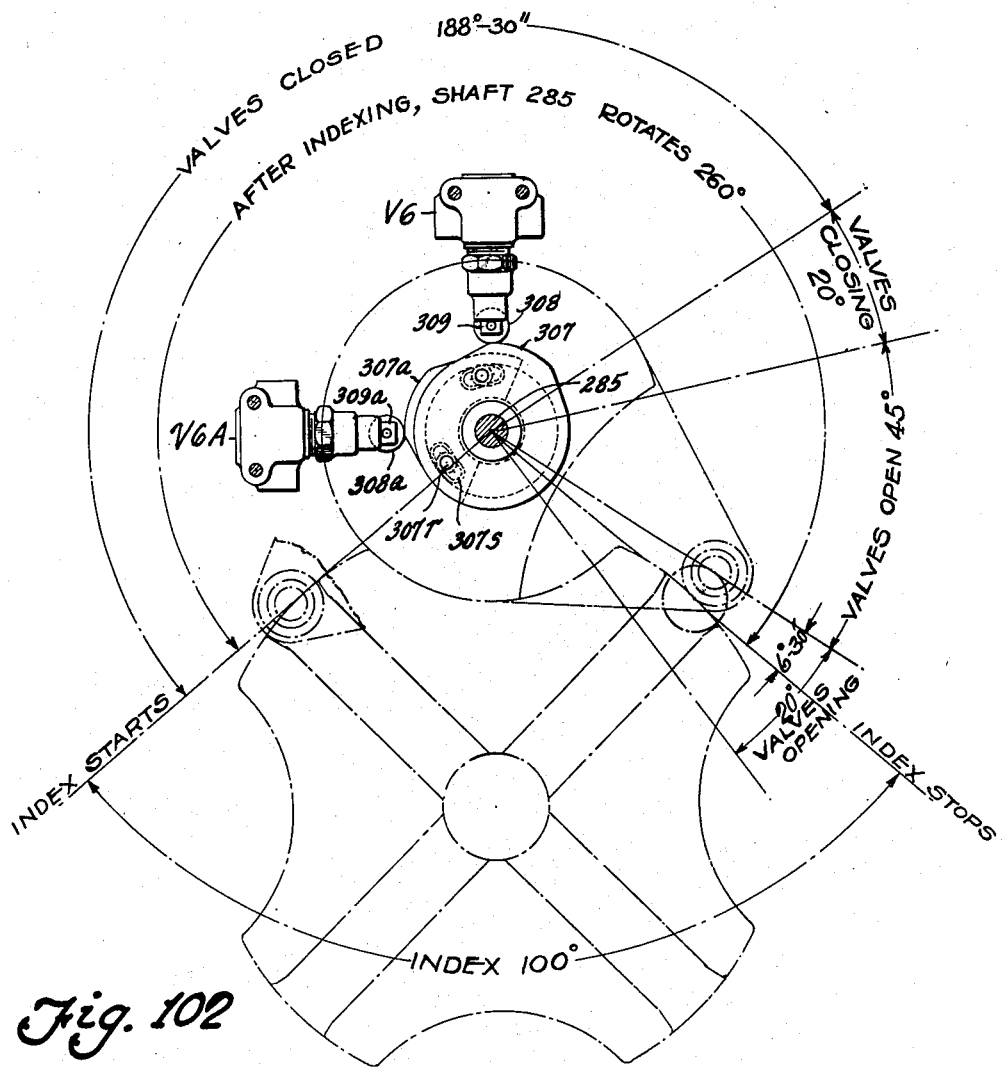

Fig. 102 is a diagram of operation of valves V6 and V6A.

Figure 103:
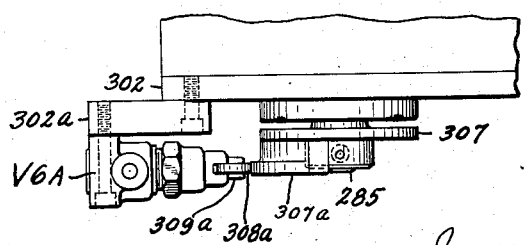

Fig. 103 is a side view of valve V6A and its operating cam.

Figure 104:
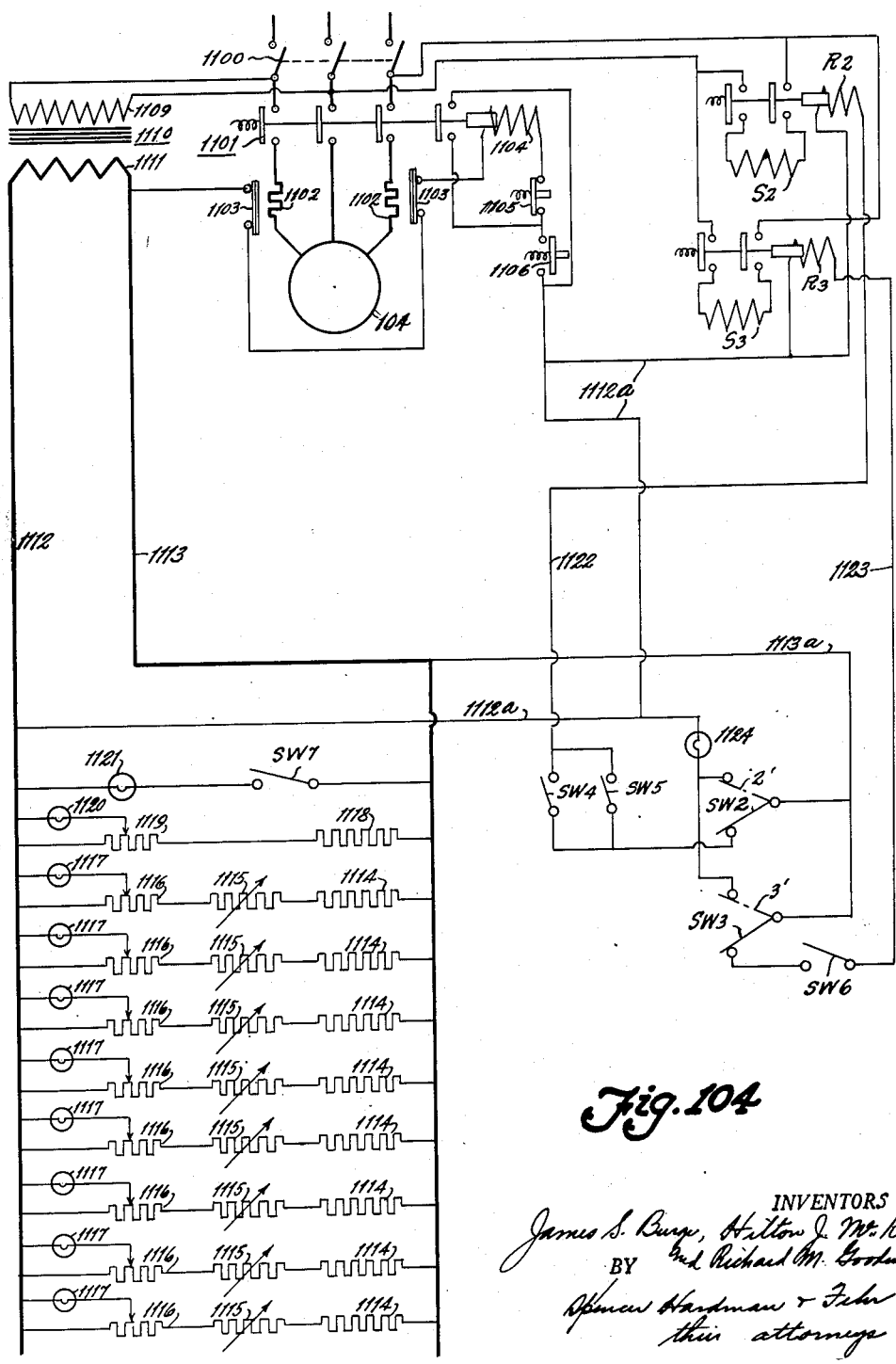

Fig. 104 is a diagram of the electrical system.

Figure 105:
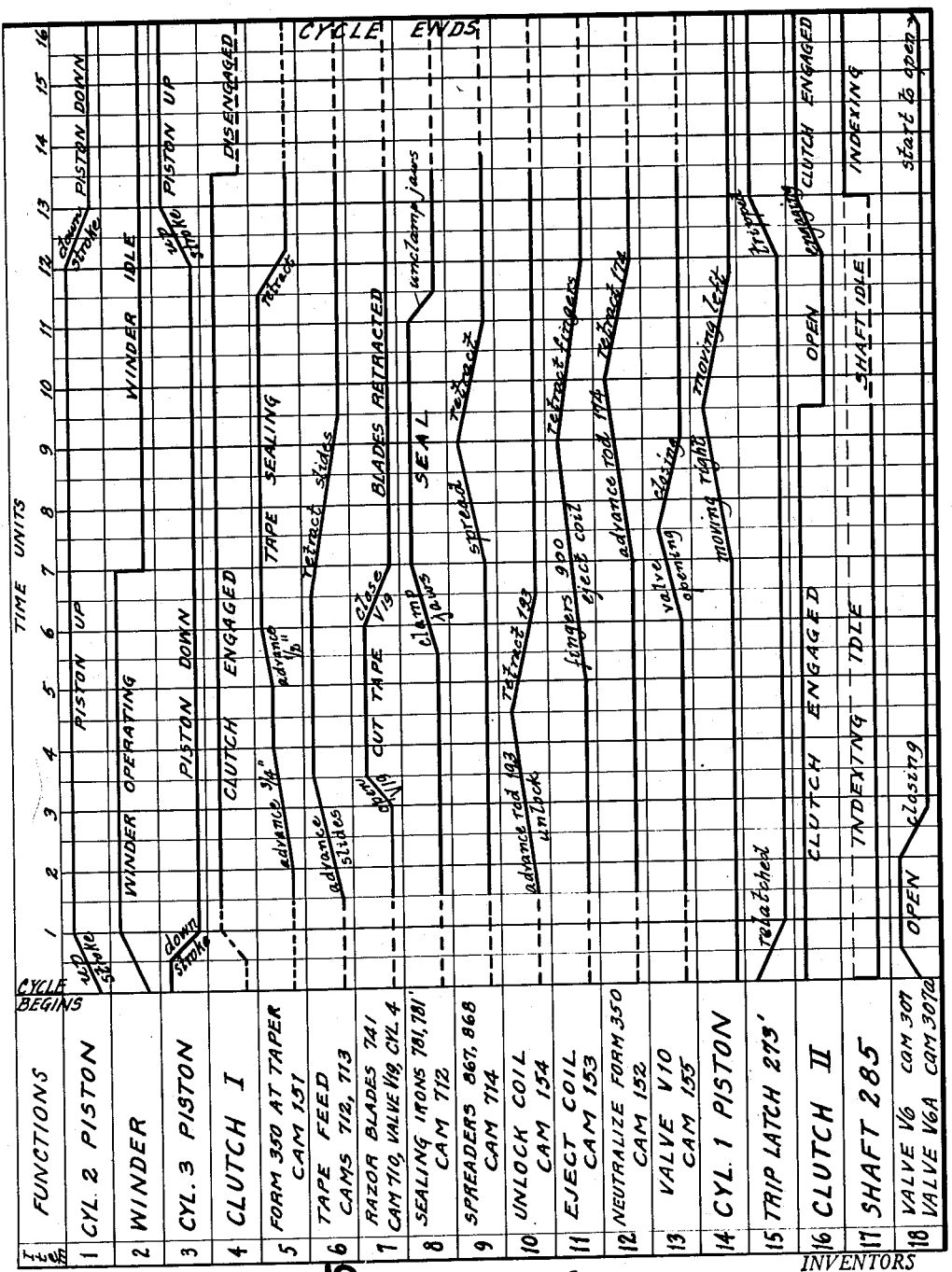

Fig. 105 is a chart showing the sequence of operations.

Figure 1:
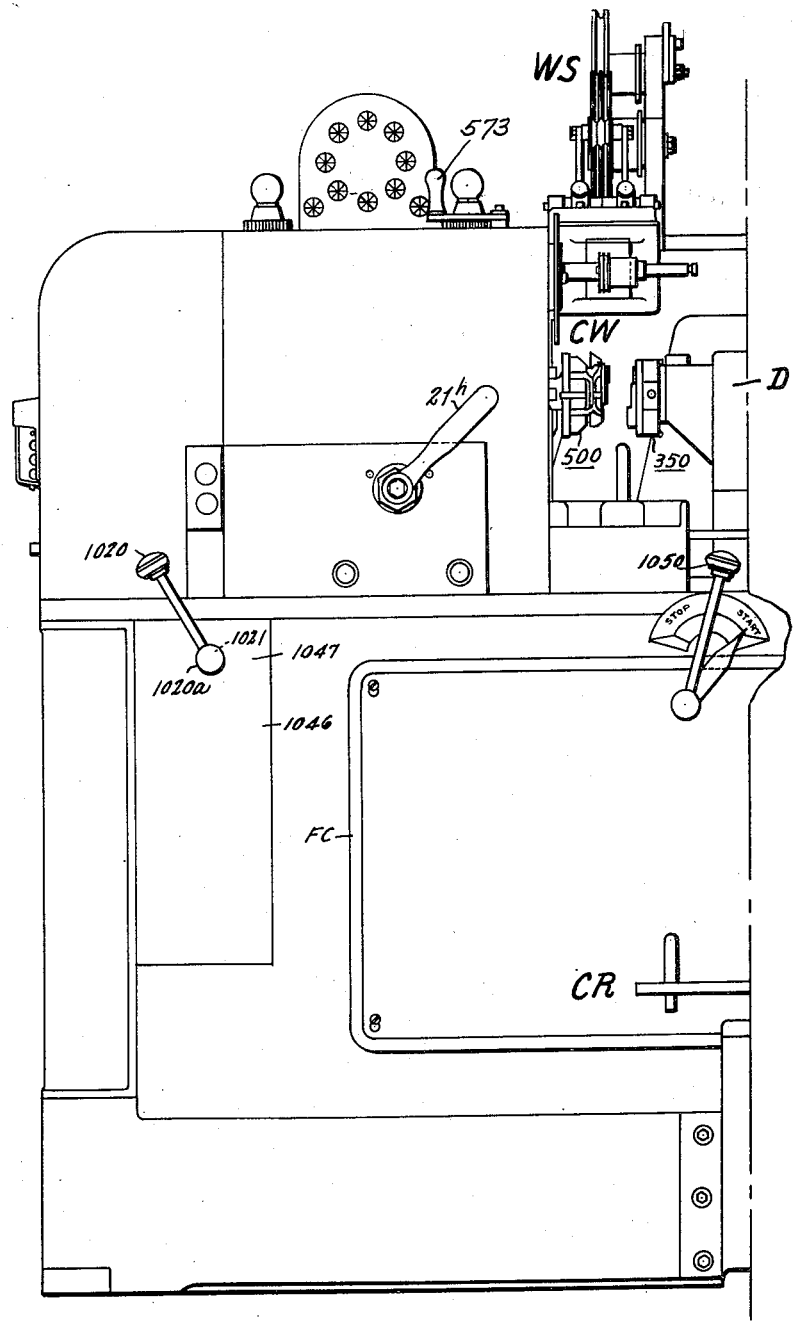
Figure 2:
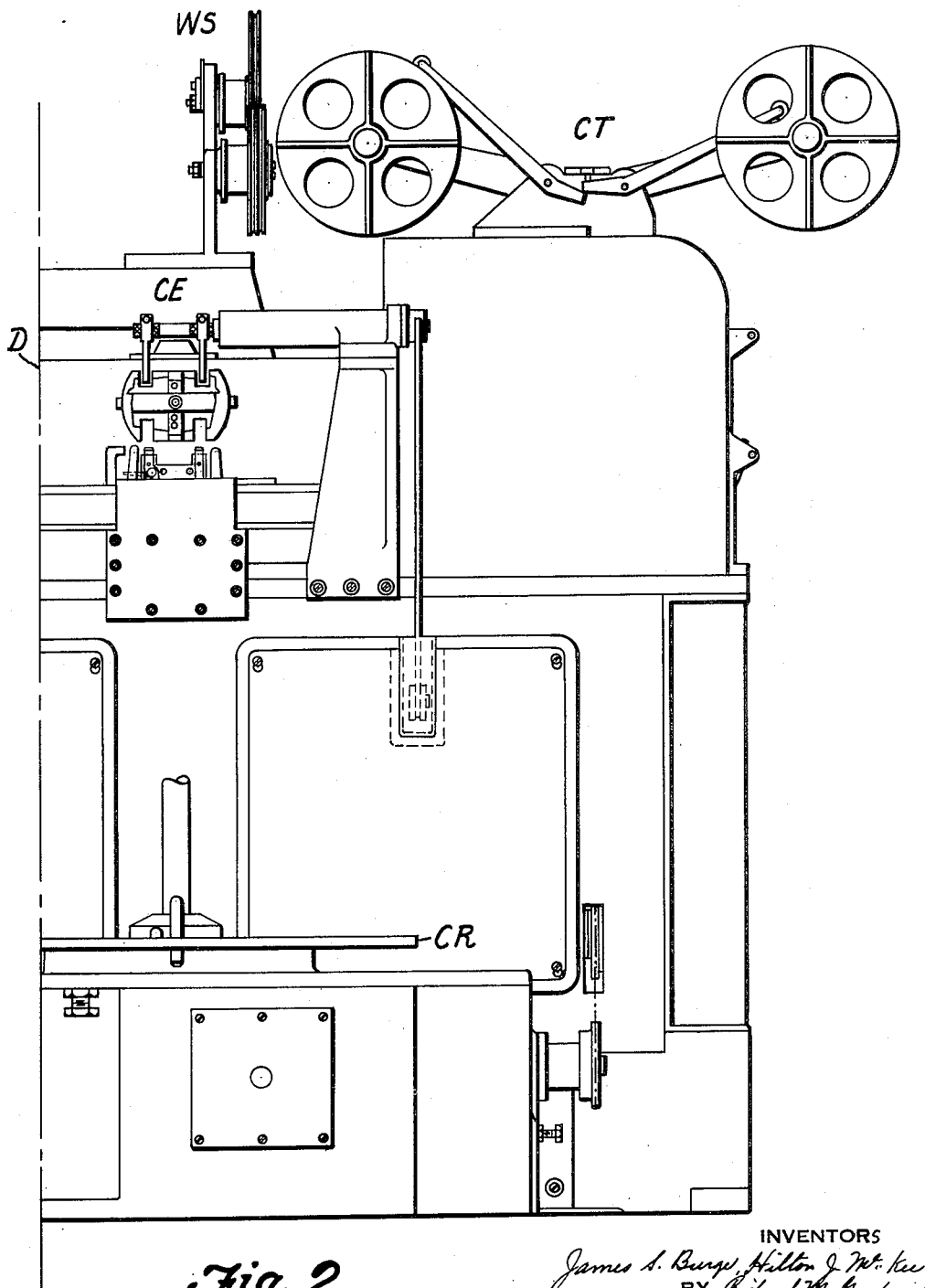
Figure 3:
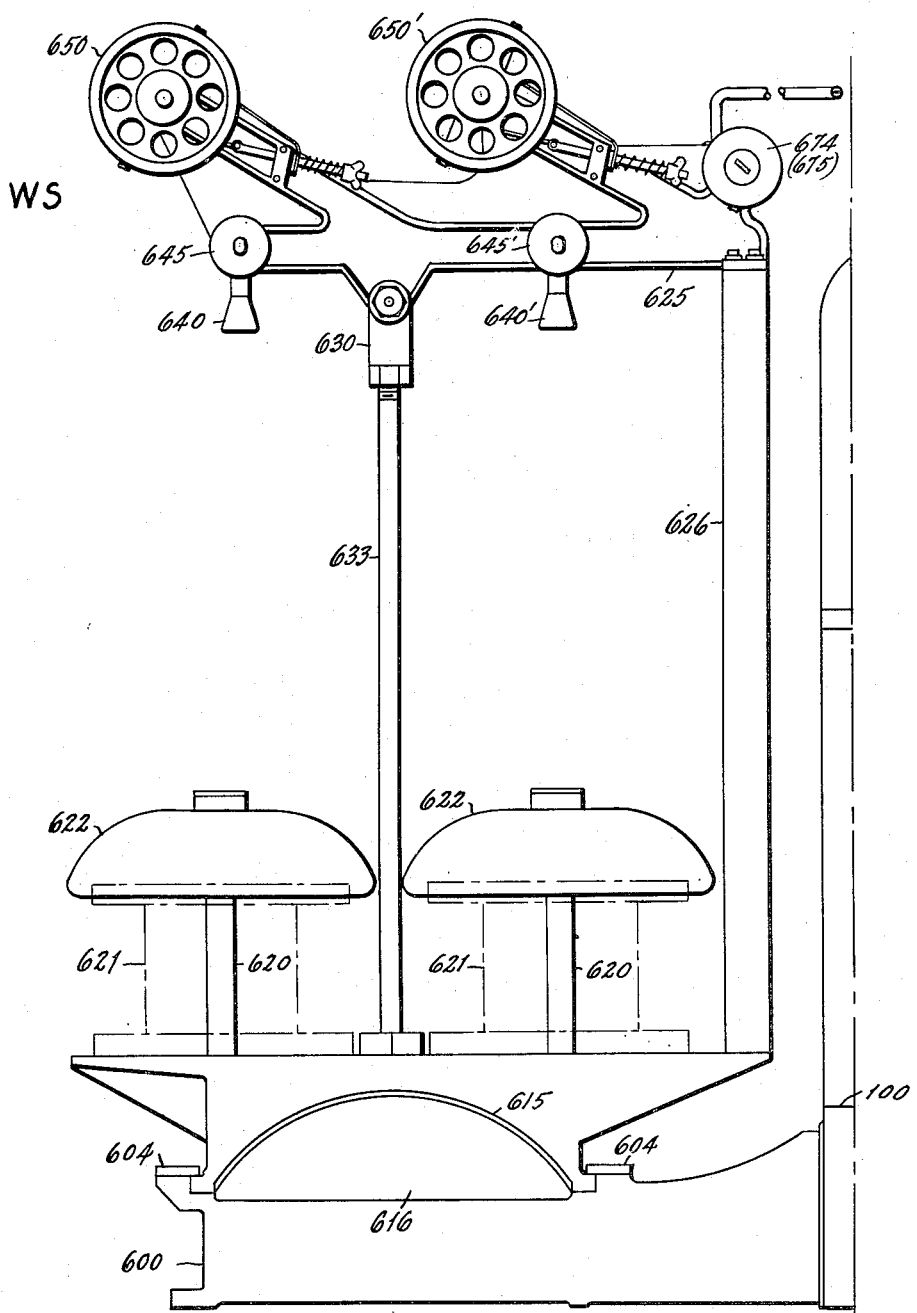
Figure 4:
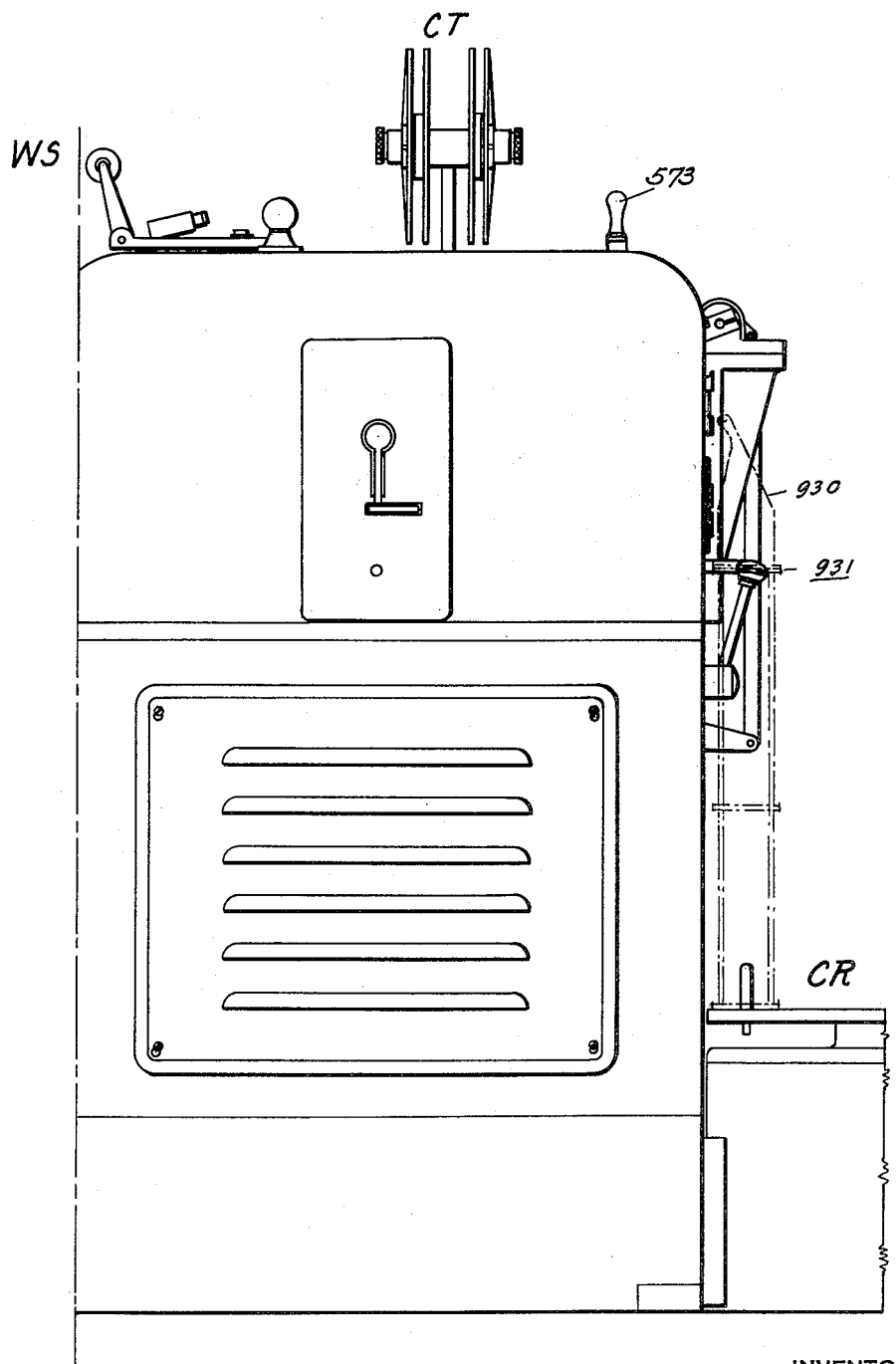

In general, the machine comprises a wire supply apparatus WS (Figs. 1–9) from which wire passes to an armature coil winding mechanism CW (Fig. 1), a rotating dial or turret D (Figs. 1 and 2) which carries a wound coil to a coil taping apparatus CT (Fig. 2) whereby the active coil sides of the coil are bound together by pieces of tape so that the coil will not become unwound, a coil ejecting apparatus CE (Fig. 2) which operates to remove a taped coil from a form carried by dial D, and a mechanism CR which moves intermittently a plurality of coil racks onto which the coils descend when they are ejected from a form carried by the dial D.

The coil winding mechanism CW, the dial D, the coil taping mechanism CT, the coil ejecting mechanism CE, and the coil stacking mechanism CR are operated in timed relation by mechanisms carried either by a base 100 (Fig. 10) or a table 101 (Fig. 11) supported above the base by side plates 102 and 103 (Fig. 10). Base 100 supports an electric motor 104 which drives a pulley 105 connected by belt 106 with a pulley 107 connected with a shaft 108 journaled in bearing brackets 109 and 110 suspended from the table 101. Shaft 108 is in alignment with a shaft 111 journaled in bearing brackets 112 and 113 supported by the table 101. The shafts 108 and 111 may be connected by a clutch 114. Shafts 108 and 111 together constitute the main driving shaft. Shaft 111 (Fig. 10) drives a sprocket gear 115 connected by a chain 116 (Fig. 11) with a sprocket gear 117 connected with a shaft 118 which drives a mechanism to be described for indexing or intermittently rotating the dial D. Shaft 108 is connected with a sprocket gear 120 connected by chain 121 with a sprocket gear 122 (Fig. 18) which drives the coil winding mechanism CW. Shaft 111 drives a sprocket gear 123 connected by chain 124 with a sprocket gear 125 connected with a shaft 126 connected by gearing in a speed reducing unit 127 with a shaft 128 carrying a bevel gear 129 meshing with a bevel gear 130 which is connected with a tubular shaft 131 (Fig. 15) journaled in a bracket 132 mounted on the base 100, there being a thrust bearing 133 between the gear 130 and the bracket 132. Shaft 131 is connected by one-revolution clutch I with a shaft 134 journaled in a bracket 135 and in shaft 131 and driving a sprocket gear 136 and a bevel gear 137. A thrust bearing 138 is located between the gear 136 and the bracket 135.

Gear 136 is connected by a chain 140 (Figs. 10 and 88) with a sprocket gear 141, connected with a shaft 142 which drives the coil stacker or rack mechanism CR. Gear 137 meshes with a bevel gear 143 connected with shaft 144 journaled in a bracket 145 mounted on the base 100. Shaft 144 drives the coil taping mechanism CT.

Referring to Fig. 10, shaft 134 is connected by coupling members 146 and 147 with a shaft 148 journaled in brackets 149 and 150 and carrying a plurality of cams 151, 152, 153, 154 and 155.

Cam 151 (Fig. 16) contacts a roller 156 pivotally supported by lever 157 pivoted at 158 upon a bracket 159 (Figs. 13 and 16). Lever 157 is connected to an adjustable link 160 with a lever 161 pivoted at 162 upon a bracket 163 suspended from the table 101. Lever 161 is connected by a link 163 with a rod 164 guided by bushing 165 supported by the table 101. Rod 164 operates a mechanism to be described for locating, relative to the taping mechanism CT, the half of the coil winding form which is carried by the dial D.

Cam 152 (Fig. 17) contacts a roller 170 pivotally supported by a lever 171 journaled on a rod 172 carried by bracket 159a and urged clockwise by a spring 171a. As shown in Fig. 13, lever 171 is connected by an adjustable link 173 with a bar 174 supported for vertical movement by a bracket 175. Bar 174 operates to neutralize or to set in neutral position a mechanism to be described which is associated with the half of the coil winding form which is carried by the dial D.

Cam 153 (Figs. 13 and 17) contacts a roller 180 pivotally supported by lever 181 fulcrumed on the rod 172 and urged clockwise by a spring 181a and connected by an adjustable link 182 with a lever 183 fixed to a shaft 184 journaled in a bracket 185 attached to a bar 185a suspended from the table 101. Shaft 184 is connected with a lever 186 connected by link 187 with a mechanism to be described for operating the coil ejector CE.

Cam 154 (Figs. 13 and 17) contacts a roller 190 pivotally supported by lever 191 fulcrumed on the rod 172 and urged clockwise by a spring 191a and connected by an adjustable link 192 with a bar 193 guided for vertical movement by the bracket 175 and operable upon a mechanism to be described for unlocking a finished coil from the half of the winding form carried by the dial D.

Cam 155 (Figs. 13 and 17) contacts a roller 200 pivotally supported by a plunger 201 of the compressed air valve V10, the plunger 201 being urged upwardly by a spring within the valve. In the position of the cam 155 shown in Fig. 17, valve V10 is open.

Referring to Figs. 11, 12 and 13, the bracket 205 mounted on base 100 guides for vertical movement a rod 206 carrying a pin 207 providing the fulcrum for a lever 208. A spring 209 confined between the bracket 205 and nuts 210 threaded on the rod 206 urges the head 206a of the rod down upon the bracket 205. The lever 208 carries a pin 225 received by slots 226 in a bifurcated block 227 attached to the upper end of a piston rod 228 which cooperates with a piston (not shown) in a cylinder C2.

Lever 208 is connected by a pin 211 with a link 212 (Fig. 11) pivotally connected with a bar 213 which, as will be described later, operates to trip the clutch of the coil winding mechanism CW in a manner to be described. The lever 208 is pivotally connected at 215 with a link 216 (Figs. 10, 13 and 61) pivotally connected at 217 with a rod 218 guided by a bushing 219 adapted to cooperate with the dial for purpose of locking it in any of its "stop" positions. The lever 208 is pivotally connected at 220 with a link 221 pivotally connected at 222 with a rod 223 guided by bushing 224 (Fig. 61) and adapted to cooperate with a mechanism carried by the dial which causes the half of the winding form carried by the dial to advance to the half of the winding form carried by the winding mechanism. Lever 208 is engageable with the head of a screw 230 (Fig. 16) attached to a lever 231 and secured in attached position by a lock nut 230a. As shown in Fig. 16, the lever 231 is attached to a shaft 232 supported by the bracket 159a and connected with a lever 233 urged up by a spring 234 and connected with a link 235 connected at 236 with a bell crank lever 237 pivoted at 238 on a bracket 239. Lever 237 controls the indexing of the dial D by tripping clutch II to be described.

Lever 208 carries a bar 208a (Figs. 13A and 13B) carrying a screw 208b (locked in adjusted position by a nut 208c) for engaging the plunger roller 208d of a valve V18 whose spring (not shown) urges the valve into closed status.

The one-revolution clutch I will now be described with reference to Figs. 14 and 15. The driving member of clutch I is a toothed disc 240 connected with shaft 131. To the driven shaft 134 there is connected a disc 241 carrying a pivot 242 for a lever 243 having a lug 244 for engaging a notch between the teeth of disc 240. A spring 245 connecting the lever 243 with the disc 241 urges the lever 243 clockwise as viewed in Fig. 14. When the lug 244 of lever 243 is permitted to enter between the teeth of the disc 240, the clutch elements are connected. Normally lever 243 is in the position shown in Fig. 14 and is not connected with the disc 240, although the spring 245 urges it clockwise. Such movement of the lever is prevented by the engagement of its tail 243t with a lever 246 pivotally supported by rod 247 attached to bracket 135. Lever 246 is provided with a hook 248 which normally engages a notch 249 in disc 241. Rod 247 provides a pivot for the weighted lever 250 carrying a pin 251 extending thru the head 252 of a rod 253 which extends thru a block 254 having an integral threaded stud 255 pivotally connected with lever 246 and receiving a nut 255a. A spring 256 is located between the head 252 and the block 254 and tends to separate them and thereby urges the block 254 against the shank of a nut 257 threaded on the rod 253 and retained by lock nut 258. The lever 250 is maintained in the position shown in Fig. 14 by a pawl 260 whose pointed end extends into a notch 261 provided by the lever. The pawl 260 is pivoted on a rod 262 provided by bracket 135; and rod 262 is surrounded by a coil spring 263 having one end attached to the rod 262 and the other to a pin 264 attached to the lever 260. This spring urges lever 260 in a clockwise direction. When lever 260 is moved counterclockwise so that its pointed end is disengaged from the notch 261, lever 250 will drop, thereby withdrawing its lug 248 from the notch 249 to release the disc 241 and to allow the spring 245 to move the lug 244 of lever 243 into engagement with a notch of the disc 240. As the disc 240 rotates clockwise (Fig. 14), the disc 241 rotates with it for one revolution. As the disc 241 approaches the end of a revolution, a roller 265 pivoted at 266 thereon engages the lever 250 to push it upwardly, thereby causing, through the spring 256, the engagement of the lug 248 of lever 246 with the periphery of the disc 241. As the lever 246 cannot move as far as the lever 250 is capable of moving it due to engagement of the lug 248 with the disc 241, the spring 256 is compressed. The lever 250 is held in the position into which it was moved by the roller 265 by the reengagement of the pointed end of lever 260 with notch 261. The mechanism is then in condition for disengagement of the clutch parts; and this occurs when the disc 241 returns to the position shown in Fig. 14 wherein the lug 248 is received by the notch 249 and, due to the expansion of spring 256, the lever 246 is moved clockwise so that its lug 248 will engage the notch 249 and so that the lug 248 will move the lever 243 counterclockwise, thereby disengaging the driven disc 241 from the driving disc 240 at about the instant of engagement of the lug 248 with the notch 249 of the driven disc 241.

The clutch is tripped by the operation of a piston within a cylinder C3 mounted on bracket 135. Said piston is connected by rod 270 with a bar 271 supported for vertical movement by the bracket 135. Bar 271 carries a pin 272 providing a fulcrum for a latch lever 273 urged counterclockwise against a stop 274 by a spring 275 attached to the bar 271 and to the lever 273. As the piston rod 270 moves down, the right end of lever 273 engages the left end of pawl 260 at 260a, thereby causing the lever 260 to move counterclockwise in order to trip the clutch. During upward movement of rod 270, the lever 273 is caught by the pawl 260 and is caused to rotate clockwise until it clears the pawl 260. The means for controlling the flow of compressed air into the cylinder C3 will be described later.

Referring to Fig. 60, shaft 118 which is continuously driven, is journaled in bearings 280 housed in a frame 281 which, as shown in Fig. 55, is suspended from the table 101. Shaft 118 drives a worm 282 meshing with a worm gear 283 connected with a tubular shaft 284. Shaft 284 is connectible with a solid shaft 285 through a torque limiting clutch 286 and a one-revolution clutch II. The torque limiting clutch 286 comprises a driving disc 287 (Fig. 55) which is notched to receive plungers 288 which springs 289 urge radially inwardly. The plungers and springs are retained by screws 290 threaded into a driven disc 291. The disc 291 provides the driving element of clutch II which is constructed like the one-revolution clutch I. Therefore the parts of clutch II which are like the parts of clutch I are designated by those reference numerals applied to the clutch I with a prime (') affixed. Member 250' (Fig. 57) is urged toward shaft 285 by a spring 250'a. No corresponding spring is provided by clutch I (Fig. 14) because gravity urges member 250 toward shaft 134.

Clutch II is tripped by mechanism similar to that used for tripping clutch I. This mechanism comprises a lever 273' pivoted on a pin 272' carried by a bar 292 having a stop surface 293 against which the lever 273' is urged by a spring 274'. Bar 292 is guided by brackets 294 and 295 and carries a pin 296 passing through the lever 237. It is apparent that the mechanism heretofore described for operating lever 237 causes the clutch II to be tripped and the driving disc 240' to be connected with the driven disc 241' (Figs. 55, 57, 58). Disc 241' is attached to shaft 285 which is journaled in a bearing 300 carried by the frame 281 and in a bearing 301 provided by a plate 302 attached by screws 303 to a frame 304 attached to a plate 305 attached by screws 306 to the frame 281. The lower end of the shaft 285 is attached to a cam 307 engaged by a roller 308 on the stem 309 of the valve V6 for controlling a compressed air circuit to be described.

The upper end of shaft 285 is connected by screws 310 and dowel pins 311 with the driving lever 312 of a Geneva gear shown in Figs. 53A and 56. Lever 312 carries a roller 313 for engaging radial slots 314 in a Geneva driven disc 315 having notches 316 for receiving a cylindrical surface 317 of the lever 312. Screws 315a attach the disc 315 to the hub 318 of a dial 319 (Fig. 55).

A fixed post 320 is supported by table 101 and has an extension 320a which is received by a bushing 321 attached to the table 101. The extension 320a is threadedly connected with a tie rod 322, the lower end of which is supported by the base 100. By turning the rod 322, when the lock nut 322a is loosened, any sag in the table 101, which supports considerable weight, can be eliminated. Between the post 320 and the hub 318 of dial 319, roller bearings 324 are located. To the hub 318 there is attached a frame 325 which carries the outer race of a ball bearing 326 spaced from the inner race of the upper roller bearing 324 by a sleeve 327. Nuts 328 threaded on the post 320 retain the ball and roller bearings in the positions shown in Fig. 55. A cover 329 is attached to frame 325 by screws 330.

The periphery of dial 319 is confined between a ledge 331 (Fig. 61) provided by a housing 332 and a plate 333 attached by screws threaded into holes 334 (Fig. 53A) in said frame. Housing 332 has a flange 335 attached to the table by screws 336. In Fig. 53A the inside and outside contour of plate 333 is indicated by the dot-dash lines. The frame 332, the plate 333 and the dial 319 provide an enclosure for the Geneva gear.

The dial 319 provides four brackets 340 each having a bearing bushing 341 retained by cap 341a for receiving a shaft 342 which at its outer end as shown in Fig. 55 supports the dial winding form half 350 to be described. Each shaft 342 is moved axially by toggle mechanism comprising a link 371 and two links 372. Link 371 is supported by a pivot 373 supported by bracket 325. Links 372 are pivotally connected by their bosses 374 (Fig. 53) with a disc 375 retained on shaft 342 by a washer 376 and a nut 377 threaded on a screw 378 which secures form 350 to the shaft. The disc 375 carries a ball thrust bearing 379 for taking the thrust between the disc 375 and a shoulder 343 of shaft 342. Links 371 and 372 are connected by a pin 380 carried by a clevis 381 into which a rod 382 is threaded and is locked by a nut 382a. A spring 372a urges each pair of links 372 toward each other. When this spring is uncoupled, the links 372 can be easily separated from the pin 380 and the disc 375.

Rod 382 extends down through a bushing 382a carried by the dial 319 and has a head 383. Between the head 383 and a plate 384 attached to the hub 318 of dial 319 there is located a coil spring 385 which, being under compression, urges the rod 380 downwardly, thus breaking the toggle as shown in Fig. 55 so that the shaft 342 is drawn inwardly. Downward movement of clevis 381 is limited by engagement with screws 381a threaded into plate 384 and locked by nuts 381b. When the spring 385 is permitted to expand to retract the form 350, its part 346 does not bang against bracket 340 because screws 381a are adjusted so as to take the blow from the toggle clevis 381. The extent of approach of the form-half 350 to the form-half 500 (Fig. 1) of the winder is determined by the distance between the pivotal support 373 of link 371. To provide an adjustment, the support 373 is an eccentric portion of a rod 373a which is journaled in the bracket 325 and in a bushing 373b secured by a screw 373c (Fig. 53). Referring to Fig. 55B, in relation to each rod 373a, the bracket 325 provides a hole 373d which receives a nut 373e and a sleeve 373f. A screw 373g passes through the sleeve 373f and threads into nut 373e. While screw 373g is loosened, the rod 373a is turned by a wrench applied to its squared end in order to obtain the desired clearance between adjacent parallel surfaces of forms 500, and 350 when the toggle is straightened. Then the screw 373g is tightened to clamp the rod 373 between the nut 373e and the sleeve 373f.

When the shaft 342 is drawn inwardly, it should not rotate; therefore a plate 344 which is a part of form 350 attached to the shaft 342 is caused to move inwardly and to bring its rib 345 into engagement with a notch 346 provided by the bracket 340 and the bearing cap 341a. However during the taping operation, the form 350 will be extended somewhat outwardly into a position wherein the plate 344 is out of engagement with the bracket 340. In order to prevent accidental rotation of the shaft 342 during its horizontal movement, it is provided with a groove 347 which receives a screw 348. When the toggle is straightened so that form 350 engages its companion piece on the winding head, a groove 349 provided by the shaft will be brought into alignment with the screw 348 so that the shaft 342 may rotate freely.

The dial 319 is provided with four bushings 390, one of which is shown in Figs. 55 and 61. As shown in Fig. 61, a bushing 390 will be located in alignment with the rod 218 when the dial 319 comes to rest after an intermittent movement by the Geneva gear. While the dial 319 is at rest, the rod 218 is elevated automatically so that it moves into the bushing 390 so as to lock the dial while winding, moisturing, taping and ejecting operations are being performed, respectively, at four stations. Before the dial 319 is locked by the rod 218, it is held in location by a dog 319a (Fig. 53A) urged by a spring 319b into a notch in one of four equally spaced wear pieces 319c attached to the dial. The dog 319a prevents bouncing of the dial due to speed of index.

As shown in Fig. 61 while the dial 319 is at rest, two of the rods 382 which are diametrically opposite will be located respectively in alignment with the rods 223 and 164. Automatically, the piston in cylinder C2 is caused to rise, thereby causing the rod 218 to enter a bushing 390 and a rod 223 to push upwardly on a rod 382 thereby straightening the toggle mechanism associated therewith so as to cause the dial-supported form-half 350 to engage the form-half 500 on the winding head. During winding of one coil, the diametrically opposite coil is being taped. During the taping operation, the winding form-half carried by the dial is advanced and retracted relative to the taping operation. Advance into the taping mechanism is effected by the upward movement of rod 164 which effects the straightening of the toggle mechanism associated with the right hand rod 382 (Fig. 61). When the piston rod 228 (Fig. 61) is caused to descend, rod 218 is disengaged from a bushing 390 so that the dial is unlocked and the left hand rod 382 is caused to descend by means of the spring 385 thereby causing the dial-half of the winding form to be retracted from the winding head-half. When rod 164 descends, the right hand rod 382 is caused to descend by a spring 385 thereby retracting the coil on the dial half of the winding form from the taping apparatus.

The coil winder CW will now be described with reference to Figs. 18 through 30.

Referring to Figs. 18 through 20, a frame 400 carries bearings 401 (retained by caps 401a) for a winding shaft 402 and bearings 403 (retained by caps 403a) for a tubular shaft 404 which supports a shaft 415. The sprocket 122 carries a roller bearing 122a journaled on the shaft 402. Normally the sprocket 122 is loose on the shaft 402 and is free to move axially between the clutch disc 405 fixed to the shaft 402 and a clutch disc 406 whose hub is splined to squared portion 407 of the shaft 402 and is provided with a groove 408 for receiving a roller 409 carried by lever 410 pivoted on a screw 411 and urged counterclockwise by coil spring 412 toward a cam 413 provided by disc 414 keyed to the shaft 404. When the cam 413 is rotated away from the lever 410, a spring 416 causes the clutch plates 405 and 406 to engage the sprocket 122 so that it will drive the shaft 402.

Shaft 402 drives shaft 415 at one-fourth speed of the former through gears 420 and 421. Shaft 415 rotates a cam 417 for controlling a valve V12, and a cam 418 for controlling a wire guide to be described. Shaft 404 is a control shaft which has limited movement independent of shaft 415; and shaft 415 drives shaft 404. For this purpose a lost motion connection is provided comprising a pin 422 carried by a disc 423 keyed to shaft 404 and received by an arcuate slot 424 in the hub of gear 421. Trip rod 213 (Fig. 27) which is guided by bushing 425 in frame 400 is raised at the proper instant to push against a screw 426 and raise a lever 427 pivoted at 428 on a bracket 429 to cause a bar 430, pivoted at 431 thereon, to push against a finger 432 attached to a lever 433 clamped to the shaft 404. This will cause shaft 404 to move clockwise (Fig. 27) and counterclockwise (Fig. 21) and cam 413 to move away from lever 410 so that spring 416 will cause the clutch to engage and shaft 402 drives shaft 415. As shaft 415 turns, it picks up shaft 404 and, after one turn of shaft 415, cam 413 is returned to home position to cause lever 410 to move counterclockwise (Fig. 20) to cause the clutch to disengage. At that time, lever 433 (Fig. 27) returns to "home" position. As it returns, it pushes against lever 430, being urged clockwise by a spring 434; and lever 430 is brought by spring 434 under the finger 432. Spring 435 urges lever 427 downward.

When the clutch is disengaged, shaft 402 must stop "dead." This is accomplished by providing the hub flange 440 of clutch disc 406 with a hardened metal socket-piece 441 (Fig. 24A) for receiving a locking lever 442 (Fig. 25) attached to a shaft 443 journaled vertically in a bracket 444. As shown in Figs. 24 and 26A, there is a cam disc 445 driven by shaft 404 which provides a cam 446 for engaging a spring metal lever 447 attached to a hub 448 pivotally supported by shaft 443 in axial alignment therewith but axially adjustable relative thereto. Hub 448 has an arm 450 carrying a screw 451 which is engaged by a spring 452 to urge levers 450 and 447 clockwise (Fig. 26A). Arm 450 carries a screw 453 for engaging an arm 454 attached to shaft 443. A screw 455 having a head for engaging the arm 450 passes loosely through arm 450 and is threaded into arm 454. Adjustments of screws 453 and 455 provide for the proper angular spacing of arms 450 and 454. When cam 446 engages spring lever 447, arm 450 is urged counterclockwise (Fig. 26A) and, hence, arm 454, shaft 443 and lever 442 which is caused to snap into the recessed block 441. Hence shaft 402 is stopped "dead" at the end of four revolutions or whatever its cycle may be. Shaft 402 is not stopped when the power is on. The winder clutch is opening ahead of the end of the winding cycle and the shaft 402 coasts under momentum into its stop position. Arrow 446a (Fig. 25) indicates the motion of part 440 which is arrested. The shock of engagement of parts 441 and 442 is taken up by rubber block 444c confined under compression between frame 400 and a shiftable bearing block 444b and urging the same normally against bearing block 444a. These bearing blocks are parts of the bracket 444.

Precaution is taken against rebound of lever 442, as spring lever 447 is substantially stressed before lever 442 snaps into locking position. Therefore just as lever 442 snaps into the recessed block 441, a lever 457 arrives at the position shown in Figs. 24, 25 and 26A to overlap lever 442 and prevent rebound.

Lever 457 is attached to a rod 458 pivotally supported by frame 400. A spring 459 attached to a stud 460 of lever 457 and to a stud 461 attached to frame 400 (Fig. 19) urges a roller 462 carried by lever 458 against a cam lobe 463 provided by disc 445. When disc 445 is rotated counterclockwise (Fig. 24) in response to upward movement of rod 213 (Fig. 27), cam lobe 463 pushes lever 457 counterclockwise so that its lower end will be to the right of a shoulder 464 of lever 442 and below said shoulder in Fig. 26A. Concurrently, cam lobe 446 leaves lever 447, leaving spring 452 free to rotate lever 442 clockwise out of locking engagement with the clutch hub 440; and, concurrently, cam 413 leaves lever 410 (Fig. 20), so that shafts 402 and 415 and 404 start rotation. Shafts 415 and 404 rotate counterclockwise in Fig. 24. While lever 457 clears the shoulder 464 of lever 442 due to rotation of cam 463 about 50°, lever 442 is in unlocking position. After 50° of cam rotation, lever 457 is pulled against shoulder 464 by spring 459; and lever 457 is cocked ready to move into blocking position when lever 442 is forced by cam 446 and spring lever 447 into locking position at the end of one turn of shaft 415.

Cam 418 (Fig. 22) operated by shaft 415 contacts a roller 470 (Fig. 19) on arm 471 journaled in bearing 472 supported by bracket 473 (Fig. 18A). Arm 471 supports bearings 474 for a shaft 475 carrying a wire guide pulley 476 which guides two wires to a form comprising winding head half-form 500, which is engaged by any one of the four dial half-forms 350. Arm 471 carries a stud 478 (Fig. 19) connected by a spring 479 with a spring support 480 attached to frame 400. Spring 479 urges roller 470 against cam 418. Cam 418 causes the wire to be placed upon the form halves in a predetermined manner such as shown by the Cullin patent 1,926,331 dated September 12, 1933.

The dial supported half of the complete coil form, hereinafter referred to as dial-form 350, will now be described with reference to Figs. 40 thru 52. The form 350 comprises a plate 351 having stepped surfaces A', B' and C' which match the surfaces A, B and C respectively of plate 512 of the winding head half of the coil form hereinafter referred to as winder-form 500. These stepped surfaces are provided with edge surfaces a', b', c', d', e', f', g', and h' which match with surfaces a to h respectively of plate 512. The notches 351a of plate 351 provide for the reception of members which perform the coil taping operation, to be described. Plate 351 is attached to shaft 342 by screw 378, whose head is received by washer 352 which is seated in a counterbored portion 352a of plate 351. Dowel pins 353 locate the plate 351 relative to shaft 342. The disc 344 (Figs. 41 and 42) and a cam support 354 which surround the shaft 342 are attached to plate 351 by screws 355. The holes 355a in part 354 and the holes 355b in plate 351 receive the screws 355. Part 354 has a counterbored portion 354a for receiving a cylindrical boss 344a of disc 344. Part 354 provides a bearing portion which provides a cylindrical bearing portion 355b and a bearing portion 355c. A cam disc 356 surrounds the part 354 and is provided with cylindrical surfaces 356b, 356c and 356d engageable, respectively, with surfaces 355b, 355c and 355d of part 354. Part 356 provides a cam slot 357 (Figs. 48 and 52) receiving a pin 358 (Fig. 41) attached to a clamping jaw 359 retained by a plate 360 which screws 360a threaded into holes 360b of Fig. 36 attach to the plate 351. Part 356 provides a cam slot 361 (Figs. 48 and 50) which receives a pin 362 (Fig. 41) attached to a clamping jaw 363 retained by a plate 364 which screws 364a received by threaded holes 364b (Fig. 43) attach to plate 351. Plate 356 provides a cam slot 365 (Figs. 42 and 48) which receives a pin 366 attached to a clamping jaw 367 slidable in notch 367a of plate 351. Jaw 367 is provided with side flanges 367b (Fig. 40) received by recesses 367c, the flanges being retained in these recesses by the cam disc 356 which in turn is retained by the cam disc support 354 when attached by screws 355 to plate 351.

Armature coil AC is shown in section in Fig. 41. It is clamped between jaws 363 and 367 which are caused to move respectively to the right and down when the cam disc 356 is rotated counterclockwise from the position shown in Fig. 42. During such movement the lower part of the coil AC is released since jaw 359 moves to the right and downwardly in Fig. 41 and away from the fixed clamping jaw 368 attached by screws 368a to plate 351, said screws being received by tapped holes 368b (Fig. 43).

The cam disc 356 carries a pin 369 threaded into a tapped hole 369a (Figs. 48 and 49). Disc 356 carries a pin 370 integral with a plate 370a which screws 370b attach to the disc 356. The plate 370a provides a recess for receiving a ball 370c which a spring 370d within the pin 370 urges ball 370c toward the part 354 which is provided with three depressions 370e (Figs. 45 and 46) engaged by the ball 370c when the disc 356 is located in either of three positions. One of these positions corresponds to the location of the pins 369 and 370 horizontally as shown in Fig. 42 when effected by upward movement of bar 174 (Fig. 54) to place the jaws in neutral position preparatory to winding. Another of the positions corresponds to the location of the pins 369 and 370 as shown in Fig. 54, this position being effected by the engagement of bar 193 with pin 370 for the purpose of unlocking the jaws preparatory to ejecting the coil. The other position of cam 356 is effected by the engagement of rod 587 (Fig. 28) with pin 369 to move it above the horizontal while pin 370 moves below the horizontal, in order to lock the coil in the dial form 350.

Fig. 41 shows the jaws 363, 367 and 359 in locking position. In order to move the jaws into locking position rod 369 is moved up to 369' in Fig. 54. This movement takes place as a result of upward movement of rod 587 (Fig. 28) which is caused to move up following the winding of a coil. After winding the coil and locking thereof by the jaws as shown in Fig. 41, the wound coil is carried to the liquid applying apparatus and to the coil taping apparatus, to be described. After the coil is taped, it is moved to the ejecting station. Before the removal of the coil from the dial form 350, the jaws are moved to unlocked position by causing pin 370 to move up to the position shown in Fig. 54 as a result of upward movement of bar 193. When pin 370 is in this position, jaw 363 is moved to the right, jaw 366 is moved down and jaw 359 is moved to the right and down. The coil is then supported at the bottom side by jaw 359 and is free from fixed jaw 368. The top side of the coil is free to pass between jaws 367 and 363. Ejecting fingers to be described push the top side of the coil away from the dial-form 350 and it tilts about the jaw 359 as it gravitates from the form and descends upon a stacker. After ejection of the coil, the bar 174 (Fig. 54) goes up just far enough to cause the rods 369 and 370 to be located horizontally as shown in Fig. 42. This movement causes the jaw 366 to move up while the jaws 363 and 359 still remain in retracted position and away from the region of winding the wire upon the form 350. The form is neither in locked nor unlocked condition but is in the neutral condition preparatory to advancing it to the winder-form 500. The jaws 367 and 368 have respectively upwardly and downwardly extending flanges which, during retraction of the dial-form 350 from the winder-form 500, drag the coil away from the winder-form. It is desirable that the upper jaw 367 be returned to upper position before winding a coil upon the combined forms 350 and 500. Hence neutralizing or return of jaw 367 takes place preferably before the form 350 is indexed to the winding station.

The winding head half 500 of the coil form will now be described with reference to Figs. 18, 18C and 31 through 39. This form includes a frame 501 having parallel sides 502 and 503 and a counterbored portion 504 adapted to receive a disc 505 provided by shaft 402. From disc 505 extends two lugs 506 spaced apart to receive the side surfaces 502 and 503 of frame 501 when the latter is attached to shaft 402 by screws which pass through counterbored holes 507 in disc 505 (Fig. 18C) and which thread into holes 507a (Fig. 33) in part 501. Notch 505a in disc 505 provides clearance for levers 532, 542 to be described. Screws 508 and dowels 509 attach to frame 501 a form 510 having stepped surfaces A, B and C adapted to match with similar surfaces provided by the dial half 350 of the coil form. The form 510 is provided with edge surfaces a through h which match with similar surfaces provided by the dial half of the form. Across the plate 510 there extends a notch 511 which receives the jaws 367 and 368 of the dial-form 350. As the form is rotated about the axis of the shaft 402 in a counterclockwise direction as viewed in Fig. 22, wire is guided on the form by guide wheels 476.

The guiding of the wire upon the form is assisted by surfaces 512 and 513, the latter being provided by a plate 514 attached by screws 515, said plate having an oblong hole 516 in alignment with a notch 517 provided by the frame 501. The notch 517 receives two plates 518 and 519 (Fig. 33) of hardened and ground steel shaped substantially alike as shown in Fig. 39 and each having a notch 520. When the plates 518 and 519 are attached to the frame 501 as indicated in Fig. 33, their notches 520 will be in alignment. At the end of a winding operation the wires are guided by the wire guide wheels 476 into the notches 520 of the plates 518 and 519. The guiding of the wires into these notches is assisted by surface 521 provided by the frame 501 and by the surface 522 provided by bracket 523 attached to the frame by screws 524 received by the tapped holes 525 of the frame (Fig. 33). The wires which provide the end leads of the coil after it is wound will be located in a groove 526 into which the wires are directed by surface 527 of a bracket 528 attached by a screw 529 threaded into a tapped hole 530.

In alignment with the notch 517 there is a groove 531 (Fig. 33) which receives cutter bars 532 and 542 which are made separately of steel hardened and ground and are then attached by a rivet passing through holes 532a and 542a. The holes 532b and 542b receive a fulcrum pin 533 which extends through hole 532a of the frame 501. Bar 532 is notched out at 534 to provide a head 535 having a rounded or dull corner, a nose 536 also having a rounded upper corner surface and wire cutting jaws 537 and 538, which are the full thickness of the metal of the bar 532 which is a greater thickness than that of the head 535 and the nose 536. The cutting surfaces 537 and 538 closely engage the cutter plate 518. The bar 542 has a shape somewhat similar to bar 532, but it is provided with sharp cutting edges 543 and 544 which closely engage the stationary cutter bar 519. When a form 350 is advanced to form 500, dowel pins 501b (Figs. 31 and 32) of the latter are received by dowel bushings 351b (Figs. 40 and 43) of the former.

To start winding a coil upon the form it is necessary to anchor the free end of the wire thereto before starting to wind. The disclosed machine winds two wires simultaneously, but for the sake of convenience, reference will be made ony to one wire W1. The wire is pulled from a supply reel and placed across the notch 520. While thus positioned by the operator, a valve (VII, Fig. 101) is manually opened thereby causing the rod 552 (Fig. 30) to move right so as to engage the bars 532 and 542 and to cause them to move counterclockwise (Fig. 30) or clockwise (Fig. 32). When the bars move right, wire W1 (Fig. 35) will be cut by the coaction of edge 543 and plate 519 at x and the head 535 will bend it around the notch 520 of plate 518. The completion of the bend is shown at W2 in Fig. 36. The length of the bent portion is much exaggerated in the drawings as about .025" is sufficient to provide an anchor. By means to be described, the bars 532, 542 are caused to move to the position shown in Fig. 37 and the wire shifts to W1' and W2'. After winding a coil is completed. The bars 532, 542 move to the position shown in Fig. 38. Hook end W2' is cut off as indicated at W2" and the end lead W3 of the coil just wound is cut at y leaving wire W4 which is the start lead of the next coil to be wound. W4 is bent (just as W2 was bent in Fig. 36) to provide the anchor for the next coil to be wound; and winding proceeds as before.

Referring to Figs. 28–30, cylinder C1 contains a piston connected with rod 552 attached to a cam plate 553 guided by a structure 550 attached to a plate 551 and to the table 101. Plate 553 has a cam groove 554 which receives a cam follower 555 attached to a bar 556 supported by a frame 557 and retained by a plate 556a attached to frame 557 by screws 556b. Bar 556 has a cam surface 558 which engages a roller 559 carried by a slide 560 guided horizontally by frame 557 and carrying a key 560k (Fig. 29) received by a horizontal key groove in the frame 557. A spring 561 resists right movement of slide 560. Slide 560 is threadedly engaged by a tubular screw 562 providing a seat for a cap 562a retained on its seat by a spring 563 attached to parts 562 and 562a. In case of accidental interference between cap 562a and levers 532, 542 of form 500, the cap 562a is momentarily tilted on its seat by these levers as they rotate with shaft 402, and returns to its seat after these levers pass by. Slide 560 is urged left by a spring 563 until a washer 565 retained by a nut 564 threaded on screw 562 engages a plate 560a on frame 557. Right movement of cam plate 553 causes upward movement of bar 556 which causes right movement of slide 560 which causes right movement of cap 562a which causes bars 532, 542 to move from Fig. 37 position to Fig. 38 position which frees the end lead of the wound coil from the form half 500 and anchors the start end of the next coil to be wound to form 500. Concurrently, the wound coil still on the form half 350 is locked thereto by upward movement of rod 587 which is lifted concurrently with right movement of rod 552. For this purpose, cam plate 553 has a cam groove 580 which receives a roller 581 carried by a lever 582 pivoted at 583 and carrying a roller 584 received by a notch 585 in a bar 586 which moves rod 587 upwardly, motion being transmitted through a spring 588 so that bar 586 may have over-travel. Cap 586a screwed to bar 586 retains spring 588. Frame 557 provides a receptacle 557a (Fig. 28) for catching wire clippings.

The return of wire cut-off levers 532, 542 to the position shown in Figs. 19 and 37 is effected automatically during rotation of the winding form halves by cam 577 provided by a bracket 578 (Figs. 19A and 19B) attached to frame 400 (Fig. 18). This can be effected manually by moving a roller 570 to position 570' (Fig. 30). Roller 570 is carried by an arm 571 attached to a shaft 572 rotated by a crank handle 573 and supported by frame 557. When handle 573 is released, roller 570 is returned to normal position by a spring 572a (Fig. 29) which urges shaft 572 as viewed in Fig. 30.

Another function of cylinder C1 (Fig. 28) is to operate a valve V15 which causes the piston rod 552 to move left after having moved right. For this purpose, cam plate 553 carries a screw 590, locked in adjusted position by a nut 591, which contacts the operating plunger 592 of valve V15 to move it right against the operation of a spring not shown.

Still another function of cylinder C1 is to operate a valve V16 for causing the winding cycle to start. For this purpose, cam plate 553 carries a lever 593 pivoted at 594 and urged counterclockwise against a stop 595 by a spring 596. As the cam plate 553 nears the end of its left travel, lever 593 engages the operating plunger 597 of valve V16 to cause it to move down against the action of a spring, not shown, to cause the winding cycle to start by means to be described in connection with Fig. 101. During right movement of cam plate 553, lever 593 rides over the plunger 397 and valve V16 is not operated.

The wire supply apparatus will now be described with reference to Figs. 3, 6, 7, 8 and 9. To the rear of base 100 (Fig. 5) there is secured a frame 600 which provides rails 601 and 602 which support a table 603 retained upon the rails by plates 604. Fig. 9 (viewed in the direction of arrow 9 of Fig. 5) shows the frame 600 disassembled from the base 100. Fig. 9 shows a cylinder 605 mounted on the frame 600 and cooperating with a piston not shown which is connected by rod 606 which is connected with a bracket 607 by nut 608 on the end of the rod. Bracket 607 is integral with the table 603. By admitting pressure fluid to the end of the cylinder 605, the table 603 is caused to move along the rails in either direction. Motion of the table 603 is limited to the right by engagement with a stop screw 609 threaded through the frame 600 and locked by nut 610. Movement of bracket 607 to the left is limited by engagement with a nut 611 on the end of a screw-rod 612 having its left end supported by a bracket 613 and has its right end threaded through a tapped hole in the frame 600 and locked in adjusted position by nut 614. The ends of screws 609 and 612 are squared to receive a wrench by which they may be adjusted after the nuts 609 and 610 are loosened. These stop screws are adjusted so that the table 603 will be located in either of two positions accurately. The table 603 has an arched portion 615 (Fig. 5) which moves over covers 616 and 617. Cover 616 encloses the cylinder 605 when the table 603 is in the position shown in Fig. 9. When the table 603 moves toward the left in Fig. 9, the cover 617 will protect the parts below the table.

Figure 8:
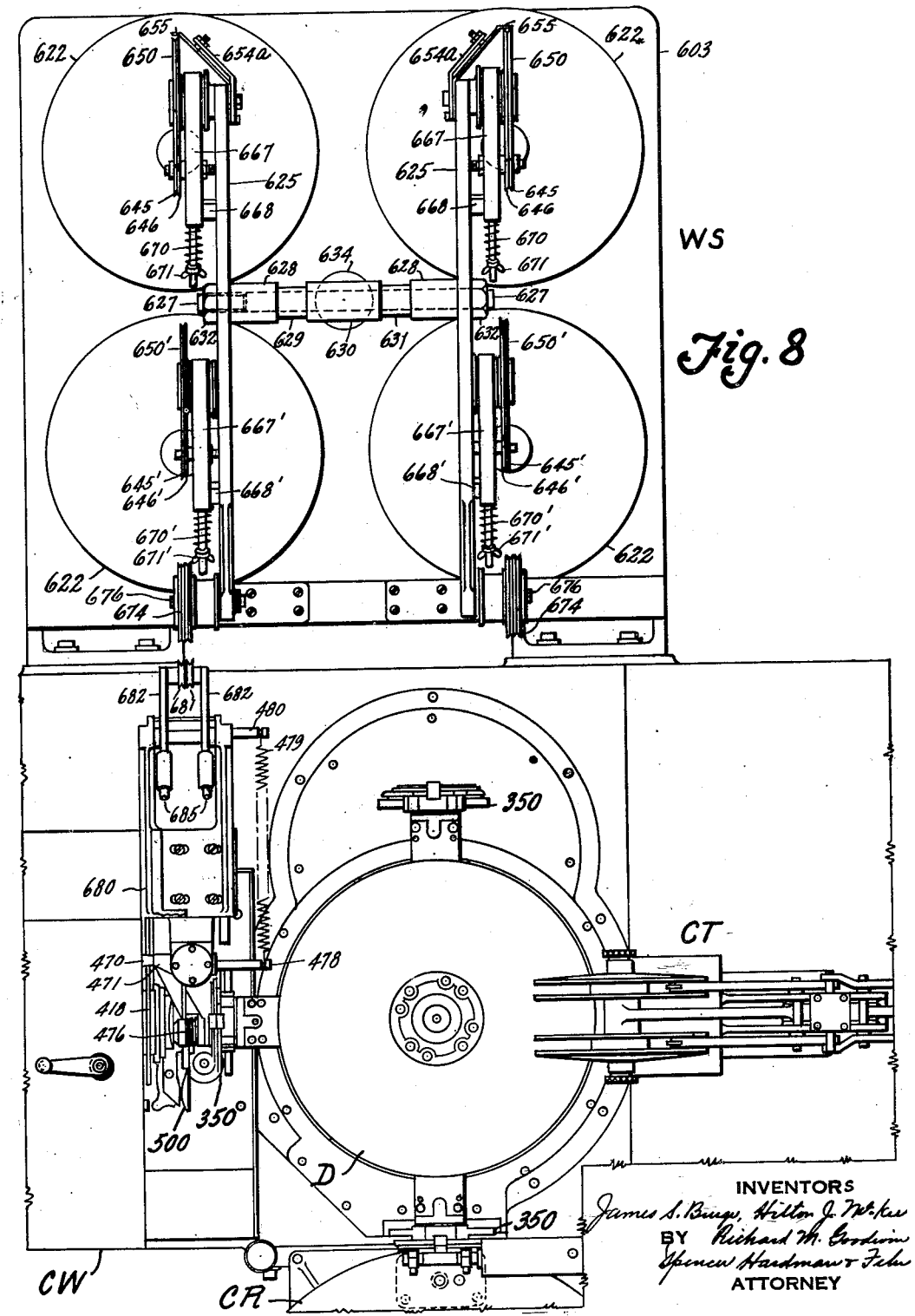
Fig. 8 is a fragmentary plan view of the machine.

The table 603 carries four rods 620 around which four spools 621 of wire are placed, the spools being indicated by dot and dash lines. The spools support caps 622 having smooth surfaces so shaped as to prevent tangling of the wires. Each pair of spools is located vertically below wire guiding apparatus. Each apparatus is supported by bracket 625. The two brackets 625 are attached to a frame 626 supported by the table 603 as shown in Figs. 5 and 9. The brackets 625 are tied together by a cross rod 627 having threaded ends (Fig. 8) which passes through a tubular boss 628 of left bracket 625, a spacer 629, a T 630, a spacer 631 and tubular boss 628 of the right bracket 625. Nut 632 (Figs. 5 and 8 are tightened upon the bolt 627 to clamp the parts together. As shown in Fig. 5, T 630 is threadedly engaged by a rod 633 having its lower end connected with a block 634 attached to table 603 by screws 635. The rod 633 can be adjusted in order to provide a rigid support for the bracket 625 to prevent vibration thereof during winding. The rod 633 is locked in required position by a nut 636, which is welded in position.

The wires from the pair of reels 621 below a bracket 625 are threaded through guides 640 supported by brackets 641 (Fig. 6) attached to bracket 625 by screws 642 and nuts 643. Each screw 642 provides a pivot for a sleeve 644 which supports discs 645, 646 and 647, urged together by spring 648 retained by nuts 649 threaded on sleeve 644. The wire which is threaded through guide 640 is placed between the discs 645 and 646 which offer a slight frictional resistance to the passage of the wire. The two wires are designated by W1 and W2. Wire W1 passes around a grooved guide wheel 650 (Figs. 5 and 7) which is journaled on ball bearings 651 supported by a rod 652 passing through the bracket 625 and threadedly engaged by a nut 653 which retains a plate 654 and a flexible metal arm 655 which extends adjacent the groove of the wheel 650 at two places as shown in Fig. 5 in order to retain the wire after it is passed around the pulley 650. Therefore, there are two arms 655 which are adjacent to arms 654a of plate 654 and each arm 655 is resiliently biased against a stop screw 656 threaded through an arm 654a and retained by the locked nut 657. Hub 660 of wheel 650 is confined between the head 661 of rod 652 and a disc 662 supported by rod 652. The hub 660 is provided with a hard metal brake drum 665 engaged by brake lining 666 provided by a brake band 667, the end of which 667a (Fig. 5) is attached to a lug 668 of the bracket 625 and the other end of the band 667b is pivotally connected with a rod 669 which passes through lug 668 and thence through a spring 670 retained in a state of compression by wing nut 671 threaded on the rod 669. By turning the nut 671, the friction exerted by the brake band may be adjusted. The wires W1 and W2 pass from the wheels 650 and 650' around a double-grooved guide wheel 674 which is pivotally supported at 676 by the bracket 625.

The wire W2 is guided in a similar manner by guide 640', wheel 650' and wheel 675. The parts associated with guide 640' and wheel 650' are indicated by the same reference numbers applied to corresponding parts associated with guide 640 and wheel 650, but with a prime affixed.

Referring to Fig. 23, the wires pass from wheels 674, 675 around grooved guide wheels 678 pivotally supported at 679 by a bracket 680 supported by frame 400. From wheels 678, the wires pass to guide wheels 476. Between wheels 674, 675 and wheel 678, the wires respectively contact grooved wheels 681 pivotally supported by arms 682 journaled on a rod 683 carried by bracket 680. Weights 684 adjustably supported by the arms 682 urge the arms counterclockwise (Fig. 22) so that the wheels 681 contact the wires. If either wire breaks or runs out, the arm 682 carrying the wheel 681 which had engaged the wire is permitted to rotate counterclockwise beyond its normal position to cause a mercury switch 685 carried by that arm to close a circuit to be described which causes the machine to stop at the end of its cycle.

While the wires are being unwound from the pair of supply spools at the left in Fig. 8, the pair of supply spools at the right which may have been unwound, or nearly unwound, are replaced by full spools. When the spools at the left (Fig. 8) have become exhausted, or nearly so, the machine is stopped and pressure fluid is admitted to the right end of the cylinder 605 (Fig. 9) to cause the table 603 to move left in Fig. 9 and also in Fig. 8 thereby bringing the right-hand full spools and the associated wire-guiding devices into alignment with the winding form. The left-hand pair of spools move to the left of the winding form and are removed and replaced by full spools while the wire is being unwound from the right-hand pair of spools.

The coil taping apparatus will now be described with reference to Figs. 62 through 81. Referring to Fig. 67 the shaft 144, which is driven by the shaft 146 through the one-revolution clutch I (Fig. 15), is journaled in a bearing 700 attached to a bracket 701 which supports a plate 702 supporting a thrust bearing 703 which takes the thrust from a bevel gear 704 attached to a shaft 144. Gear 704 drives a gear 705 attached to a cam shaft 706 journaled in a bearing 707 supported by bracket 701 and journaled in a bearing 708 supported by a bracket 709. Shaft 706 drives cams 710, 711, 712, 713 and 714, each of which can be made in diametrically separable parts to facilitate removable without removal of the shaft. (See construction of cam 714 in Fig. 63.)

Fig. 70 shows that table 100 supports two frames 715 and 716 tied together by a spacer 717 which supports a pin 718 passing through washers 719 and hub 720a of a lever 720. Referring to Fig. 65, lever 720 carries a roller 721 which engages cam 712. The right end of lever 720 has a slot 722 which receives a roller 723 carried by a pin 723a carried by a plate 724 (Fig. 62) having slots which receive screws 725 threaded into a slide 726 guided for vertical movement by brackets 727 and 728 to which plates 727a and 728a are attached to retain the slide 726.

Slide 726 supports a shaft 730 (Figs. 68, 72, 73 and 74) carrying gear wheels 731 to which tape is guided by flat tubes 732, each having an eye-clip 733a connected by a spring 733 with a stationary part (Fig. 65). As shown in Fig. 74, the tape passes around a quarter of wheel 731 and it is gripped by a gear 734 urged toward gear 731 by a spring 735 retained by an adjustable plug 735a and pressing against a lever 736 which carries the gear 734 and is pivotally supported on a pin 736a carried by a block 737 attached by screws 737a to slide 726. By pressing the lever 736 clockwise (Fig. 74), the gear 734 is separated from the gear 731 so that the tape, after passing from the end of tube 732, can be fed upwardly through a narrow passage between plates 738 and 739 which extend through a slot 740a in slide 740 (Fig. 72) which is horizontally moved. Slide 740 carries tape cutting blades 741 which are operated to cut off pieces of the tape of the desired length. Plate 739 is urged by a spring 739a toward plate 738. Spring 739a is supported by a screw 739b threaded through block 737 and adjusted to permit plate 739 to separate from plate 738 sufficiently to pass a spliced portion of the tape.

The feed wheels 731 are actuated counterclockwise (Fig. 74) or clockwise (Fig. 68) by mechanism comprising a ratchet wheel 742 attached to shaft 730 and engageable with a pawl 743 pivoted on a pin 744, passing through arms pivoted on a shaft 730 but not fixed thereto (Fig. 73). Pin 744 carries a roller 744a and is received by a notch 746 provided by a bracket 747 adjustably secured to a bracket 748 which is a part of frame 715. The operation of cam 712 upon a roller 721 (Fig. 65) causes slide 726 to move vertically. While the slide 726 is moving down from the position shown in Fig. 68 there will be relative rotation between the pawl 743 and ratchet 742 in a counterclockwise direction and no movement of ratchet 742 will take place. During upward movement of slide 726 to the position shown in Fig. 68, the arm 745 moves clockwise relative to the shaft 730 and the pawl 743 pulls the ratchet 742 in a clockwise direction in order to feed tape above the slide 740.

Two tapes are fed simultaneously through the frame 726. These tapes are fed through two tubes 732 each of which is shaped as shown in Fig. 65 with its right end supported by a stirrup 733 and its left end by a clip 749 pivotally supported at 750 by bracket 751 which supports rollers 752 and 753 between which the tape passes as shown in Fig. 66. The two tapes which pass through the tubes 732 are unwound from the two supply reels 754 (Fig. 66) in similar construction to tape reels 755 (Fig. 62) which supply the upper tape material. A bracket 756 (Fig. 65) which is supported upon a bracket 727', supported by frames 715 and 716, carries a rod 758 providing a fulcrum for a lever 759 supporting a rod 760 (Fig. 62) which is non-rotatable. Rod 760 attached by screws 760a to lever 759 supports a washer 761 upon which a tape roll is placed and is confined between a fixed plate 762 and a movable plate 763 retained by a nut 764 threaded on rod 760.

Pin 758 supports a lever 770 carrying a roller 771 for engaging the tape rolls. When the supply of tape on a roll is about exhausted the left end (Fig. 65) of lever 770 pushes upwardly on a bar 772 guided for vertical movement by bracket 756 and urged downwardly by spring 773. When the bar 772 is moved up against the action of spring 773, a switch SW7 closes and a signal lamp burns. In order that the lever 770 will be set into correct position the location of arm 759 is determined by screw 777 threaded to arm 759 and engageable with a stop 778 provided by bracket 756, the screw 777 being retained in adjusted position by lock nut 779. Reels 754 are associated with parts similar to parts associated with reels 755, the former being indicated by the reference numerals of the latter with a prime affixed.

The description of slide 726 and the means for operating it through the action of cam 712 and the means for feeding two tapes through it by the action of a ratchet and pawl mechanism and the supply of tapes thereto from the two rear reels 754 applies as well to the feeding of the tape from the two forward reels 755 through an upper slide 726' corresponding to slide 726. Therefore, the parts are referred to by the same reference numbers with a prime affixed. The upper frame 726' is guided vertically by brackets 757 attached to frames 715 and 716. The cross slide 740' carried by it carries knives corresponding to 741 which cut off the upper tapes. The upper tapes are not guided by tubes 732 as are the lower tapes, but the upper tapes pass directly to the feed gears 731' and 734' (Fig. 82). A sectional view through one of the upper feed rolls 731' is shown in Fig. 74. When upper slide 726' moves down the ratchet 742' is rotated counterclockwise so that tape is fed below the cross slide 740'. A pawl 768 (Fig. 68) on a spring blade 769 prevents clockwise rotation of ratchet 742' when slide 726' moves up. Slide 726' is caused to move up and down by lever 720' having roller 721' engageable with cam 713. The roller 721 and 721' are retained in engagement with their respective cams by spring 780 connected with levers (Fig. 65).

There are four sets of tape applying irons. The irons of the two lower sets are marked respectively 781, 782, 783 (Fig. 65) and the irons of the two upper sets are marked respectively 781', 782', 783'. One set of the latter is shown in Figs. 75 to 81. Each upper iron 781' is attached to a lever 784' by screws 785' which adjust it relative to a fulcrum 786'. Each upper iron 781' is heated by an electrical heating unit 787'. Each iron 783' is supported by a horizontally adjustable bar 788' and is heated by a unit 789'. Each iron 782' provides a tape-gripping pressure pad and is biased toward the coil to be taped by a supporting blade 790' attached to a lever 791' carried by a lever 792' pivotally supported by a stud 793' and urged toward the right (Fig. 65) by a spring 794' until it engages a stop-screw 795'. The lower sets of irons are supported and heated in a similar manner, the same reference numbers being applied to corresponding parts without a prime affixed. The heated irons are thermally insulated from their supports by heat insulating strips $hi$. As heat from the irons rises, cooling air issuing from a nozzle N (Fig. 65) is directed against the parts surrounding the upper tapes so that the coating thereon will not become tacky before the tape is fed down, cut off and applied to the coil.

Levers 784 and 784' are pivoted on studs 797 and 797' respectively. There they are caused to advance toward each other or to retract from each other by the cam 711 (Fig. 67) which engages a roller 800 carried by a lever 801 attached to a shaft 802 attached to a lever 803 carrying a pin 804 (Fig. 65) passing through a block 805 on a rod 806 passing through semi-cylindrical blocks 807 and 808 and threadedly engaging parts of nuts 809 and 810. Blocks 807 and 808 are received by semi-cylindrical notches in levers 784' and 784 respectively. A bracket 811 contains a spring 812 which urges a plunger 813 against lever 784 and the latter against the block 808. A bracket 815 guides a rod 816 attached to lever 784' and retains a spring 817 pressing upwardly against a washer 818 and the latter against a pair of nuts 818a threaded on rod 816 thereby urging lever 784' clockwise against block 807. By adjusting nuts 809 and 810 along rod 806, the normal position of irons 781' and 781 is adjusted. The irons 781' and 781 are caused to approach or retract from irons 783' and 783 respectively by the operation of cam 711 upon roller 800, said roller being biased toward said cam by springs 812 and 817.

Fig. 70 shows shaft 802 journaled in a bearing 820 supported by frames 715, 716. Lever 803 (on the right of Fig. 70) is retained by a washer 821 and a screw 822. Lever 801 which retains lever 803 (on the left of Fig. 70) is retained in a similar manner.

The sequence of operations of the irons is shown in Figs. 79, 80, 81 and 75. Tape T, which is cloth coated with a thermoplastic adhesive, said coating facing the coil AC, hangs down in front of the irons in Fig. 79. While it is being severed at line $m$ (Fig. 80) armature coil AC moves right to press the severed tape piece against iron 782' and the tape piece is held against the right edge of the coil. Coil AC moves again to the right into the position shown in Fig. 81 causing the tape piece to be formed against the upper and lower sides of the coil, the iron 782' being pushed right by the coil (left in Fig. 65) against the resistance of spring 794'. Then the iron 781' is caused to move into the position shown in Fig. 75 to seal the tape ends together and against the coil. Then the irons return to normal position shown in Fig. 79 and the coil is retracted and the dial indexes to carry the taped coil to the ejecting station. The mode of operation of the other sets of irons is the same as described.

Bars 740, 740' (Fig. 62) which carry the tape-cutting blades 741, 741' (see Fig. 72 for blades 741) are provided with tubular bosses 830, 830' respectively, which receive a rod 831 attached to a T 832 attached to a piston rod 833 connected with a piston within cylinder C4 supported by a bracket 834 having a hole 835 through which slide 740 can be passed for disassembly while slide 726 is down. Admission of fluid pressure to cylinder C4 is controlled by a valve V19 (Fig. 67) supported on a bracket 836 and operated by cam 710. Operation of the blades by compressed air is satisfactory as quick movement is desired.

A plate 840 attached to table 101 carries the taping mechanism to form a separate sub-assembly.

The coil before taping is shown diagrammatically in Fig. 64A, the gripping members of form 350 engage its mid-portions as indicated at $g$. The coil leads $l$ tend to spread away from the coil turns. Before tape is applied at portions $h-k$, the leads $l$ are caused to lie against the coil as shown in Fig. 64B by bars 850 and 850', carried, respectively, by slides 726 and 726'. Each slide has on its left side (Figs. 64 and 63) a groove 851 receiving the shank 852 of a bar, said shank having a slot 853 receiving a pin 854 attached to the slide. A spring 855, located in the groove 851 urges the upper end of the shank slot against the pin. Therefore, when the slides 726 and 726' are fully advanced as shown in Fig. 63A, the coil leads will be pushed toward each other by yielding pressure of the spring 855, and will be held against the coil turns during taping. As bar 850' retracts upwardly, the inclined surfaces 857 of its lug 856 rubs against one of the upper coil leads and causes it to be dragged above the other upper lead and pushed to the right (Fig. 63A) above said other coil lead. After the surface 857 has passed the lead which it had dragged upwardly, said lead springs into a position to the right of said other upper lead. In this way, the two upper leads exchange location relative to the coil turns. This saves an operation later to be performed manually when connecting the armature coil leads with commutator bars.

After the taping operation, the coil leads $l$ may be left in too closely converging relation. It is desirable to spread them while the coil is still gripped by the taping irons in order that they will remain more nearly in horizontal position before the coil passes to the ejecting station. This is effected by the apparatus shown in Figs. 63 and 64. A bracket 860 supported by plate 840 carries screws 861 and 862 supporting bell crank levers 863 and 864 respectively which carry screws 865 and 866 respectively supporting arms 867 and 868 respectively, provided with yokes 869 and 870 respectively. Each of these yokes supports screws 871 fixed in location by lock nuts 872. By adjusting the screws 871 the location of the arms with respect to the bell crank levers can be adjusted. Spreading of the coil leads is effected by cam 714 which engages a roller 875 pivoted on a pin 876 attached to a lever 877, pivoted on a screw 878 carried by a bracket 860. Lever 877 carries a pin 879 received by slots 880 in each of the levers 863 and 864. Roller 875 is maintained in engagement with cam 714 by spring 881 attached to bracket 860 and to a screw 882 fastened to lever 877. When the coil to be taped has been brought into the taping station and has been advanced toward the taping apparatus the arms 867, 868 are in positions 867', 868'. After retraction of the slides 726, 726', these arms move to the full positions to spread the coil leads while the sealing irons still retain grip on the coil, otherwise the tape which is still hot would be pulled away from the coil.

After taping, the coil moves to the ejecting station. Before the coil can be ejected the arm 370 (Fig. 42) must be moved up, or clockwise (Fig. 54). This is accomplished by upward movement of bar 193. After unlocking the coil, it is ejected from the form 350 by fingers 900 (Figs. 85 and 86) operated by shaft 901 journaled in bearings supported by housing 902 carried by bracket 903. Shaft 901 is connected by arm 904 with link 187 previously described in connection with Fig. 17. Shaft 184, carrying arm 183 connected by a link 182 with lever 181 operated by cam 153, is connected through a torque-limiting clutch parts 905—906 (Fig. 85) urged together by a spring 907 with a shaft 908 held in alignment with a shaft 184 by a bearing in part 905 and by the bracket 185. If ejection of the coil is abnormally resisted, the clutch part 906 will move right (Fig. 85) against the resistance of spring 907 thus disconnecting shaft 908 from shaft 184 and also effecting engagement by the flange 911 of clutch part 906 with a switch SW6 which, in a manner to be described, causes the machine to stop.

After the coil is ejected the form-half 350 is restored to neutral condition by movement of its arms 369—370 to horizontal position as shown in Fig. 42, this being effected by upward movement of bar 174.

Referring to Fig. 54, the upward movement of bar 193 is used also to operate means for pushing upwardly the sealed ends of the lower tape piece 912 at 910. While these sealed ends are still warm and the sealing compound is somewhat soft, the inclined surfaces 913 of spring 914 move against the sealed ends and cause them to be bent upwardly. The fingers 913 are clamped at their lower ends between a plate 915 and a frame 916 having inclined surfaces which permit movement of fingers 914. Screws 917 attach plate 915 to the frame 916 which, as shown in Fig. 54C, is provided with grooves 919 for receiving the fingers 913; and pins 918 pressed to the frame 916 are received by holes in fingers 913.

The frame 916 is guided by a vertical groove 920 in plate 175 which guides the bars 193 and 174 which together with frame 916 are retained by a cover plate 175a (Fig. 13). Frame 916 carries a pin 921 providing a pivot for a hub 922 (Fig. 54C) from which extend two integral levers 923 and 924. These levers are urged clockwise (Fig. 54A) by a plunger 925 urged left by a spring 926 retained by the frame 916. When the bar 193 is down as shown in Fig. 54A, a shoulder 927 thereof receives the lower end of lever 923. Consequently, frame 916 is caused to move upwardly with bar 193 a distance sufficient to cause the spring fingers 913 to bend the sealed tape ends. As the frame 916 approaches the end of its upward movement, the lever 924 engages a bar 928 adjustably attached to the plate 175. At the end of the upward movement of frame 916, the levers 924 and 923 are caused to move into the position shown in Fig. 54B, thereby disconnecting the frame 916 from the bar 913 so that the frame 916 gravitates to the position shown in Fig. 54. When bar 193 returns to its lower position, its shoulder 927 is located just below the lower end of lever 923 which is urged by spring 926 shown in Fig. 54A.

The ejected coils fall around the detachable head 930 of a rack 931 (Fig. 90) having parallel rods 932 which support the head 930 and which are attached to plates 933, 934 and 935. A tube 936 is attached to plates 934 and 935 and plate 935 has a hole 937. There are eight of these racks or coil stackers 931 and they are supported by a dial 940 carrying pins 941 which are received by the tubes 936 and studs 942 (Fig. 89) which are received by holes 937 of the plate 935. In this way the racks 931 are located on the dial so that the noses 930a of the heads 930 face outwardly. Therefore, when a rack 931 arrives at the ejecting station its head 930 will be located so as to receive the coils as they are ejected.

Each rack 931 is intended to receive a predetermined number of coils. When the rack is full it moves away from the ejecting station and brings an empty rack to the ejecting station. The full rack is removed and replaced by an empty one. Therefore the dial 940 is caused to move intermittently after a predetermined number of operations of the machine. For this purpose the dial is supported by a shaft 943 journaled in bearings 944 and 945 supported by the cover 946 of a box 947 enclosing the dial-driving mechanism. Sprocket gear 136 operated by shaft 134 (Fig. 15) drives chain 140 which drives sprocket 141 connected with shaft 142 journaled in a bearing support 948. Through a speed-reducer 949, shaft 142 drives a shaft 950 which operates a cam 951 (Fig. 91) rotating clockwise. As the cam rotates it picks up a roller 952 carried by a lever 953 pivoted on a screw 954 and causes the lever to move to position 953'. Lever 953 carries a pivot 955 for a pawl 956 engageable with a ratchet 957 attached to shaft 943. The pawl 956 carries plates 958 located above and below the ratchet 957 so that the ratchet may support the pawl vertically. A spring 959 connecting the pawl 956 and the lever 953 urges the pawl toward the ratchet. The function of cam 951 is to move the pawl so that it will pick up a tooth on the ratchet. The movement of the ratchet clockwise is effected by a spring 960 connecting the lever 953 with a screw 961 threaded through the box 947 and locked in adjusted position by a nut 962. The spring 960 effects one-eighth revolution of the dial, motion of lever 953 clockwise being limited by a screw 963 attached to a bracket 964 and locked in adjusted position by a nut 965. Overtravel of the dial 940 is prevented by a lever 967 pivoted at 968 on a block 969 and which is caused to move into the position shown in Fig. 92 in order to receive the lower end of a pin 941 on the dial. This position of a lever 967 is effected by clockwise movement of lever 953 which picks up a washer 970 surrounding a rod 971 passing through a hole in the lever 953 and causes said washer to push against a spring 972 and the latter against a flange 973 of rod 971 and causes the rod to push against a pin 974 pivotally connecting the rod with a lever 967. Thus the lever 967 is forced into blocking position by yielding pressure. Its blocking position is indicated diagrammatically in Fig. 88. The rebounding of pin 941 counterclockwise from the lever 967 is prevented by the engagement of another pin 941 with a lever 975 pivotally supported at 976 by a bracket 977 and urged into rebound blocking position by a spring 978.

During counterclockwise movement of lever 953 by a cam 951, lever 953 engages a nut 980 locked on shaft 971 by a nut 981. This is caused to move left (Figs. 91 and 92) to rotate lever 967 away from the pin 941 so that the dial can turn again. The indexing of dial 940 into a new position starts before lever 967 is moved again into position for blocking the next pin 941 which comes around. The timing between cam 951 and the main cam shaft 148 (Fig. 15) is such that the shaft 148 makes, for example, 60 revolutions for each revolution of cam shaft 951. Therefore the dial 940 indexes automatically whenever a rack at the ejecting station receives, for example, 60 coils. When the rack 931 is full and is removed from the turntable 940, its head 930 is removed and stored at the machine. Removal of the head 930 exposes an eye 933a attached to plate 933. The full rack can be attached to a chain conveyor having a hook for engaging the eye 933a.

The sticking of tape pieces to the coil can be improved if the tape-receiving portions of the coil AC (on form 350, Fig. 84) are first moistened with a liquid which tends to make the plastic coating of the tape slightly tacky. Such liquid is contained in a tank 990 (Fig. 82) supported by the table 101 and provided with a bracket 991 supporting a shaft 992 driving a miter gear 993 meshing with a miter gear 994 connected with a shaft 995 supported by brackets 996 and 997 provided by the tank 970. Shaft 995 operates a lever 998 (Figs. 83 and 84) carrying sleeves 999, each receiving a rod 1000 secured in adjusted position by a screw 1001. Each rod 1000 carries a tube 1002 which serves as a dipper. When lever 998 is in position 998', the tube 1002 receives liquid from the tank 970. When the lever moves to the full line position 998, the liquid flows from the tubes 1002 and drips upon the tape-receiving portions of the coil. Movement of the lever 998 is effected by the cam 1005 driven by the shaft 706 and cooperating with a roller 1006 pivotally supported by a pin 1007 carried by a lever 1008 pivoted at 1009 on a block 1010. Pin 1007 passes through a clevis 1011 connected by a turnbuckle rod 1012 with a clevis 1013 pivotally connected with an arm 1014 connected with shaft 992. A spring 1015 connecting clevis 1013 with a screw 1016 on bracket 709 urges the roller 1006 against the cam 1005. Rotation of the cam effects movement of lever 998 to cause application of liquid to the coil while it is at a station between the winding station and the taping station. A shield 1017 supported by the tank 990 encloses the lever 998 and is provided with openings through which the tubes 982 pass. Fig. 82 shows a tube 990a supported by a float (not shown) in the tank 990. This tube indicates the liquid level in the tank and provides a duct through which liquid is passed into the tank.

The end of cycle stopping mechanism will now be described with reference to Fig. 93 through Fig. 96. A lever 1020 is attached to a hub 1020a connected by coupling 1020b attached to a shaft 1021 supported by a bracket 1022 and operating a cam 1023 and a plate 1024 carrying a pivot 1025 for a finger 1026 which a spring 1027 urges counterclockwise (Fig. 93) against a stop 1028. Spring 1027 connects a stud 1029 of finger 1026 with a stud 1030 on plate 1024. Shaft 1021 carries an arm 1031 located in the path of movement of the rod 1032 connected with armature 1033 of a solenoid S2 supported by a frame 1034 attached by screws 1035 to bracket 1022. When solenoid S2 is energized in a manner to be described, rod 1032 moves up in order to move lever 1020 to "off" position shown in Fig. 93.

When lever 1020 is in "off" position, valves V7 and V8 are both closed. As lever 1020 moves clockwise (Fig. 93) to "on" position, cam 1023 opens valve V7 by engagement of the roller 1036 thereof, providing solenoid S2 is deenergized and rod 1032 is down. Also valve V8 is caused to open by engagement of its roller 1037 with finger 1026. In Fig. 96 this movement is counterclockwise. Roller 1037 is engaged by finger 1026 during only a portion of the movement of the lever 1020 to its "on" position. The periphery of finger 1026 in the plane of the roller 1037 being relatively short, valve V8 is opened momentarily during movement of lever 1020 to the "on" position. In the "on" position of lever 1020, valve V8 is closed. During the movement of lever 1020 to "off" position, valve V8 does not open. Finger 1026 merely rides off the roller 1037, the spring 1027 expanding to permit finger 1026 to leave pin 1028. After the finger 1026 is moved past the roller 1037 as shown in Fig. 96, the spring 1037 holds the finger 1026 against the pin 1028.

Lever 1020 can be moved manually from "off" to "on" and vice versa. It is moved automatically from "on" to "off" by energization of the solenoid S2 in a manner to be described. After solenoid S2 has been energized to move the lever automatically to "off" position, its circuit should be interrupted. This is effected by a cam 1040 operated by the shaft 1021 and engaging the plunger 1041 of the switch SW2. The movement of lever 1020 to "off" position sets up conditions to be described whereby the machine will stop at the end of a cycle at which the machine arrives when the winding of coil has been completed and it is severed from the supply and it is locked upon form 350 and indexing of the dial has been completed. The next cycle is started by moving the lever 1020 to "on" position which causes upward movement of the piston of cylinder C2 which causes winding and taping to start.

The control is accessible from the front of the machine. Lever 1020 is removed by uncoupling its hub 1020a from coupling 1020b. Removal of a front cover FC (Fig. 1) provides access to wing nuts 1044 which, when removed, free the rods 1045 which pass through brackets 1022 and are attached to a panel plate 1046, thus freeing this plate. Plate 1046 has a lug 1047 to limit clockwise movement of lever 1020.

The emergency stop mechanism will now be described with reference to Figs. 97 to 100. Emergency stop 1050 is connected with hub 1051 carrying a pointer 1052 for indicating "stop" and "start" positions according to a dial 1053. Hub 1051 is connected by a coupling 1054 with a shaft 1055 journaled in bearings supported by brackets 1056 and 1057. Shaft 1055 carries a crank pin 1058 (Fig. 98) connected by a link 1059 with a rod 1060 supported between lever arms 1061 attached to a hub 1062 journaled on a pin 1063 supported by bracket 1064. Arms 1061 carry shoes 1065 received by grooved collar 1066 which is movable axially along shaft 108 to cause clutch 114 to couple or uncouple shaft 108 with shaft 111 (Fig. 10). When clutch 114 is disengaged, operation of the machine ceases immediately except that, in case winding of a coil has been started, winding continues until winding is completed.

Lever 1060 can be moved manually from "stop" to "start" position and vice versa. It is moved automatically from "start" to "stop" position by the energization of solenoid S3 in a manner to be described. The armature 1070 of the solenoid S3 is connected with a rod 1071 which engages a lever 1072 attached to shaft 1055 in order to move lever 1060 from "start" to "stop" position. After solenoid S3 performs its function, its circuit is interrupted by the opening of switch SW3 whose plunger 1073 is engaged by a cam 1074 operated by a shaft 1055.

The air-pressure system will now be explained with reference to Fig. 101. Heavy lines 1080, 1081 and 1082 represent compressed air supply pipes. The heavy dash lines represent compressed air distribution pipes connecting valves with the ends of cylinders. Symbols SR14 are devices for retarding air flow so that the speed of operation of the pistons is reduced. The light lines represent pilot pressure pipes. The arrows marked EX represent exhaust or vent ports.

Cylinder C1 piston moves right to cause the end lead of the finished coil to be served and the start lead of the next coil to be wound to be anchored to the form 500 and the coil to be locked to form 350, and to cause valve V15 to be tripped. Cylinder C1 piston moves left to cause valve V16 to be momentarily opened. Cylinder C1 is controlled by valve V13 which is conditioned to cause right movement of the piston of C1 when valve V12 is open (at the end of winding) and when valve V10 is opened by cam shaft 148. Pipe 1081 is then connected with pipes 1085, 1086, 1087 and 1088. Valve V13 is also thus conditioned when valve V12 is open and valve V11 is opened manually. Pipe 1081 is then connected with pipes 1086, 1087 and 1088. Valve V13 is conditioned to cause left movement of the piston of C1 by the opening of valve V15 which connects pipes 1088 and 1087 with exhaust of V15.

Cylinder C2 piston moves down to retract form 350 from form 500, to unlock the dial, to trip clutch II which engages to cause indexing, and to condition valve 18 for causing the piston of cylinder C3 to go up to relatch the clutch-trip of clutch I for the next operation. Cylinder C2 piston moves up to move form 350 toward form 500, to lock the dial, to trip the winder clutch, and to condition valve V18 so that, provided valve 6A is then properly conditioned, the piston of cylinder C3 will go down to trip clutch I which causes taping to take place. Cylinder C2 is controlled by valve V9 which is conditioned to cause downward movement of the piston of C2 when valve V16 is momentarily opened (by left movement of the piston of C1) to connect 1091 with exhaust of V16. Valve V9 is conditioned to cause upward movement of the piston of C2 when valve V7 is open (end of cycle stop lever 1020 in "on" position) and when valve V6 is opened by shaft 285 after indexing (see Fig. 102). When valves V7 and V6 are open, pipe 1081 is connected with pipes 1090 and 1091. Valve V9 would not be so conditioned as last mentioned if lever 1020 had been moved to "off" position during the cycle to cause the machine to stop at the end of the cycle at which stop the piston of C2 would remain down. To start the cycle again, lever 1020 is moved to "on" position to open valve V8 momentarily and to open valve V7 and keep it open. Momentary opening of valve V8 is required because valve V6 had been left closed at the end of the cycle. Therefore valve V9 is conditioned to cause upward movement of the piston of C2 because the momentary opening of valve V8 (which parallels valve V6) causes pipe 1081 to be connected with pipe 1091.

Cylinder C3 piston moves up to relatch the clutch trip of clutch I for the next operation. Cylinder C3 piston moves down to trip clutch I which engages to cause rotation of main cam shaft 148 and taper shaft 106. Shaft 148 effects unlocking of a taped coil from form 350 at the ejecting station, the ejection of the coil from form 350, the neutralizing of the lock of form 350 preparatory to movement of that form to the winding station, the movement of form 350 at the taping station relative to the taping irons and the opening of valve V10 for the purpose of causing the piston of cylinder C1 to move right when valve V12 is opened. Shaft 106 effects the feeding of tape, the operation of valve V19 to cause movements of the piston of cylinder C4 to advance and retract the tape severing blades, the closing of the taping irons or jaws on the ends of the tapes surrounding coil, the spreading of the coil-leads and the moistening of the coil preparatory to the taping operation.

Cylinder C3 is under control by valves V18 and V6A. Referring to Fig. 102, valve 6A has the same timing relation to shaft 285 (operated by clutch II) as valve 6. Cam 307 supports a cam 307a attached by screws 307r passing through arcuate slots 307s in cam 307a and threaded into cam 307. About 6°-30' after indexing, valves V6 and V6A are opened and remain open for about 45°. Both valves are closed before and when shaft 285 stops. Cam 307a engages a roller 308a carried by the plunger 309a of valve V6A. Valves V6 and V6A have springs which urge their plungers toward the cams. Plate 302 supports block 302a (Fig. 103) which supports valve V6A.

When piston of cylinder C2 is down, valve V18 is conditioned by its own spring to connect pipe 1082 with pipe 1092 and valve V6A is conditioned by its own spring to connect pipe 1094 with the exhaust of valve V6A. Therefore the piston of cylinder C3 moves up to relatch the clutch-trip of clutch I for the next operation. After indexing, the piston of cylinder C2 moves up (provided lever 1020 is in "on" position) to cause valve V18 to connect 1092 with exhaust and to connect 1082 with 1093. While valve V18 is so conditioned, valve V6A will be open (6°-30' to 51°-30' after indexing) to connect pipes 1093 and 1094, whereupon the piston of cylinder C3 moves down to trip clutch I. If, during the cycle, lever 1020 has been moved to "off" position, the machine would have stopped at the end of the cycle with the piston of cylinder C2 down. Shaft 285 would have stopped with valve V6A closed as well as valve 6A closed. Therefore, when the cycle is started again by movement of lever 1020 to "on" position, it is necessary to effect momentary opening of valve V17 which by-passes valves V6A and V18 in order to connect pipe 1082 with pipes 1095 and 1094 so that the piston of cylinder C3 will move down to trip the clutch I.

Cylinder C5 which operates the mechanism for shifting the wire supply is controlled by valve V21 accessible at the front of the machine.

The cycle begins when machine is ready to start winding. The end lead of the wound coil has been cut and the start lead of the next coil to be wound has been anchored to the form 500 and the coil is locked upon form 350. This was effected by right movement of piston of cylinder C1; and said piston has moved left. Left movement of said piston momentarily opened valve V16 which has caused relief of pilot air pressure at valve V9, thereby resulting in a conditioning of valve V9 which caused the piston of cylinder C2 to move down to unlock the dial to retract form 350 from form 500 and to trip clutch II which caused the dial to turn 90° and the valve V6 to open. If the end-of-cycle stop lever 1020 were in "off" position, a new cycle would not start because valve V7 is closed. If lever 1020 is in "on" position, the cycle is repeated.

Valve V7 being open, the opening of valve V6 at the end of indexing causes valve V9 to be conditioned for causing the piston of cylinder C2 to move up (item 1 of Fig. 105) to lock the dial and to position form 350 in cooperative relation to the form 500 and to trip the winder clutch so that winding starts (item 2 of Fig. 105) and also to open valve V18. The opening of valve V18 causes the piston of cylinder C3 to move down (item 3 of Fig. 105) to trip clutch I (item 4 of Fig. 105) which causes rotation of shafts 148 and 706. During rotation of shafts 148 and 706, the functions shown in items 5 to 13 of Fig. 105 take place. Winding stops automatically because the winder clutch automatically disengages at the end of one revolution of shaft 404. Taping stops automatically because clutch I automatically disengages at the end of one revolution.

Operation of the wire cut-off and wire-anchoring devices cannot occur until after winding has been completed at which time valve V12 is opened just as shaft 402 comes to a stop. Valve V10 having been opened by shaft 148 (item 13 of Fig. 105) at the end of its cycle, the opening of valve V10 causes a conditioning of valve V13 to cause the piston of cylinder C1 to move right (item 14 of Fig. 105) to operate the wire cut-off and wire-anchoring devices and to lock the wound-on form 350 and to operate valve V15 which causes valve V13 to be conditioned for causing the piston of cylinder C1 to move left to open valve V16 momentarily to condition valve V9 for down movement of the piston of cylinder C2 (item 1 of Fig. 105) whereby the dial is unlocked, the form 350 is retracted from form 500 and latch 273' (item 15 of Fig. 105) is tripped and clutch II is engaged (item 16 of Fig. 105). Shaft 285 rotates and causes indexing as shown in item 17 of Fig. 105 and indexing is followed by opening for 45° of valves 6 and 6A (item 18 of Fig. 105). Opening of valve V6 while valve V7 is open causes valve V9 to be conditioned to cause upward movement of the piston of cylinder C2 which causes the cycle to be repeated provided lever 1020 is in "on" position.

The function of valve V11 is to effect manual operation of the wire cut-off and anchoring devices when starting with a new wire supply. Valve V11 by-passes valve V10 and admits pilot air pressure to valve V13 so that piston of cylinder C1 moves right to operate said devices and also the coil-to-form lock although the form 350 then at form 500 may have no coil on it. The end-of-cycle stop lever 1020 is of course in "off" position when valve V11 is opened. The new wires having been anchored, the lever 1020 is moved to "on" position and the cycle starts.

The electrical circuit shown in Fig. 104 comprises a main switch 1100 for connecting a three-phase A. C. power line with primary 1109 of a transformer 1110 and contacts 1101 of a relay switch 1100 for connecting the motor 104 (also Fig. 10). The circuit to the motor includes heating elements 1102 which, when the load becomes excessive, will cause the opening of thermal switches 1103 which control the circuit of the magnet coil 1104 of the switch 1101. Start switch 1106 when closed, connects coil 1104 with the transformer secondary 1111 to effect the closing of switch 1101 which, when closed, connects coil 1104 with the transformer independently of the start switch 1106 which can be released. The motor 104 is stopped by opening the stop switch 1105 or by the opening of either of the thermal switches 1103.

Wires 1112 and 1113 connected with the transformer secondary supply current to heating units 1114 (also numbered 787', 789' in Figs. 75 76 and 77) which heat the sealing irons. Each unit 1114 is controlled by a variable resistance 1115 and an adjustable resistance 1116 in circuit with a lamp 1117 which burns to indicate the heater is operating. Unit 1118, which heats a tape splicing iron, is controlled by an adjustable resistance 1119 in circuit with a lamp 1120. When the tape supply is nearly exhausted, switch SW7 closes to cause lamp 1121 to burn to indicate that the full tape rolls should be substituted for those nearly empty. The tape on the nearly empty roll is unwound from that roll and is joined by an electrically heated splicing iron with the start end of the tape on the full roll.

Wire 1112a connects wire 1112 with one terminal of a lamp 1124 and with one terminal each of switch 1106, relay switch magnet coil R2 and relay switch magnet coil R3. The other terminal of coil R2 is connected by wire 1122 with mercury switches SW4 and SW5 connected with a terminal of switch SW2 connected normally with wire 1113a connected with wire 1113. The other terminal of coil R3 is connected by wire 1123 with switch SW6 connected with a terminal of switch SW3 connected normally with wire 1113a.

If a wire breaks, a mercury switch SW4 or SW5 closes to connect coil R2 through the following circuit: Transformer secondary 111, wire 1112a, relay R2, wire 1122, switch SW4 or SW5, SW2, wire 1113, wire 1113a. Solenoid S2 is connected with the A. C. line and causes the end-of-cycle stop lever 1020 to move to "off" position and switch SW7 to move to 2' position to disconnect the relay magnet coil R2 from the transformer whereby solenoid S2 becomes deenergized and to connect the lamp 1124 with the transformer secondary. Lamp 1124 burns to indicate that the machine has stopped automatically.

If ejection of a coil meets with undue resistance, switch SW6 is closed automatically, relay magnet coil R3 becomes energized and causes solenoid S3 to be connected with the A. C. line. On becoming energized, solenoid S3 causes the emergency stop lever to move to "off" position and switch SW3 to move to 3' position to disconnect the relay coil R3 whereby solenoid S3 becomes deenergized and to cause lamp 1124 to burn.

Gear 129 (Fig. 10) is connected with shaft 128 by a shear pin 129a which will shear off in case of a jam caused for example by accidental concurrent engagement of both clutches I and II.

In case the end lead of a wound coil should not be cut at the winding station or in case a coil at the ejecting station should not be ejected but should couple the dial-form 350 with the ejecting fingers 900 (Figs. 85 and 86), or in case the taping mechanism would jam, the indexing movement of the dial would be arrested. To prevent damage to the indexing mechanism, the plungers 288 (Fig. 55) retract automatically from engagement with the recesses of part 287 of tubular drive shaft 284 so that driving torque is not imparted through parts 291, 240' and 241' of clutch II to Geneva gear drive shaft 285. Springs 289 are so constructed and adjusted as to maintain plungers 288 in the recesses of part 287 for the purpose of transmitting torque normally sufficient to index the dial. If abnormal resistance to indexing movement of the dial is encountered, the springs 289 yield to permit retraction of the plungers 288.

When a form 350 is advanced to form 500, the faces of the former do not strike the faces of the latter since the eccentric pin 373a (Figs. 55 and 55B) is so adjusted that a predetermined close spacing of these forms is obtained when rod 382 is lifted by the rod 223 (Fig. 61) on the upstroke of the piston of cylinder C2. The upstroke of rod 223 is limited by its engagement with a nut 224a threaded on bushing 224. Nut 224a also is adjusted to secure the desired close advance of form 350 to form 500 and is locked in adjusted position by nut 224b. In case any foreign substance of appreciable thickness, such as a piece of wire, should happen to be between the forms to limit the approach of form 350 to a distance appreciably exceeding the predetermined close spacing, the winder clutch will not be tripped so that no coil will be wound upon incorrectly spaced winding forms. To trip the winder clutch, a certain rotary movement of shaft 404 (Figs. 24 and 27) is required. In order to meet this requirement, certain adjustments are provided. Adjustment of nut 414a relative to bushing 414b (Fig. 20) surrounding shaft 404 adjusts cam 413 axially to compensate for wear of the clutch facings of discs 405 and 406 so that the normal spacing of these facings can be maintained. Adjustment of nut 416b relative to threaded sleeve 416a attached to shaft 402 takes up end place of this shaft. In order that the winder clutch will operate in the intended manner, lubricant of the bearing 122a is prevented from contacting the clutch facings by oil slingers 122b.

The required (clockwise in Fig. 27) movement of shaft 404 is obtained by a certain upward movement of rod 213 (Fig. 27) effected by the piston of cylinder C2 through bar 208 and link 212. The bar 208 functions as a floating lever having arms extending to the right and left of pivot pin 225 connecting it to the piston rod 228. Its right arm is pivotally connected with devices respectively for advancing and retracting the dial-form and the dial lock pin and with a device (including member 208a) for conditioning valve V18. Its left arm is connected through link 212 with a device for tripping the winder clutch and with a floating fulcrum comprising the pin 207 and a support provided by the head 206a of screw rod 206. This fulcrum has a lug 206b movable between two stops, one being the bracket 205 against which the lug 206b is urged by the spring 209 (Fig. 12) and the other being a stop screw 206d threaded through a bracket 206c which is attached to bracket 205. Lock nut 206e secures the screw 206d in the desired position of adjustment.

During the first part of upward movement of rod 228, lever 208 rotates counterclockwise about pin 207 in its lower position to cause advancing of the dial-form and the dial lock pin. The counterclockwise movement stops normally when the dial-form is fully advanced. Then further upward movement of rod 228 effects clockwise rotation of lever 208 about the pivot pin 220 connecting it with the dial-form advancing mechanism. As the lever 208 moves clockwise, its fulcrum pin 207 rises until the lug 206b engages the stop screw 206d which has been adjusted so that there is movement of the lever 208 sufficient to trip the winder clutch. Therefore winding starts only after the dial is locked and the dial-form is fully advanced.

In case the dial is not properly indexed the movement of the pin 218 into the bushing 390 (which the pin closely fits) is obstructed. In that event, counterclockwise rotation of lever 208 about the pin 207 stops when the pin 219 strikes the lower part of the bushing 390. The clockwise rotation of lever 208 which follows until lug 206b strikes the stop screw 206d is insufficient to trip the winder clutch. Therefore the dial must be properly indexed before the dial-form can be advanced.

In case the dial is properly indexed but the dial-form cannot be fully advanced due, for example, to an obstruction caused by a piece of wire lodged in the face of form 500, the total rise of lever 208 is insufficient to trip the winder clutch. Therefore the dial-form must be completely advanced before winding can start.

Whenever movement of lever 208 is insufficient to trip the winder clutch, it is insufficient to condition valve V18 to cause the piston of cylinder C3 to go down to trip the one-turn clutch I and the cam shaft does not operate.

Since there is no winding and no cam shaft movement, the machine is idle except for rotation of winder drive pulley 122.

In case the coil is not properly located at the taping station, no damage to the sealing irons can occur because they are resiliently urged by springs 812, 817 (Fig. 65) into contact with the coil.

In case of accidental interference between levers 532, 534 (Fig. 30) and cap 562a, screw 562 is not damaged because the levers merely tilt the cap on the seat provided by the screw and spring 563 returns the cap to its normal position after the levers pass the cap.

Protection of the machine from damage is effected by the pressure fluid system described with reference to Fig. 101. Winding and taping cannot start until after indexing is completed. There can be no concurrent engagement of clutches I and II. Until winding is completed, the wire cut-off and wire-anchoring devices can neither be automatically nor manually operated. Until cut-off has been completed and the cut-off operating mechanism restored to normal status, indexing cannot start.

The complete machine cycle comprises individual cycles: the indexing cycle, the winding cycle and concurrently therewith the cycle of cam shafts 134—148 which operate the coil moistener, coil taper, coil-unlock, coil ejector and lock neutralizer, and the cycle of cutting the end lead of the wound coil and locking the wound coil to form 350. The first cycle is completed before the second and third cycles can begin. The second cycle is completed before the fourth cycle can begin. The fourth cycle is completed before the first cycle can begin and so on.

When the winding cycle starts it is completed although the emergency stop lever is manually or automatically moved to "off" position.

Each wire fed into the machine has its individual mercury switch. If one wire breaks or becomes exhausted, the machine will stop at the end of the cycle. If there is still a supply of wire on the spool in back-to-front alignment with the exhausted spool, the partly-full spool need not be discarded. The empty spool can be replaced by a full one without shifting the table 603 (Fig. 9), and wire therefrom can be threaded into the machine.

The machine can be readily adapted for winding coils of various sizes and using different guage of wire. The tension of the brakes on wheels 650 and 650' is adjusted to suit the guage of wire. The location of wire guide wheels 678 and 476 (Fig. 22) relative to each other and to the form 500 is such as to put a kink in the wire of such nature that the wire tends to hug the form rather than bow away from it. Due to this feature as well as to the proper wire tension, the coils are compactedly and therefore uniformly wound. There is practically no variation in the lengths of wires in the coils. Therefore the coils wound on the same forms will have substantially identical electrical characteristics.

While the embodiment of the present invention as herein disclosed, constitutes a preferred form, it is to be understood that other forms might be adopted, all coming within the scope of the claims which follow.

What is claimed is as follows:

1. A coil winding machine comprising a winder-shaft, a winder form attached thereto, a rotary dial, a plurality of forms rotatably supported thereby and located successively by indexing operations at a winding station and at an ejecting station, each of said forms, when at the winding station, being in alignment with the winder-form and each dial-form being axially advanceable toward the winder-form to combine therewith to provide a complete coil form and axially retractable to permit movement of the dial, each of the dial-forms and the winder-form having coupling surfaces which engage when the dial-form is advanced and each of the dial-forms and the dial having coupling surfaces which engage to prevent rotation of the dial-forms when retracted, a clutch for connecting a power source with the winder shaft, means for disengaging the clutch after a predetermined movement of the winder-shaft, means for stopping the shaft after the clutch is disengaged in a certain position of the winder-form, means for cutting the end wire of a wound coil and anchoring to the winder-form the start wire of a succeeding coil, a coil clamp provided by each dial-form advanceable to clamp the coil to the dial form before it is retracted from the winder-form and retractable to permit ejection of the coil from the dial-form when located at the ejecting station, a coil ejector adjacent to which the dial moves the coil-carrying dial-forms successively, means at the winding station for advancing the coil clamp, means at the ejecting station for releasing the coil clamp, a second shaft and mechanisms operated thereby for actuating the coil clamp release and for actuating the ejector, a first one-turn clutch for connecting the second shaft with the power source, a dial indexer, a second one-turn clutch for connecting the indexer with the power source, and a system of control comprising a first mechanism rendered operative in response to completion of winding for effecting operation of the wire cutting and anchoring means and for advancing the coil clamp and then returning to normal status, a second mechanism including a member movable in one direction to retract the dial-form at the winding station and to trip the second one-turn clutch and movable in the opposite direction to advance the dial-form at the winding station and to trip the first one-turn clutch and the winder shaft clutch, means responsive to return movement of the first mechanism to normal status for causing the second mechanism member to move in its first direction whereby the dial indexes after retraction of the dial form at the winding station, and means responsive to completion of indexing for causing the second mechanism member to move in the opposite direction whereby winding takes place and concurrently the release of the coil clamp of the dial-form at the ejecting station and the ejection of the coil therefrom.

2. A machine according to claim 1 in which the said first mechanism of the control system is under joint control by devices respectively operated by cams driven by the winder shaft and the second shaft, said devices being rendered effective to control when said shafts stop.

3. A machine according to claim 1 in which the first mechanism is an hydraulic servo having a piston which moves in a first direction for operating the wire cutting and anchoring means and for advancing the coil clamp and having a main control valve which is conditioned for effecting movement of the piston in said first direction by joint control of two pilot valves operated respectively by cams driven by the winder shaft and the second shaft, said cams functioning when those shafts stop, the main-control valve being conditioned to effect reversal of the piston by a third pilot valve which is operated by the piston near the end of the first movement thereof.

4. A machine according to claim 1 in which the second mechanism is an hydraulic servo having a piston which moves in a first direction to retract the dial form at the winding station and to trip the second one-turn clutch and movable in the reverse or second direction to advance the dial-form at the winding station and to trip the winder-clutch and the first one-turn clutch and having a main control valve which is conditioned for effecting first movement of the piston by a pilot valve which is operated by return movement of the first mechanism and which is conditioned for effecting the second movement of the piston by a second pilot valve which is operated when dial indexing is completed.

5. A machine according to claim 1 in which movement of the second mechanism member in the opposite direction is under joint control by means responsive to completion of indexing and by a manually operated control whereby the machine cycle can be stopped at will at the end of indexing and started again.

6. A machine according to claim 1 in which the second mechanism is an hydraulic servo having a piston which moves in a first direction to retract the dial form at the winding station and to trip the second one-turn clutch and movable in the reverse or second direction to advance the dial-form at the winding station and to trip the winder-clutch and the first one-turn clutch and having a main control valve which is conditioned for effecting first movement of the piston by a pilot valve which is operated by return movement of the first mechanism and which is conditioned for effecting the second movement of the piston by the joint control of two pilot valves (second and third) one of which is operated when dial indexing is completed and the other of which is manually controlled to provide for stopping the machine cycle when indexing is completed.

7. A machine according to claim 1 in which the second mechanism is an hydraulic servo having a piston which moves in a first direction to retract the dial form at the winding station and to trip the second one-turn clutch and movable in the reverse or second direction to advance the dial-form at the winding station and to trip the winder clutch and the first one-turn clutch and having a main control valve which is conditioned for effecting first movement of the piston by a pilot valve which is operated by return movement of the first mechanism and which is conditioned for effecting the second movement of the piston by the joint control of two pilot valves (second and third), one of which is opened when indexing is completed and the other of which is normally open and can be manually closed to provide for stopping the machine cycle when indexing is completed, said machine stopping with the automatic disengagement of the second one-turn clutch and with the second valve closed, a fourth pilot valve paralleling the second pilot valve, and lever operated mechanism which causes the third pilot valve to close in response to movement of the lever to "off" position and which causes permanent opening of the third pilot valve and momentary opening of the fourth pilot valve in response to movement of the lever to "on" position.

8. A machine according to claim 1 in which the tripping of the first one-turn clutch is under joint control by a device responsive to completion of indexing and by a device which requires that the reverse or second direction movement of the second mechanism member be of the magnitude required to complete advancing movement of the dial-form at the winding station.

9. A machine according to claim 1 in which the tripping of the first one-turn clutch is effected by an hydraulic servo having a piston connected with its clutch tripping element to operate it by movement of the piston in a first direction only, a first valve operated by movement of the second mechanism member in the first direction of its movement for causing the piston to reverse, and means for causing the piston to move in its first direction, said means comprising a valve conditioned by completion of indexing and comprising said first valve which is conditioned provided the second mechanism member has movement in its second direction of the magnitude required to complete advancing movement of the dial-form at the winding station.

10. A machine according to claim 1 in which the tripping of the winder clutch is caused to occur when the second mechanism member completes its movement in its second direction, whereby an obstruction to complete advancing movement of the dial-form at the winding station provides an obstruction to movement of the second mechanism member to trip the winder clutch.

11. A machine according to claim 1 in which the dial is provided with holes each registering with a locking pin which is received by a hole when the dial aligns a dial form at the winding station with the winder-form, the locking pin being so connected with the second mechanism member that it is retracted from a dial hole by the first movement of said member and vice versa whereby failure to index properly so obstructs the second movement of said member that the winder clutch and the first one-turn clutch are not tripped.

12. A machine according to claim 1 in which there is a dial locking pin to be received by a hole provided by the dial when it is properly indexed and in which the second control mechanism comprises a longitudinally movable rod, a lever connected between its ends with the rod thus providing lever portions extending laterally of the rod, devices having pivotal connections with one lever portion respectively for advancing the dial-form at the winding station and advancing the locking pin into a dial hole and a device connected with said lever portion for effecting the tripping of the first one-turn clutch, a fulcrum support and a device for tripping the winder clutch connected with the other lever portion, spaced stops between which the fulcrum support is shiftable, a spring urging the fulcrum support against one of the stops while the lever pivots in one direction during the first part of movement of the rod in the direction for advancing the locking pin and the dial-form, said pivotal movement continuing normally until dial-form advancing is completed, further movement of the rod in the same direction causing the lever to pivot in the reverse direction normally about its pivotal connection with the dial-advancing device until stopped by engagement of the fulcrum support with the other stop, the normal reverse movement of the lever being sufficient to effect tripping of the winder and first one-turn clutches but insufficient to effect the tripping thereof in case the first pivotal movement of the lever is less than normal due to obstruction to dial-form advance or to locking pin advance.

13. A machine according to claim 1 in which movement of the second mechanism member in the opposite direction is under joint control by means responsive to the completion of indexing and by a manually operated control whereby the machine cycle can be stopped at will at the end of indexing and in which the manually operated control is actuated into stopping status by an electromagnet energized in response to the closure of a switch when the wire breaks.

14. A machine according to claim 1 having a manually controlled clutch for connecting the power source with the driving members of the one-turn clutches, a clutch connecting the cam shaft with the coil ejector and having jaws which move apart against spring pressure when the torque transmitted begins to exceed a certain value, a switch which is closed by separation of the jaws of the second clutch, an electromagnet which is energized in response to the closing of said switch and a member operated by the electromagnet for causing the manually controlled clutch to be disengaged.

15. In a machine for winding coils, the combination comprising a winder shaft, a winder form attached thereto, a rotary dial, a plurality of forms rotatably supported thereby and located successively at the winding station in alignment with the winder form, each dial form axially advanceable toward the winder form to combine therewith to provide a complete coil form and axially retractable to permit movement of the dial, each of the dial forms and the winder form having coupling surfaces which engage when the dial form is advanced and each of the dial forms and the dial having coupling surfaces which engage to prevent rotation of the dial form when retracted, means for advancing and retracting the dial form at the winder station, means for rotating the coupled forms, means for indexing the dial, coil clamping means mounted on each of the dial forms comprising jaws, cam followers provided by the jaws, means rotatably supported by the dial form and providing cams engaging the followers and having arms extending therefrom, a mechanism for engaging an arm when the dial form is at the winder station, to move the means in the direction to cause the jaws to grip the coil sides, and a mechanism at a station other than the winder station for engaging an arm to cause the means to move in the opposite direction to retract the jaws so that the coil can be removed from the dial form.

16. A machine according to claim 15 in which the coil clamping means of each dial form comprises two pairs of jaws for clamping opposite side portions of the coil, each pair having a jaw for engaging an inner surface of the coil and each of said last mentioned jaws having a flange for engaging an edge portion of the coil next to the winder form, one of the flanged jaws being fixed to the dial form and the second of the flanged jaws being supported for movement toward or away from an inner surface of the coil, the other jaws pairing with the flanged jaws being supported by the dial form for movement toward and away from outer surfaces of the coil in which said means rotatably supported by the dial form includes a ring which provides the said cams for engaging the followers and in which the winder form has recesses for receiving the flanged jaws.

17. A machine according to claim 15 in which the coil clamping means of each dial form comprises two pairs of jaws for clamping opposite side portions of the coil, each pair having a jaw for engaging an inner surface of the coil and each of said last mentioned jaws having a flange for engaging an edge portion of the coil next to the winder form, one of the flanged jaws being fixed to the dial form and the second of the flanged jaws being supported for movement toward or away from an inner surface of the coil, the other jaws pairing with the flanged jaws being supported by the dial form for movement toward and away from the outer surfaces of the coil in which said means rotatably supported by the dial form includes a ring which provides the said cams for engaging the followers, said cams being of such contour and relation that the movable flanged jaw moves out to receive an inner coil surface before movement of the other movable jaws toward outer surfaces of the coil begins, and, conversely, that said other movable jaws move away from the coil before movement of the movable, flanged jaw away from an inner coil surface begins, two arms extending from the cam ring in which the winder form has recesses for receiving the flanged jaws, and in which there is a mechanism which operates on one of the arms to move the camming ring into a neutral position intermediate its coil clamping and unclamping positions whereby the movable, flanged jaw is moved into wire-receiving position preparatory to winding.

18. A machine according to claim 15 in which the dial rotates on a vertical axis and the winder form and the dial forms rotate on horizontal axes in which the coil clamping means of each dial form comprises upper and lower pairs of jaws respectively for engaging upper and lower portions of the coil, each pair having a jaw for engaging an inner surface of the coil and each of said last mentioned jaws having a flange for engaging an edge portion of the coil next to the winder form, the lower one of said jaws being fixed to the dial form and the other flanged jaw being supported by said form for movement toward or away from an inner surface of the upper portion of the coil, the other jaws pairing with the flanged jaws being supported by the dial form for movement toward and away from outer surfaces of the coil in which said means rotatably supported by the dial form includes a ring which provides the said cams for engaging the followers in which the winder form has recesses for receiving the flanged jaws, the coil being supported by the lower movable jaw when the jaws are retracted prior to the ejection, and further characterized by a coil ejecting means which engages the upper portion of the coil and tilts it about the lower movable jaw, one pair of jaws being the upper and the other, the lower, by virtue of location of the coupling surfaces of the dial forms and the dial, and further characterized by means for stopping the winder form when in a corresponding location.

19. A coil winding machine comprising a winder shaft, a winder form attached thereto, a rotary dial, a plurality of forms rotatably supported thereby and located successively at the winding station in alignment with the winder form, each dial form axially advanceable toward the winder form to combine therewith to provide a complete coil form and axially retractable to permit movement of the dial, each of the dial forms and the winder form having coupling surfaces which engage when the dial form is advanced and each of the dial forms and the dial having coupling surfaces which engage to prevent rotation of the dial form when retracted, means for advancing and retracting the dial form at the winder station, means for rotating the coupled forms, means for indexing the dial to move the coils successively from the winder station to an ejecting station, coil gripping members carried by each dial form advanceable to grasp the coil before the dial form is retracted from the winder form and retractable to release the coil to permit ejection of the coil from the dial form when it is located at the ejecting station, a coil ejector adjacent to which the dial moves the coil carrying dial forms successively, means at the winding station for advancing the coil gripping members, means at the ejecting station for retracting the coil gripping members, means for operating the ejector and mechanism for effecting, in recurrent sequence with respect to any one coil, operation of the dial form advancing means to cause a dial form at the winder station to be coupled with a winder form, operation of the form rotating means to wind the coil, operation of the means for advancing the coil gripping members to grasp the wound coil, operation of the dial form retracting means to separate the wound coil from the winder form, operation of the dial indexing means to locate, at the ejecting station, the dial form carrying the wound coil, operation of the means for retracting the coil gripping members carried by the dial form at the ejecting station to release the coil and operation of the coil ejector operating means, wherein the dial provides bearing brackets which respectively support rotatable shafts which respectively support the dial forms and are attached thereto, the bearings being so disposed that the shafts are successively located in axial alignment with the winder form as the dial is indexed, each bracket providing the fixed coupling surfaces, which are adapted to be engaged by the coupling surfaces provided by each dial form, and in which means are provided for preventing rotation of the dial form during the interim movement between disconnection of one coupling and connection of the other coupling, said means comprising a pin supported by the bracket and a longitudinal groove provided by the dial form shaft for receiving the pin during the interim movement and an annular groove provided by the shaft for receiving the pin when the dial form is connected with the winder form.

20. A coil winding machine comprising a winder shaft, a winder form attached thereto, a rotary dial, a plurality of forms rotatably supported thereby and located successively at the winding station in alignment with the winder form, each dial form axially advanceable toward the winder form to combine therewith to provide a complete coil form and axially retractable to permit movement of the dial, each of the dial forms and the winder form having coupling surfaces which engage when the dial form is advanced and each of the dial forms and the dial having coupling surfaces which engage to prevent rotation of the dial form when retracted, means for advancing and retracting the dial form at the winder station, means for rotating the coupled forms, means for indexing the dial to move the coils successively from the winder station to an ejecting station, coil gripping members carried by each dial form advanceable to grasp the coil before the dial form is retracted from the winder form and retractable to release the coil to permit ejection of the coil from the dial form when it is located at the ejecting station, a coil ejector adjacent to which the dial moves the coil carrying dial forms successively, means at the winding station for advancing the coil gripping members, means at the ejecting station for retracting the coil gripping members, means for operating the ejector and mechanism for effecting, in recurrent sequence with respect to any one coil, operation of the dial form advancing means to cause a dial form at the winder station to be coupled with a winder form, operation of the form rotating means to wind the coil, operation of the means for advancing the coil gripping members to grasp the wound coil, operation of the dial form retracting means to separate the wound coil from the winder form, operation of the dial indexing means to locate, at the ejecting station, the dial form carrying the wound coil, operation of the means for retracting the coil gripping members carried by the dial form at the ejecting station to release the coil and operation of the coil ejector operating means, wherein means are provided by the winder form for cutting the end wire of a wound coil and anchoring to said form the start wire of a succeeding coil and further characterized in that the said mechanism includes means for concurrently actuating the wire cutting and anchoring means and for advancing the coil gripping members.

JAMES S. BURGE.
HILTON J. McKEE.
RICHARD MARCUS GOODWIN.

REFERENCES CITED

The following references are of record in the file of this patent:

UNITED STATES PATENTS

| Number | Name | Date |
|---|---|---|
| 1,124,260 | Beadle | Jan. 12, 1915 |
| 1,190,868 | Deats | July 11, 1916 |
| 1,480,797 | Van Orman | Jan. 15, 1924 |
| 1,931,061 | Collins | Oct. 17, 1933 |
| 1,964,445 | Wikle | June 26, 1934 |
| 1,995,105 | Poole | Mar. 19, 1935 |
| 1,995,916 | Collins | Mar. 26, 1935 |
| 2,053,764 | Chapman | Sept. 8, 1936 |
| 2,085,957 | Collins | July 6, 1937 |
| 2,114,287 | Cullin | Apr. 19, 1938 |
| 2,177,457 | Martindell | Oct. 24, 1939 |
| 2,264,468 | Alexander et al. | Dec. 2, 1941 |
| 2,368,499 | Stone et al. | Jan. 30, 1945 |
| 2,374,577 | Bench et al. | Apr. 24, 1945 |
| 2,391,679 | Burge | Dec. 25, 1945 |
| 2,494,227 | Campbell et al. | Jan. 10, 1950 |